(12) United States Patent
Tazume

(10) Patent No.: US 12,210,995 B2
(45) Date of Patent: Jan. 28, 2025

(54) INFORMATION PROCESSING DEVICE, SYSTEM, AND METHOD

(71) Applicant: Rakuten Group, Inc., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 673 days.

(21) Appl. No.: 17/456,462

(22) Filed: Nov. 24, 2021

(65) Prior Publication Data

US 2022/0172151 A1 Jun. 2, 2022

(30) Foreign Application Priority Data

Nov. 30, 2020 (JP) ................................ 2020-198126

(51) Int. Cl.
| | |
|---|---|
| *G06Q 10/083* | (2024.01) |
| *G06N 7/01* | (2023.01) |
| *G06Q 50/40* | (2024.01) |
| *G06Q 50/47* | (2024.01) |

(52) U.S. Cl.
CPC ............. *G06Q 10/083* (2013.01); *G06N 7/01* (2023.01); *G06Q 50/40* (2024.01); *G06Q 50/47* (2024.01)

(58) Field of Classification Search
CPC ...... G06Q 50/40; G06Q 50/47; G06Q 10/047; G01C 21/343; G01C 21/34; G01C 21/3469; B65G 1/1378
See application file for complete search history.

(56) References Cited

U.S. PATENT DOCUMENTS

| | | | |
|---|---|---|---|
| 9,715,233 B1 * | 7/2017 | Mandeville-Clarke ...................... G01C 21/362 | |
| 10,185,327 B1 * | 1/2019 | Konrardy ........ B60W 30/18163 | |
| 2018/0284761 A1 * | 10/2018 | Buttolo ................. H04W 4/023 | |

FOREIGN PATENT DOCUMENTS

JP 2018-151923 A 9/2018

* cited by examiner

*Primary Examiner* — Timothy R Waggoner
(74) *Attorney, Agent, or Firm* — Sughrue Mion, PLLC

(57) ABSTRACT

An information processing device includes at least one memory storing program code and at least one processor. The program code includes acquisition code configured to cause the at least one processor to acquire a status of an order. The program code also includes control code configured to cause the at least one processor to execute movement control according to the acquired status when the acquired status is a status before transition to a completion status, the movement control being control over a vehicle caused to transport a target of the order and suppressing an increase in movement distance from a location of the vehicle to a start location at which the transport is started, the completion status being a state in which the order is completed.

20 Claims, 24 Drawing Sheets

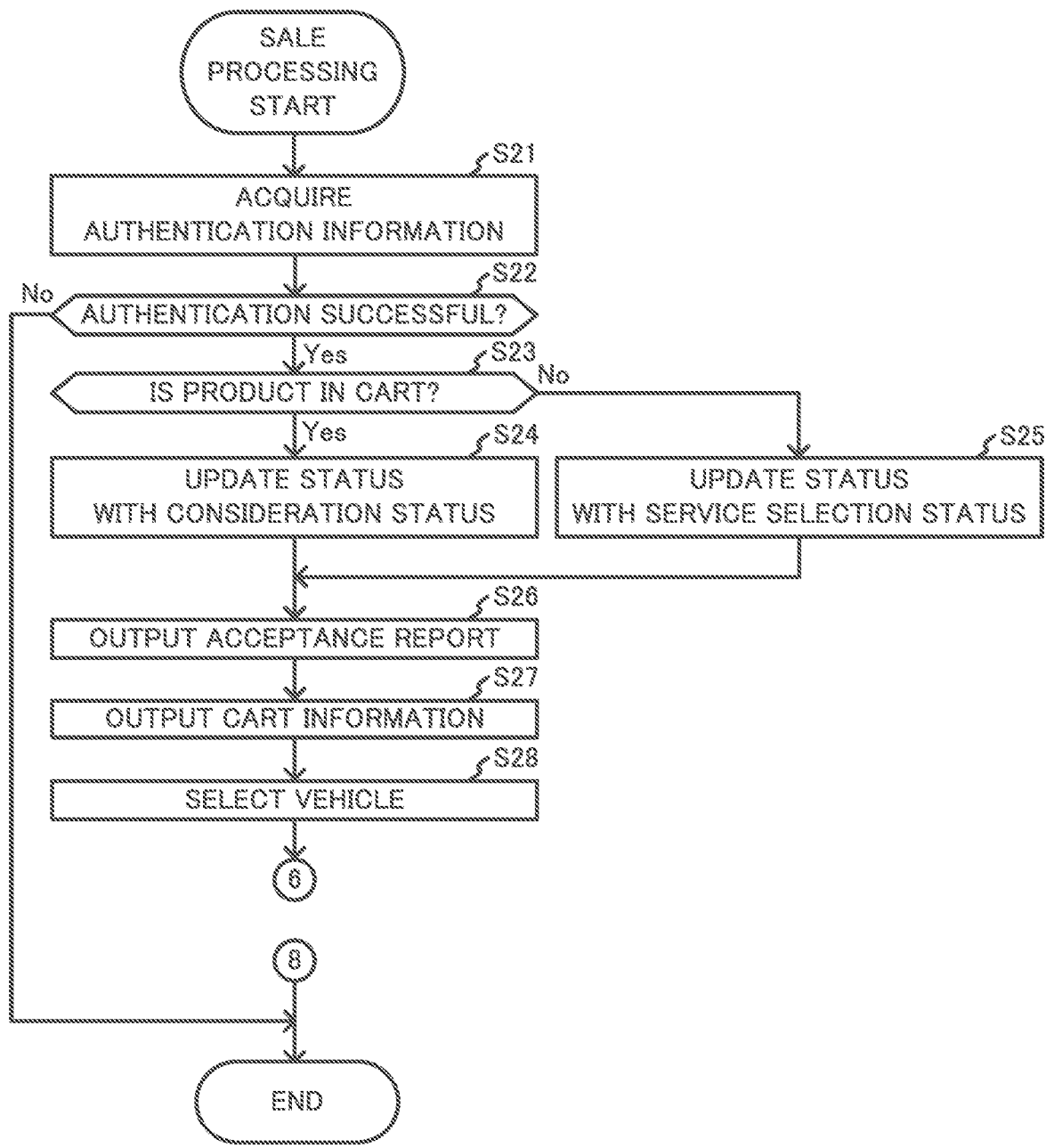

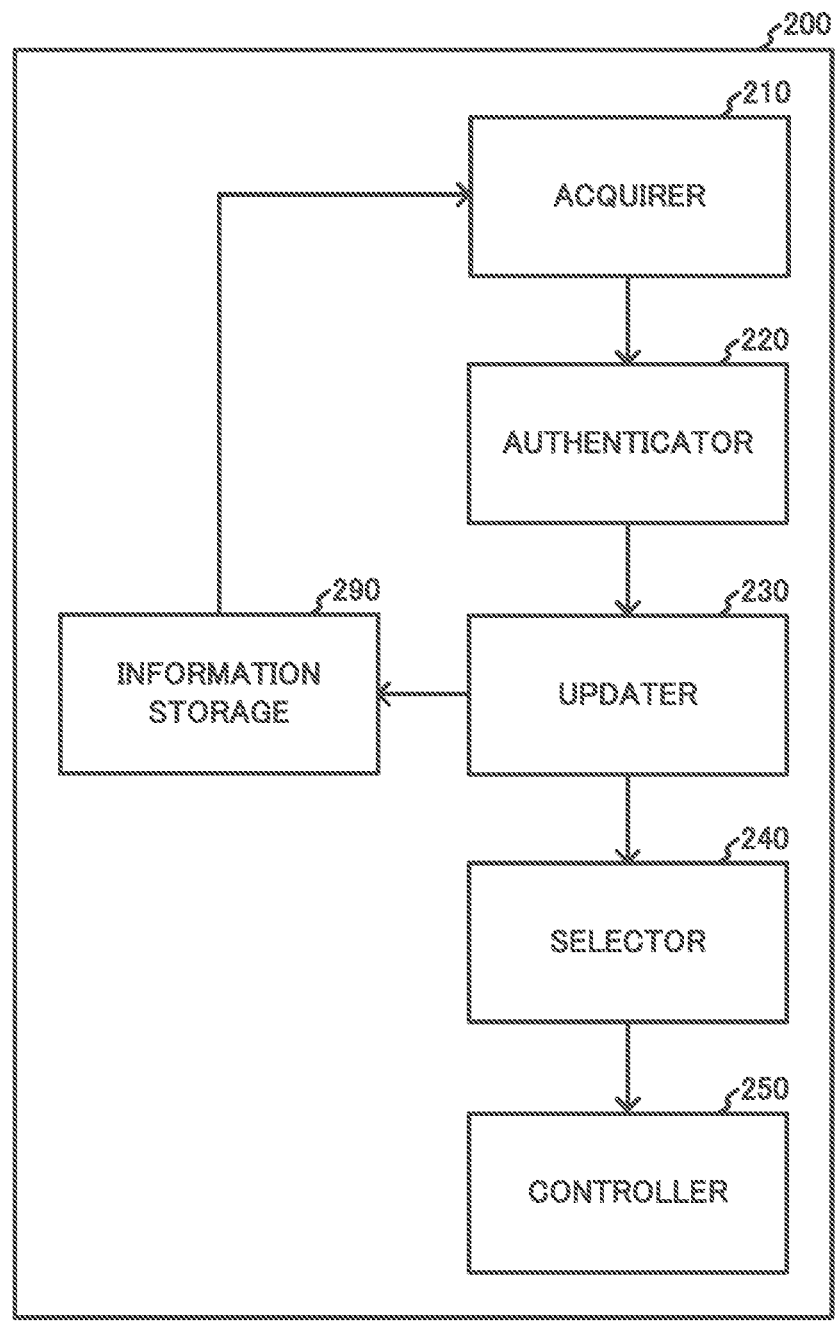

FIG. 8

STATUS TABLE

| STATUS ID | STATUS NAME |
|---|---|
| S1 | SERVICE SELECTION STATUS |
| S2 | SEARCH STATUS |
| S3 | PRODUCT SELECTION STATUS |
| S4 | CONSIDERATION STATUS |
| S5 | SETTLEMENT STATUS |
| S6 | COMPLETION STATUS |

FIG. 9

USER TABLE

| USER ID | PASSWORD | TRANSPORT DESTINATION | SETTLEMENT INFORMATION |
|---|---|---|---|
| U1 | ***; | ..., SETAGAYA-KU, TOKYO | *********** |
| U2 | ***; | ..., CHIYODA-KU, TOKYO | *********** |
| ... | ... | ... | ... |

FIG. 10

ORDER TABLE

| USER ID | STATUS ID | PRODUCT ID | VEHICLE ID | NON-EXECUTION FLAG |
|---------|-----------|------------|------------|--------------------|
| U1 | NULL | NULL | NULL | NULL |
| U2 | S5 | G2, G3 | 900 | false |

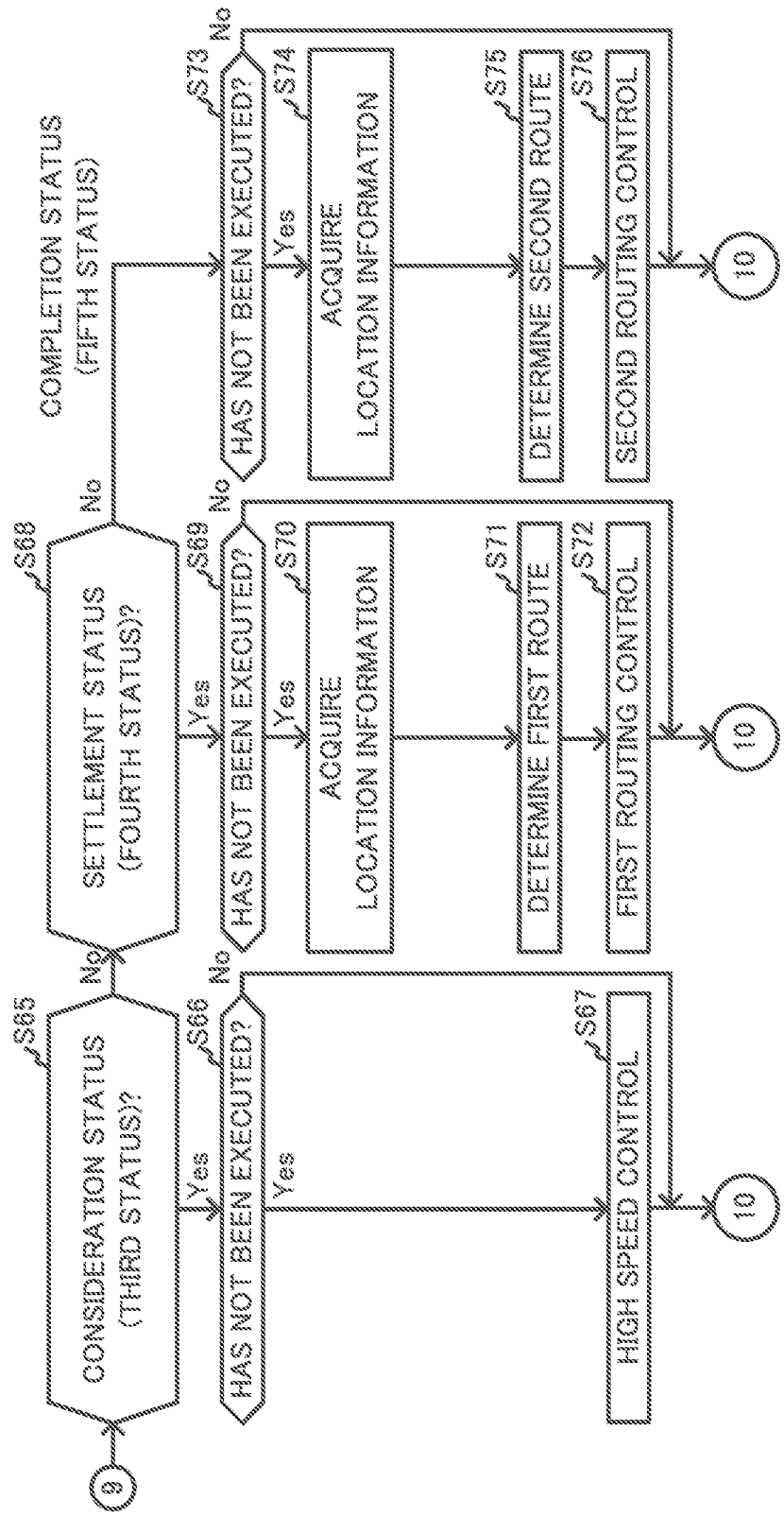

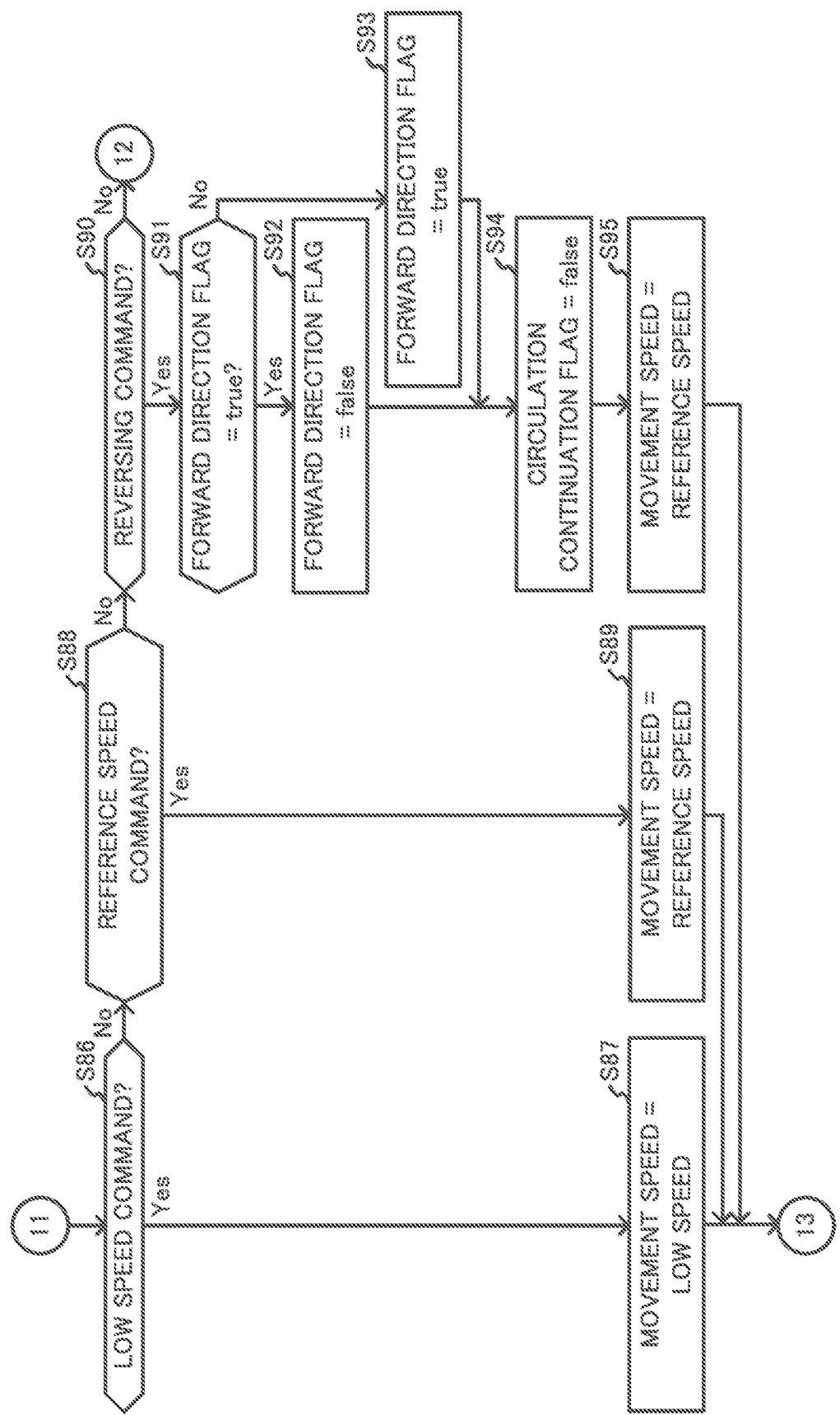

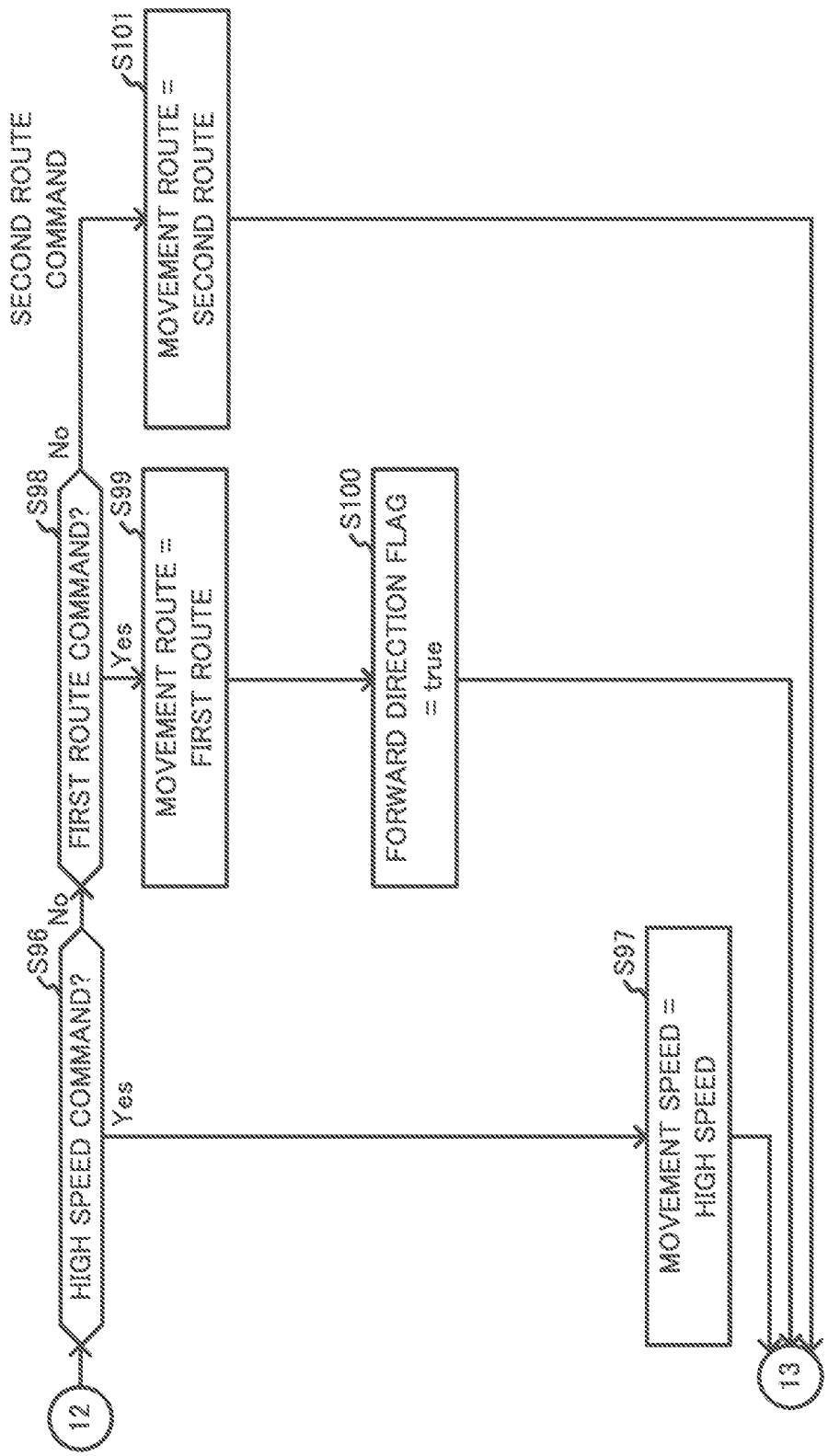

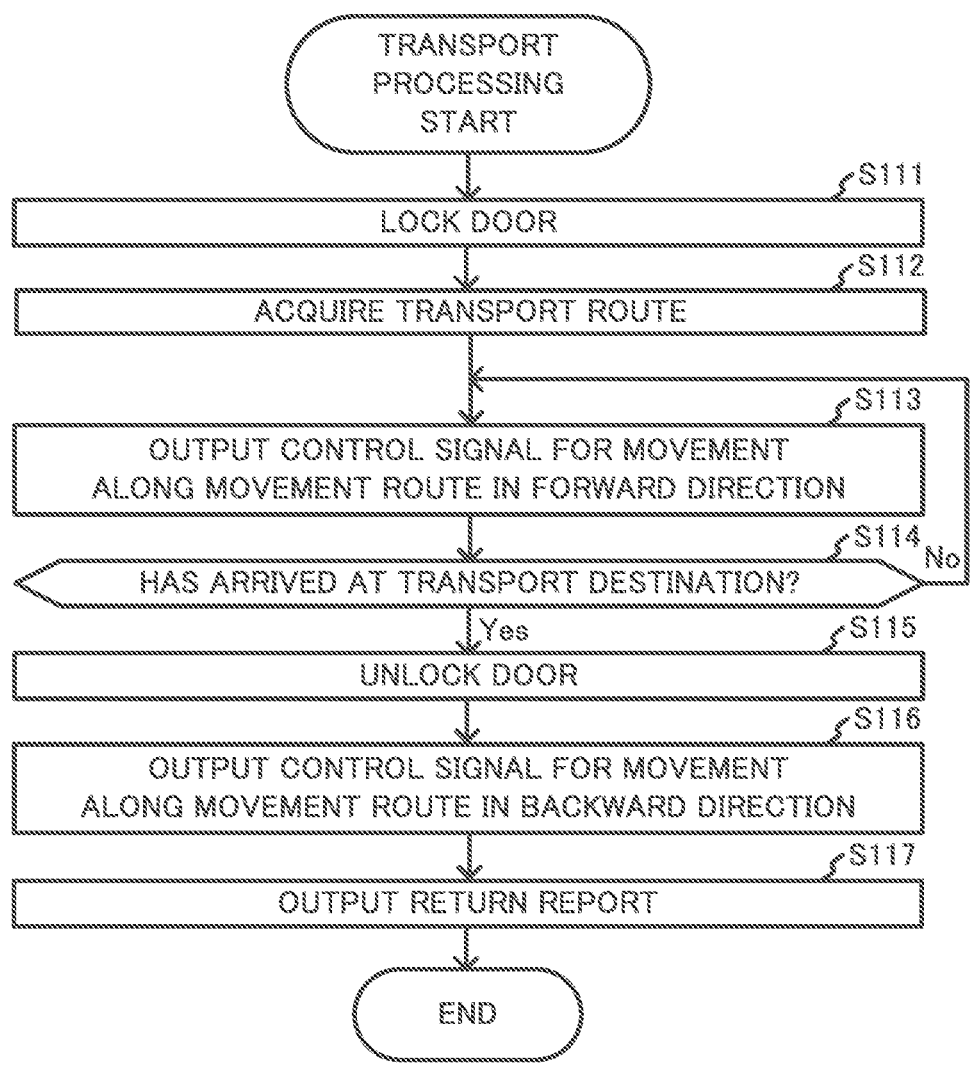

INFORMATION PROCESSING DEVICE, SYSTEM, AND METHOD

CROSS-REFERENCE TO RELATED APPLICATION

This application claims the benefit of Japanese Patent Application No. 2020-198126, filed on Nov. 30, 2020, the entire disclosure of which is incorporated by reference herein.

FIELD

This application relates to an information processing device, a system, and a method.

BACKGROUND

Conventionally, a system that, when an order is completed, causes a vehicle, including a delivery robot, to transport a product targeted by the order has been known (for example, Unexamined Japanese Patent Application Publication No. 2018-151923).

In such a system, when required time required to cause a vehicle to move to a start location of transport after an order has been completed increases, waiting time for transport start required from the completion of the order to the start of transport increases. However, since a system described in Unexamined Japanese Patent Application Publication No. 2018-151923 does not control movement of a vehicle before an order is completed, required time required to cause the vehicle to move to a start location is caused to increase when, for example, the vehicle has moved away from the start location before the order is completed. As described above, there has been a problem in that the system described in Unexamined Japanese Patent Application Publication No. 2018-151923 cannot suppress an increase in required time required to cause a vehicle to move to a start location.

Accordingly, the present disclosure has been made in consideration of the above-described problem, and an objective of the present disclosure is to provide an information processing device, a system, and a method that are capable of suppressing an increase in required time required to cause a vehicle to move to a start location at which transport is started.

SUMMARY

In order to achieve the above-described objective, an information processing device according to a first aspect of the present disclosure includes:
at least one memory storing program code; and
at least one processor configured to read the program code and operate as instructed by the program code, wherein
the program code includes:
acquisition code configured to cause the at least one processor to acquire a status of an order; and
control code configured to cause the at least one processor to execute movement control according to the acquired status when the acquired status is a status before transition to a completion status, the movement control being control over a vehicle caused to transport a target of the order and suppressing an increase in movement distance from a location of the vehicle to a start location at which the transport is started, the completion status being a state in which the order is completed.

BRIEF DESCRIPTION OF THE DRAWINGS

A more complete understanding of this application can be obtained when the following detailed description is considered in conjunction with the following drawings, in which:

FIG. 5 is a portion of a flowchart illustrating an example of sale processing that the information processing device in the warehouse executes;

FIG. 7 is a functional block diagram illustrating an example of functions that the information processing device in the warehouse has;

FIG. 8 is a diagram illustrating an example of a status table that the information processing device in the warehouse stores;

FIG. 9 is a diagram illustrating an example of a user table that the information processing device in the warehouse stores;

FIG. 10 is a diagram illustrating an example of an order table that the information processing device in the warehouse stores;

FIGS. 11A and 11B are a flowchart illustrating an example of movement control processing that the information processing device in the warehouse executes;

FIGS. 15A and 15B are another portion of the flowchart illustrating the example of the circulation movement processing that the vehicle executes;

FIG. 16 is a flowchart illustrating an example of transport processing that the vehicle executes;

DETAILED DESCRIPTION

Embodiment

Hereinafter, the embodiment of the present disclosure will be described with reference to the drawings.

Figure 1:
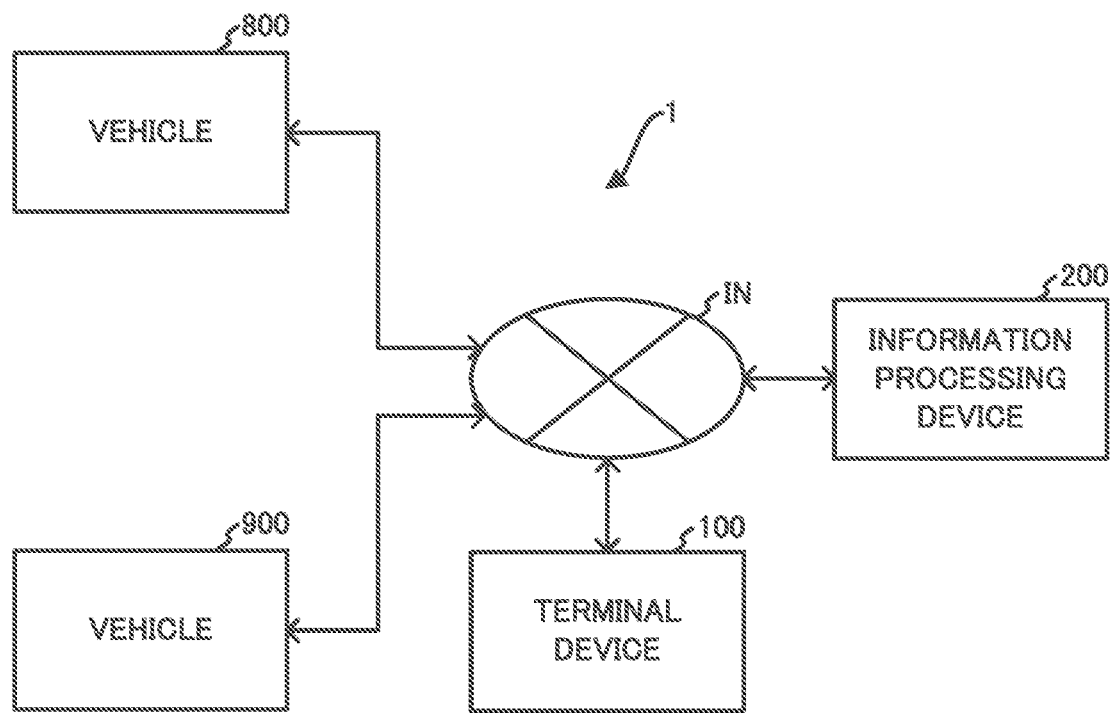
FIG. 1 is a system configuration diagram illustrating a configuration example of an information processing system according to the embodiment of the present disclosure.

An information processing system 1 according to the embodiment of the present disclosure includes a terminal device 100, as illustrated in FIG. 1, that is carried by a user who makes an order, an information processing device 200 that accepts an order, and vehicles 800 and 900 each of which, in order to transport a target of an order to a transport destination specified by the user, stores the target therein and moves.

Figure 2:
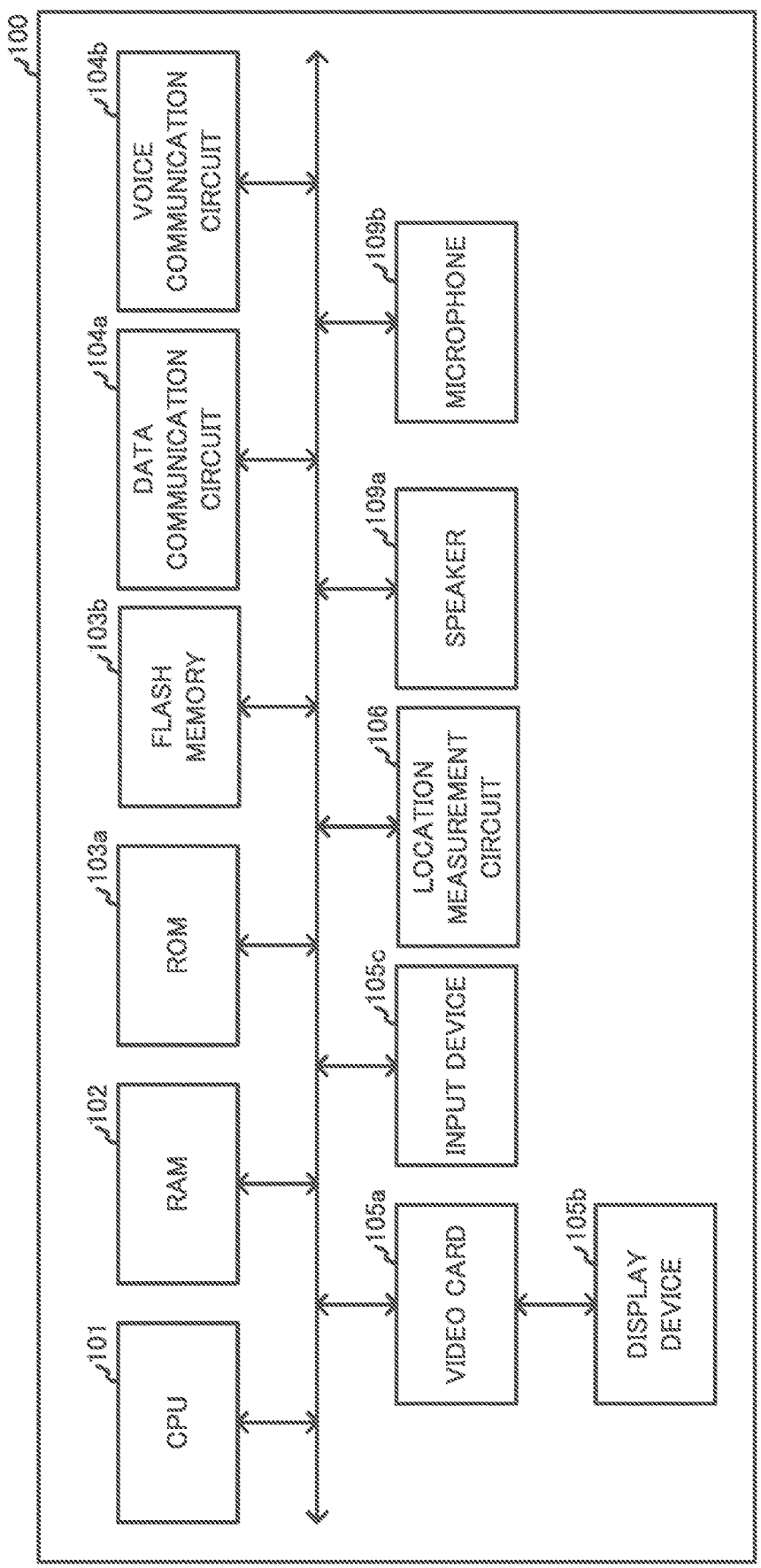
FIG. 2 is a hardware configuration diagram illustrating a configuration example of a terminal device.

The terminal device 100 is a smartphone and includes a central processing unit (CPU) 101, a random access memory (RAM) 102, a read only memory (ROM) 103a, a flash memory 103b, a data communication circuit 104a, a voice communication circuit 104b, a video card 105a, a display device 105b, an input device 105c, a location measurement circuit 106, a speaker 109a, and a microphone 109b, which are hardware components, as illustrated in FIG. 2. Although, in the present embodiment, the terminal device 100 includes one CPU 101, the terminal device 100 may include a plurality of CPUs. In addition, the terminal device 100 may include a plurality of RAMs and may include a plurality of flash memories.

The CPU 101 of the terminal device 100 performs overall control of the terminal device 100 by executing programs stored in the ROM 103a or the flash memory 103b. The RAM 102 temporarily stores data to be processed at the times of execution of the programs by the CPU 101.

The ROM 103a and the flash memory 103b of the terminal device 100 store various types of programs. The flash memory 103b further stores various types of data that are used in the execution of the programs and tables in which data are stored. The terminal device 100 may include a hard disk in place of the flash memory 103b.

The data communication circuit 104a of the terminal device 100 is a network interface card (NIC) and, in accordance with a communication standard, such as long term evolution (LTE) and 5th generation (5G), performs data communication with a not-illustrated base station that is connected to the Internet IN, using radio waves. In this way, the data communication circuit 104a of the terminal device 100 performs data communication with the information processing device 200 and the vehicles 800 and 900, which are connected to the Internet IN. The voice communication circuit 104b performs voice communication with a not-illustrated base station, using radio waves.

The video card 105a of the terminal device 100 renders images, based on digital signals output from the CPU 101 and also outputs image signals that represent the rendered images. The display device 105b is an electroluminescence (EL) display and displays images in accordance with the image signals output from the video card 105a. The terminal device 100 may include a plasma display panel (PDP) or a liquid crystal display (LCD) in place of the EL display. The input device 105c is one or more of a touch pad and a button and inputs a signal corresponding to an operation by the user.

The location measurement circuit 106 of the terminal device 100 is a quasi-zenith satellite system (QZSS) circuit. The location measurement circuit 106 receives signals emitted from quasi-zenith satellites, measures latitude, longitude, and altitude indicating a location of the terminal device 100, based on the received signals, and outputs a signal indicating the measured latitude, longitude, and altitude. The location measurement circuit 106 may be, instead of the QZSS circuit, a global positioning system (GPS) circuit that receives GPS signals emitted by GPS satellites and measures latitude, longitude, and altitude indicating a location of the terminal device 100, based on the received GPS signals.

The speaker 109a of the terminal device 100 outputs sound in accordance with a signal output by the CPU 101, and the microphone 109b of the terminal device 100 outputs a signal representing ambient sound around the terminal device 100.

In the terminal device 100, a plurality of applications (hereinafter, referred to as apps) used for provision of services is installed. The user, who carries the terminal device 100, selects an app used for provision of a service that the user desires, from among the plurality of installed apps and performs an operation to start up the selected app, on the terminal device 100.

In the present embodiment, the following description will be made using, as an example, a case where an app used for provision of a service to perform sale and transport of a product (hereinafter, referred to as a sale service) is selected. Thus, in the present embodiment, an app used for provision of the sale service (hereinafter, referred to as a sale app) is selected and started up. In addition, in the present embodiment, an order is a request requesting sale and transport of a product, and a target of an order is a product of which the sale and transport are requested.

Figure 3A:
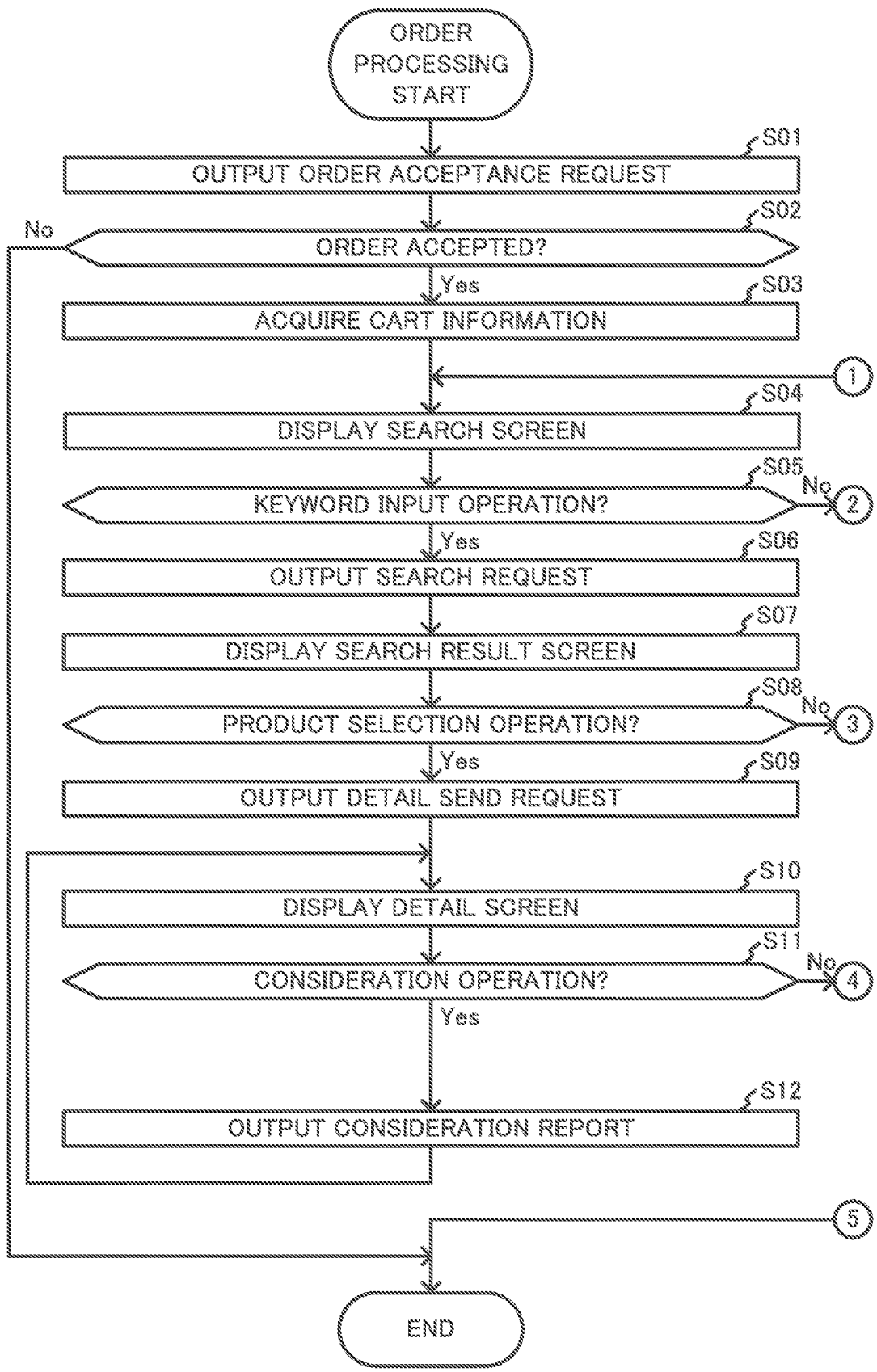
FIGS. 3A and 3B are a flowchart illustrating an example of order processing that the terminal device executes.
Figure 3B:
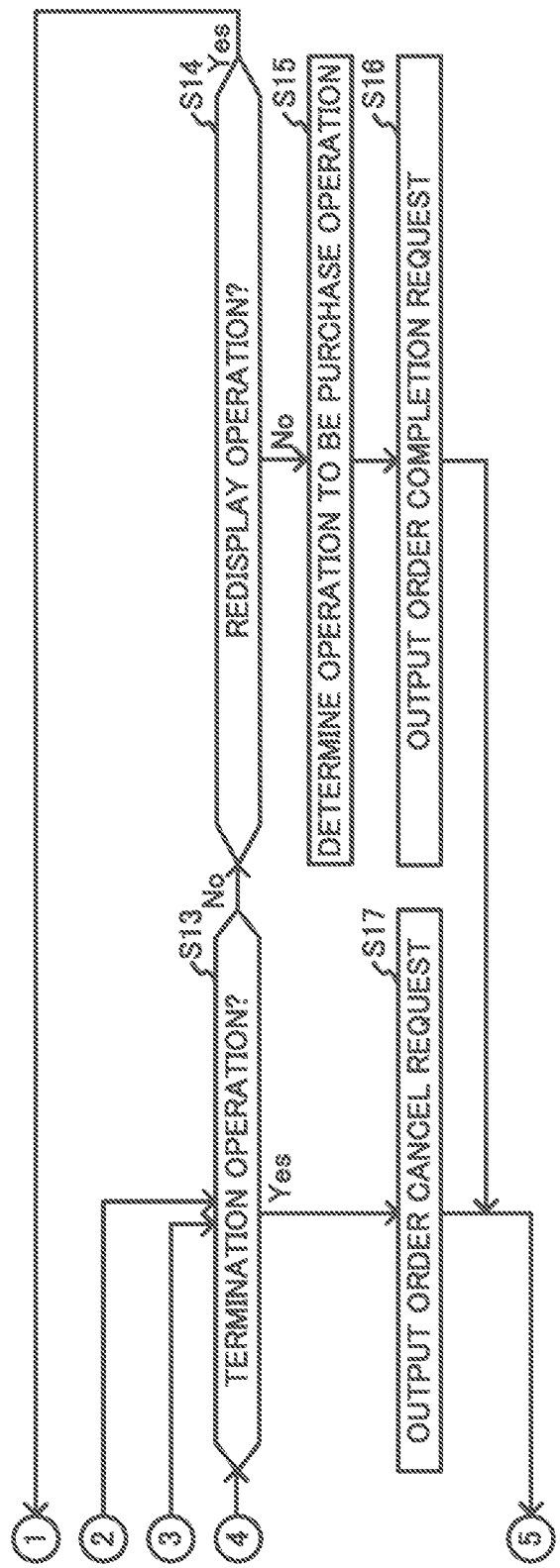

In order to perform the above-described operation, when the input device 105c of the terminal device 100 outputs a signal corresponding to the operation to start up the sale app, the CPU 101 of the terminal device 100, by starting execution of the sale app, starts execution of order processing, as illustrated in FIGS. 3A and 3B, that is defined by the sale app.

When the execution of the order processing is started, the CPU 101 of the terminal device 100 causes the display device 105b to display a message prompting the user to input authentication information including a user identification (ID) identifying the user and a password that the user has set in advance. When the user who has visually recognized the message operates the input device 105c, the input device 105c outputs a signal corresponding to the operation, and the CPU 101 acquires authentication information of the user, based on the signal.

Next, the CPU 101 of the terminal device 100 reads a service ID identifying the sale service from, for example, binary data of the sale app. Subsequently, the CPU 101 generates an order acceptance request that includes the acquired authentication information and the read service ID of the sale service and that requests an order to be accepted and the sale service to be provided when the user authentication succeeds. Next, the CPU 101 outputs the generated order acceptance request to the data communication circuit 104a with the information processing device 200 as the destination (step S01).

When the data communication circuit 104a of the terminal device 100 has not received an acceptance report announcing that the order has been accepted, when or before a predetermined period has elapsed since the data communication circuit 104a sent the order acceptance request to the information processing device 200, the CPU 101 of the terminal device 100 determines that the order has not been accepted because the authentication failed (step S02; No). Subsequently, the CPU 101 causes the display device 105b to display a message notifying that the order has not been accepted because the authentication failed and subsequently terminates the execution of the order processing.

In contrast, when the data communication circuit 104a of the terminal device 100 receives an acceptance report when or before a predetermined period has elapsed since the data communication circuit 104a sent the authentication request, the CPU 101 of the terminal device 100 determines that the order has been accepted because the authentication succeeded (step S02; Yes). Next, the CPU 101 sleeps until the data communication circuit 104a receives cart information relating to a shopping cart of the authenticated user. When the data communication circuit 104a receives cart information, the CPU 101 returns from the sleep mode and acquires the cart information from the data communication circuit 104a (step S03).

In the present embodiment, a statement that a product is placed in a shopping cart of a user means that a product ID identifying a product the purchase of which is considered by the user is stored in the information processing device 200 in association with the user ID of the user. Thus, when one or a plurality of products is placed in the shopping cart of the user using the terminal device 100, the cart information of the user includes one or a plurality of product IDs that the information processing device 200 stores in association with the user ID of the user. In contrast, when no product is placed in the shopping cart of the user and the shopping cart is empty, the cart information of the user does not include a product ID.

Thus, when acquiring cart information, the CPU 101 of the terminal device 100 determines whether or not a product is placed in the shopping cart, based on whether or not a product ID is included in the acquired cart information.

In the present embodiment, in order to simplify the description, the following description will be made using, as a specific example, a case where no product is placed in the shopping cart because the user of the terminal device 100 causes the sale app to be executed for the first time. Thus, the CPU 101 of the terminal device 100 determines that no product is placed in the shopping cart because no product ID is included in the cart information. Next, the CPU 101 acquires a search screen that is used for a search for a product targeted by an order, from the flash memory 103b. Subsequently, the CPU 101 performs setting to disable an object, such as a button object and a link, that is used in an operation to purchase a product that is placed in the shopping cart (hereinafter, referred to as a purchase operation), on the search screen.

In contrast, the CPU 101 of the terminal device 100 performs setting to enable an object that is used in an operation to input a keyword used for a search for a product (hereinafter, referred to as a keyword input operation) and an object that is used in an operation to terminate the execution of the sale app (hereinafter, referred to as a termination operation), on the search screen. Subsequently, the CPU 101 causes the display device 105b to display the search screen in which the setting has been performed (step S04).

Subsequently, when the input device 105c of the terminal device 100 that is operated by the user who has visually recognized the search screen outputs a signal corresponding to the operation, the CPU 101 determines whether or not the keyword input operation is performed, based on the output signal (step S05).

In the present embodiment, the following description will be made using, as a specific example, a case where the keyword input operation is performed in order to search for a product to be targeted in an order. Thus, when the CPU 101 of the terminal device 100 determines that the keyword input operation is performed (step S05; Yes), the CPU 101 acquires a keyword, based on a signal output from the input device 105c. Next, the CPU 101 generates a search request that includes the acquired keyword and that requests sending of information indicating a result of a search for a product based on the keyword. Subsequently, the CPU 101 outputs the generated search request to the data communication circuit 104a with the information processing device 200 as the destination (step S06).

Although, in the present embodiment, the following description will be made assuming that a result of a search for a product based on a keyword includes an outline of each of one or a plurality of products found in a search based on the keyword and the outline of the product includes a product ID identifying the product and a name and price of the product, the present embodiment is not limited thereto.

When, after the data communication circuit 104a of the terminal device 100 has sent the search request to the information processing device 200, the data communication circuit 104a receives information indicating a search result from the information processing device 200, the CPU 101 of the terminal device 100 acquires the information from the data communication circuit 104a.

Next, the CPU 101 of the terminal device 100 acquires a search result screen that is used for displaying a search result, from the flash memory 103b. Subsequently, since, in step S04, the CPU 101 determined that no product was placed in the shopping cart, the CPU 101 performs setting to disable the object used in the purchase operation, on the search result screen.

On the other hand, the CPU 101 of the terminal device 100 performs setting to enable an object that is used in an operation (hereinafter, referred to as a product selection operation) on the search result screen. The product selection operation is an operation to (i) select a product from among one or a plurality of products found in the search and (ii) cause a detail screen to be displayed in which a more detailed description of the selected product than an outline thereof is described. In addition, the CPU 101 performs setting to enable the object used in the termination operation, on the search result screen. Subsequently, the CPU 101 causes the display device 105b to display the search result screen in which the setting has been performed (step S07).

Subsequently, when the input device 105c of the terminal device 100 that is operated by the user who has visually recognized the search result screen outputs a signal corresponding to the operation, the CPU 101 determines whether or not the product selection operation is performed, based on the signal (step S08).

In the present embodiment, the following description will be made using, as a specific example, a case where the user has performed the product selection operation in order to determine whether or not one of the one or plurality of products found in the search is a desired product. Thus, when the CPU 101 of the terminal device 100 determines that the product selection operation is performed (step S08; Yes), the CPU 101 acquires a product ID of the selected product, based on a signal output from the input device 105c. Next, the CPU 101 generates a detail send request that includes the acquired product ID and that requests sending of detail information indicating a detailed description of a product identified by the product ID. Subsequently, the CPU 101 outputs the generated detail send request to the data communication circuit 104a with the information processing device 200 as the destination (step S09). Although, in the present embodiment, a detailed description of a product includes a description of any one or more of a color, shape, size, method of use, condition of use, method of sale, and condition of sale of the product, the present embodiment is not limited thereto.

When the data communication circuit 104a of the terminal device 100, after having sent the detail send request to the information processing device 200, receives detail information of the product from the information processing device 200, the CPU 101 of the terminal device 100 acquires the detail information from the data communication circuit 104a.

Next, the CPU 101 of the terminal device 100 executes processing in step S10 of causing a detail screen that is used for displaying a detailed description to be displayed (step S10). In the processing in step S10, the CPU 101 performs determination of whether or not a product is placed in the shopping cart. The reason why the determination is performed in step S10 is that, since there is a case where the processing in step S10 is executed for a second time after a consideration operation to place a product into the shopping cart has been performed, there is a possibility that a result different from a result of the determination performed in step S04 is acquired in step S10.

In the present embodiment, since no consideration operation has been performed since, in step S04, it was determined that no product was in the shopping cart, the CPU 101 of the terminal device 100 determines that no product is placed in the shopping cart. Thus, the CPU 101 acquires the detail screen from the flash memory 103b and performs setting to disable the object used in the purchase operation to purchase a product in the shopping cart, on the detail screen.

On the other hand, the CPU 101 of the terminal device 100 performs setting to enable the object on the detail screen. The object is used in the consideration operation to place a product the purchase of which is considered into the shopping cart. In addition, in order to perform a search for a product again, the CPU 101 performs setting, on the detail screen, to enable an object that is used in an operation to cause the search screen to be redisplayed (hereinafter, referred to as a redisplay operation). Further, the CPU 101 performs setting, on the detail screen, to enable the object that is used in the termination operation. Subsequently, the CPU 101 adds a detailed description of a product represented by the acquired detail information to the detail screen in which the setting has been performed and causes the display device 105b to display the detail screen to which the description has been added.

Subsequently, when the input device 105c of the terminal device 100 that is operated by the user who has visually recognized the detail screen outputs a signal corresponding to the operation, the CPU 101 determines whether or not the consideration operation is performed, based on the signal (step S11).

In the present embodiment, the following description will be made using, as a specific example, a case where the consideration operation is performed. Thus, when the CPU 101 of the terminal device 100 determines that the consideration operation is performed (step S11; Yes), the CPU 101 adds, to the cart information acquired in step S03, the product ID of a product the purchase of which is considered. Subsequently, the CPU 101 generates a consideration report that includes the product ID added to the cart information and that announces that purchase of a product identified by the product ID is considered.

Next, the CPU 101 of the terminal device 100 outputs the generated consideration report to the data communication circuit 104a with the information processing device 200 as the destination (step S12). The information processing device 200 having received the consideration report stores the product ID included in the consideration report in association with the user ID of the user using the terminal device 100. This operation causes a product identified by the product ID to be placed into the shopping cart of the user.

Subsequently, the CPU 101 of the terminal device 100 returns to step S10, performs determination of whether or not a product is placed in the shopping cart, and determines that a product is placed in the shopping cart. Thus, the CPU 101 performs setting to enable the object used in the purchase operation to purchase the product in the shopping cart, the object used in the redisplay operation, and the like, on the detail screen. Subsequently, the CPU 101 causes the display device 105b to display the detail screen in which the setting has been performed (step S10).

In the present embodiment, the following description will be made using, as a specific example, a case where, subsequently, the redisplay operation is performed to cause the search screen to be redisplayed in order to search for a product different from the product added to the shopping cart. Thus, the CPU 101 of the terminal device 100 determines that neither the consideration operation nor the termination operation is performed and the redisplay operation is performed (step S11; No, step S13; No, and step S14; Yes).

Subsequently, the CPU 101 of the terminal device 100 returns to step S04, acquires the search screen, determines that a product is placed in the shopping cart, and performs setting, on the search screen, to enable objects used in the purchase operation, the keyword input operation, and the like. Subsequently, the CPU 101 causes the display device 105b to display the search screen in which the setting has been performed (step S04).

When the keyword input operation is performed on the input device 105c in order to search for a product different from the product added to the shopping cart, the CPU 101 of the terminal device 100 determines that the keyword input operation is performed (step S05; Yes) and executes the processing in steps S06 and S07 (steps S06 and S07). Through this processing, the CPU 101 causes the search result screen to be displayed in which the objects used in the product selection operation, the purchase operation, and the like have been enabled.

In the present embodiment, the following description will be made using, as a specific example, a case where the user who has visually recognized the search result screen has not been able to find a product that is a product different from the product having been placed in the cart and that the user desires to purchase, from the search result. Thus, the user does not perform the product selection operation and performs the purchase operation in order to purchase only the product placed in the cart.

Thus, the CPU 101 of the terminal device 100 determines, based on a signal output from the input device 105c, that none of the product selection operation, the termination operation, and the redisplay operation is performed (step S08; No, step S13; No, and step S14; No) and that the purchase operation is performed (step S15). Subsequently, the CPU 101 generates an order completion request that includes the user ID and that requests completing the order of the user identified by the user ID.

In the present embodiment, completing an order of a user means concluding an agreement on selling a product placed in the shopping cart of the user to the user and transporting the sold product to a transport destination specified by the user, between the user and a sales company of the product. Subsequently, the CPU 101 outputs the generated order completion request to the data communication circuit 104a with the information processing device 200 as the destination (step S16) and subsequently terminates the execution of the order processing.

Figure 4:
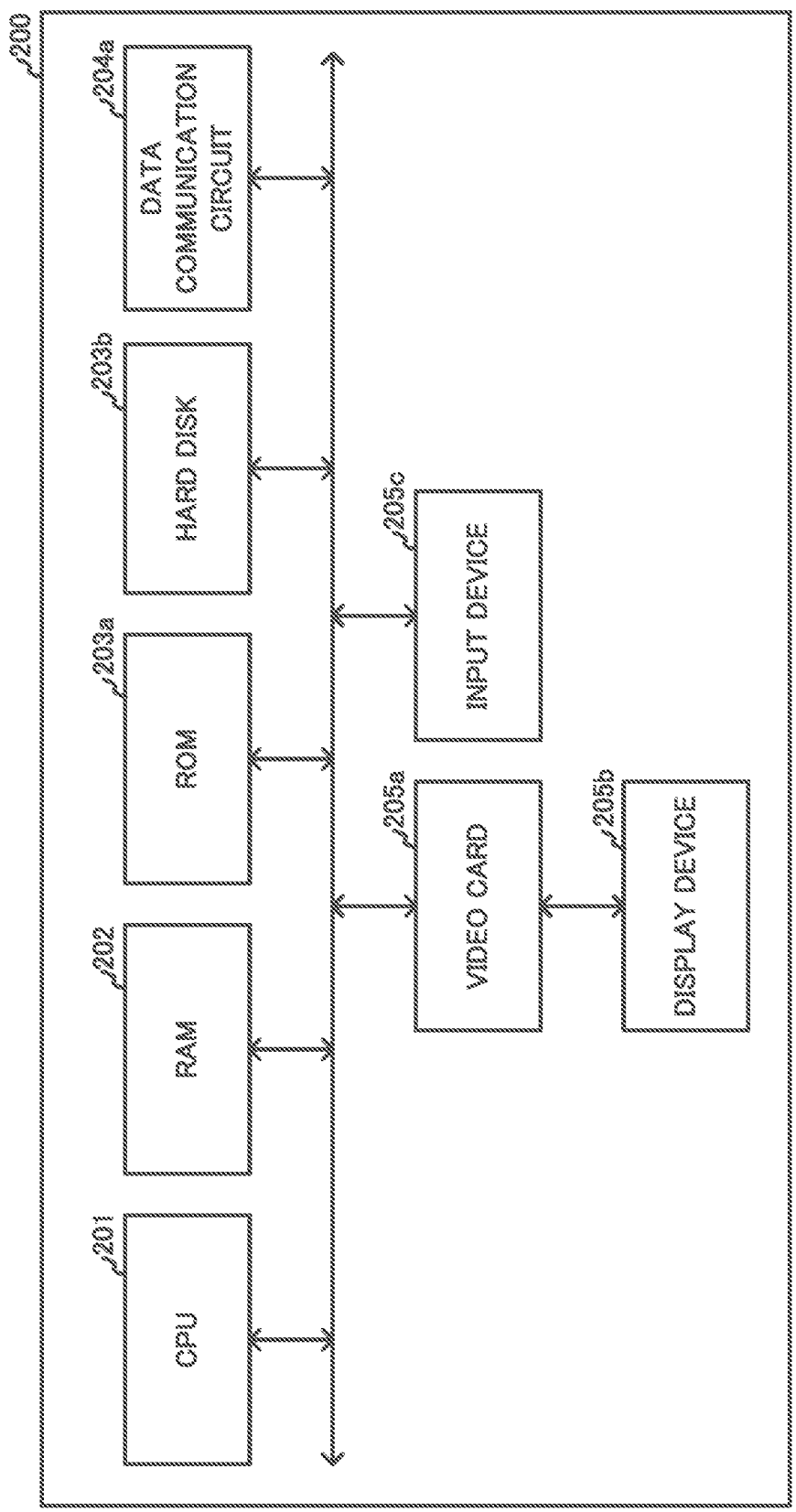
FIG. 4 is a hardware configuration diagram illustrating a configuration example of an information processing device that is installed in a warehouse.

The information processing device 200 is a server machine and is installed in a warehouse or an office building of a sales company selling products. The information processing device 200 includes a CPU 201, a RAM 202, a ROM 203a, a hard disk 203b, a data communication circuit 204a, a video card 205a, a display device 205b, and an input device 205c, which are hardware components, as illustrated in FIG. 4. Although, in the present embodiment, the information processing device 200 includes one CPU 201, the information processing device 200 may include a plurality of CPUs. In addition, the information processing device 200 may include a plurality of RAMs and may include a plurality of flash memories.

Configurations and functions of the CPU 201, the RAM 202, the ROM 203a, the data communication circuit 204a, the video card 205a, and the display device 205b that the information processing device 200 includes are the same as the configurations and functions of the CPU 101, the RAM 102, the ROM 103a, the data communication circuit 104a, the video card 105a, and the display device 105b, illustrated in FIG. 2, that the terminal device 100 includes, respectively.

The hard disk 203b of the information processing device 200 stores various types of programs, various types of data used in execution of the various types of programs, and tables in which data are stored. The information processing device 200 may include a flash memory in place of the hard disk 203b.

The input device 205c of the information processing device 200 is one or more of a keyboard, a mouse, a touch pad, and a button and inputs a signal corresponding to an operation by an employee of the sales company.

Figure 6A:
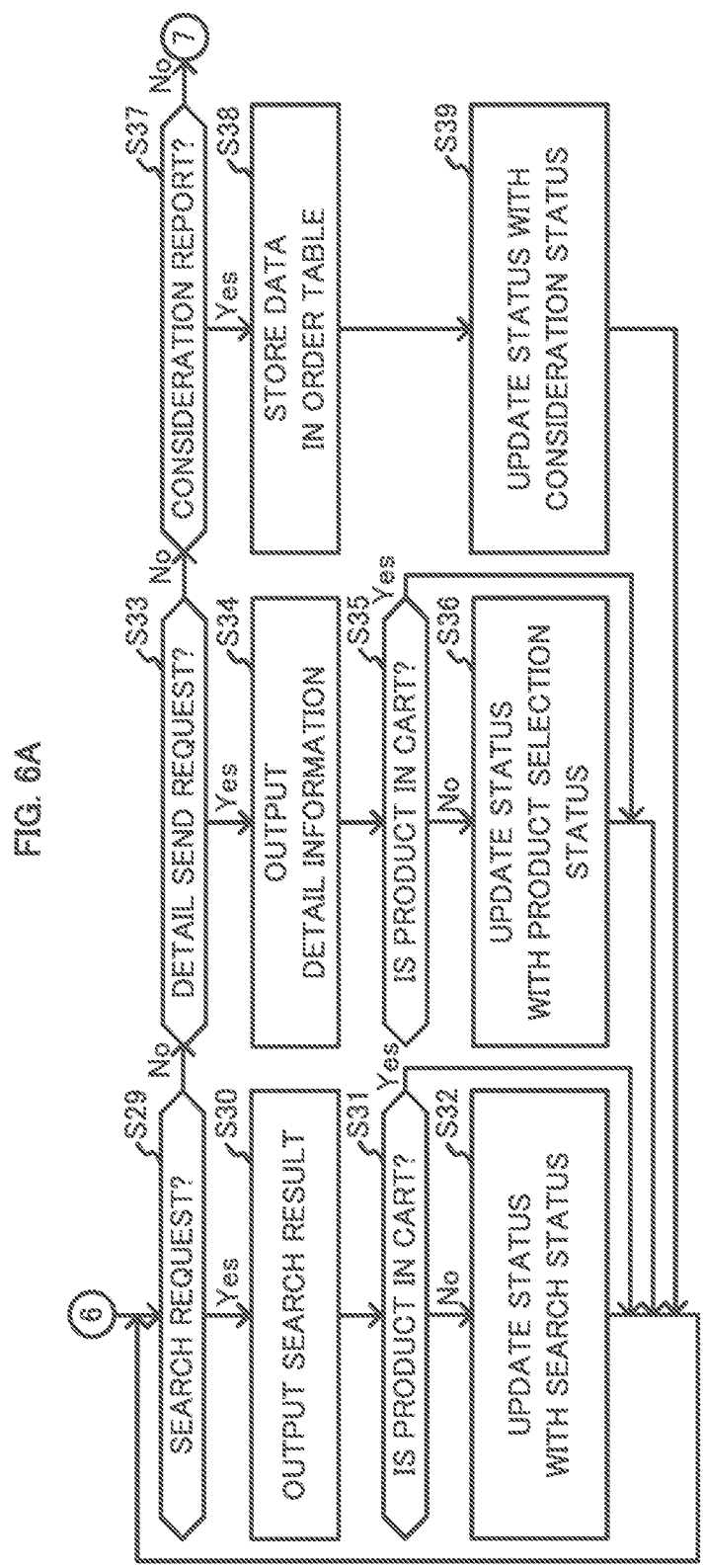
FIGS. 6A and 6B are another portion of the flowchart illustrating the example of the sale processing that the information processing device in the warehouse executes.
Figure 6B:
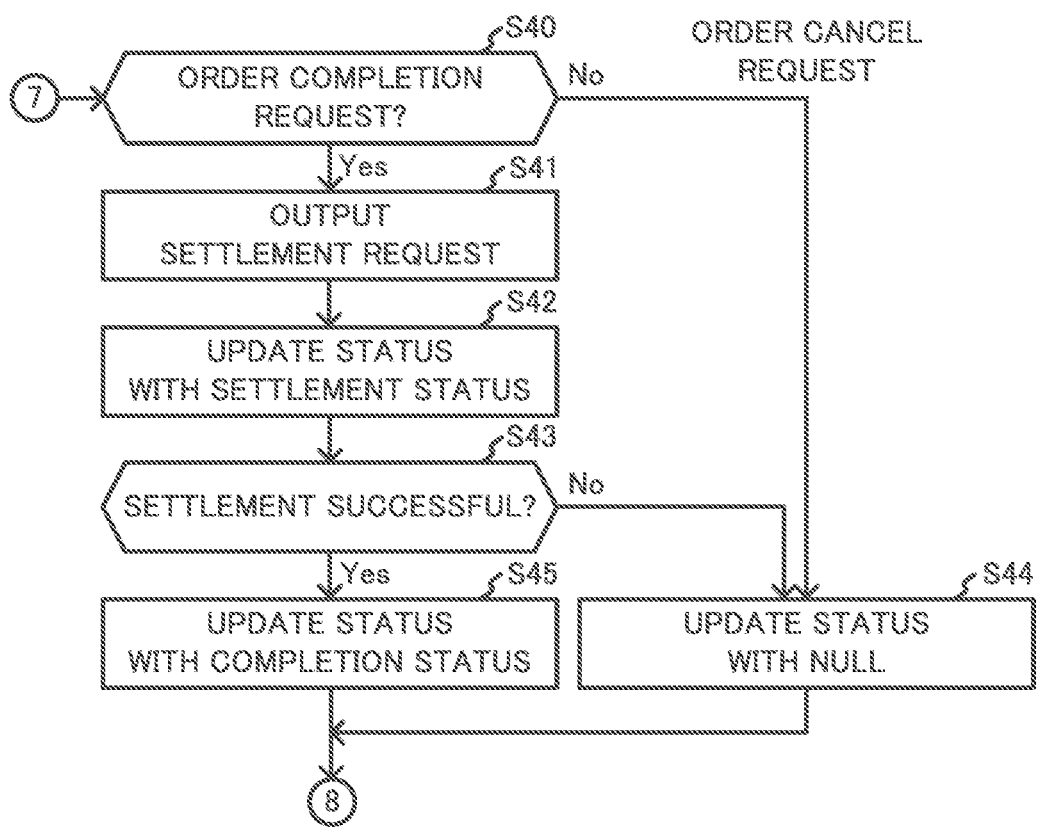

When the data communication circuit 204a of the information processing device 200 receives an order acceptance request output in step S01 in FIG. 3A, the CPU 201 of the information processing device 200 acquires the order acceptance request from the data communication circuit 204a. Next, the CPU 201 acquires a service ID from the acquired order acceptance request and, when determining that the acquired service ID is a service ID of the sale service, executes sale processing as illustrated in FIGS. 5, 6A, and 6B in order to provide the sale service.

Through this processing, the CPU 201 of the information processing device 200 functions as an acquirer 210 that acquires authentication information of the user requesting provision of the sale service and an authenticator 220 that performs authentication, based on the acquired authentication information, as illustrated in FIG. 7. In addition, the CPU 201 of the information processing device 200 functions as an updater 230 that updates a status of an order that is made by the user who has succeeded in the authentication. Further, the CPU 201 functions as a selector 240 that selects a vehicle that is caused to transport a product targeted by an order (hereinafter, referred to as a transport vehicle) from among the vehicles 800 and 900.

The hard disk 203b of the information processing device 200 functions as an information storage 290 that stores information used in the execution of the sale processing. The information storage 290 of the information processing device 200 stores, in advance, a status table, as illustrated in FIG. 8, in which information about statuses of an order is stored in advance.

In the present embodiment, the status of an order is caused to transition to a completion status that is a state in which the order is completed, by way of a plurality of statuses preceding the completion status. Statuses preceding the completion status include a service selection status that is a state in which a sale service of performing sale and transport of a product targeted by an order is selected, a search status that is a state in which one or a plurality of products is found in a search, a product selection status that is a state in which one of the one or plurality of products found in the search is selected, a consideration status that is a state in which purchase of a product is considered, and a settlement status that is a state in which settlement of a purchase price of a product is being made. Although, in the present embodiment, a state in which settlement of a purchase price of a product is being made means a state from the time when settlement of the purchase price is requested until the settlement succeeds or fails, the present embodiment is not limited thereto.

Therefore, a plurality of records is stored in the status table in advance, and, in the first record of the status table, a status ID "S1" identifying the service selection status and information representing a name of the service selection status are associated with each other in advance and stored. In addition, in the second record, a status ID "S2" of the search status and information representing a name of the search status are stored in advance, and, in the third record, a status ID "S3" of the product selection status and information representing a name of the product selection status are stored in advance. Further, in the fourth record, a status ID "S4" of the consideration status and information representing a name of the consideration status are stored in advance, and, in the fifth record, a status ID "S5" of the settlement status and information representing a name of the settlement status are stored in advance. In addition, in the sixth record, a status ID "S6" of the completion status and information representing a name of the completion status are stored in advance.

Further, the information storage 290 of the information processing device 200 stores, in advance, a user table, as illustrated in FIG. 9, in which information about users is stored in advance. A plurality of records is stored in the user table in advance, and, in each record, a user ID identifying a user, information indicating a password that the user has set in advance, information indicating a transport destination in an address, and settlement information used in the settlement of a purchase price of the user are associated with one another in advance and stored. Although, in the present embodiment, it will be described that a transport destination is the entrance to an apartment where a user who uses the terminal device 100 lives, the present embodiment is not limited thereto. Although the settlement information includes, for example, information indicating the card number of a credit card that the user uses for the settlement of a purchase price and information indicating a validity period, the present embodiment is not limited thereto.

Further, the information storage 290 of the information processing device 200 stores, in advance, an order table, as illustrated in FIG. 10, in which information about orders is stored. A plurality of records is stored in the order table in advance, and, in each record of the order table, the user ID of a user who makes an order is stored in advance. A user ID stored in each record may be the user ID of a user whose order has been accepted or the user ID of a user whose order has not been accepted yet.

In a record in which the user ID of a user whose order has been accepted is stored, a status ID identifying a status of the order and a product ID of a product that is placed in the shopping cart of the user are stored in association with the user ID. In addition, in the record in which the user ID is stored, a vehicle ID identifying the vehicle 800 or 900 that is selected as a transport vehicle caused to transport the product is stored in association with the user ID. Further, in the record in which the user ID is stored, a non-execution flag indicating whether or not movement control has not been executed is stored in association with the user ID. The movement control is control of the transport vehicle 800 or 900 according to the status.

In the present embodiment, the movement control of the transport vehicle 800 or 900 is control to suppress an increase in movement distance from a location of the vehicle 800 or 900 to a start location of transport and is control that is performed according to the status of an order. Although, in the present embodiment, the movement control may be performed according to a status before the status is caused to transition to the completion status or performed according to the completion status, the present embodiment is not limited thereto. Although the movement control is performed according to a status before the status is caused to transition to the completion status, the movement control does not have to be performed according to the completion status.

In contrast, in a record in which the user ID of a user whose order has not been accepted is stored, character strings "NULL" that, since the order has not been accepted, respectively indicate that no status exists, that no product is placed in the cart, that no vehicle caused to transport a product is selected, and that no movement control according to the status exists are stored in association with the user ID.

When the execution of the sale processing illustrated in FIGS. 5, 6A, and 6B is started, the acquirer 210 of the information processing device 200 acquires an order acceptance request from the data communication circuit 204a of the information processing device 200 and acquires authentication information of the user from the acquired order acceptance request (step S21). Next, the acquirer 210 acquires information indicating a password associated with a user ID included in the authentication information from the user table in FIG. 9. Subsequently, when the authenticator 220 determines that the password indicated by the information acquired from the user table and a password indicated by information included in the authentication information do not coincide with each other, the authenticator 220 determines that the user authentication has failed (step S22; No) and terminates the execution of the sale processing without accepting the order.

In contrast, when the authenticator 220 of the information processing device 200 determines that the two passwords coincide with each other, the authenticator 220 determines that the authentication of the user who uses the terminal device 100 has succeeded (step S22; Yes). Next, the updater 230 determines whether or not a product is placed in the cart of the user, based on whether or not a product ID is associated with the user ID identifying the user of the terminal device 100 in the order table in FIG. 10 (step S23).

In the present embodiment, the sale processing in FIGS. 5, 6A, and 6B will be described using the same example as the specific example having been used for describing the order processing in FIGS. 3A and 3B (hereinafter, referred to as a specific example of the order processing). Therefore, the updater 230 of the information processing device 200 determines that no product is placed in the shopping cart because no product ID is associated with the user ID identifying the user of the terminal device 100 and the character string "NULL" is associated with the user ID in the order table in FIG. 10 (step S23; No).

Next, the updater 230 of the information processing device 200 updates, in the order table, the character string "NULL" that is associated with the user ID of the user and that indicates that no order has been accepted, with the status ID "S1" of the service selection status, which is a state in which the sale service is selected (step S25). Through this processing, the updater 230 accepts the order in accordance with the order acceptance request and sets the status of the accepted order to the service selection status. Subsequently, the updater 230 outputs an acceptance report announcing that the order is accepted, to the data communication circuit 204a with the terminal device 100 as the destination (step S26).

Next, the acquirer 210 of the information processing device 200 acquires the character string "NULL" as a product ID associated with the user ID of the user using the terminal device 100 in the order table and generates cart information including the acquired character string "NULL". Next, the acquirer 210 outputs the generated cart information to the data communication circuit 204a with the terminal device 100 as the destination (step S27).

Next, the acquirer 210 of the information processing device 200 acquires information indicating a start location at which transport of a product is started (hereinafter, referred to as a start location of transport) from the information storage 290. Although, in the present embodiment, the start location of transport is a location of a shipping door of a warehouse in which the product is stored, the present embodiment is not limited thereto.

Next, the selector 240 of the information processing device 200 generates a location send request requesting sending of location information indicating the location of the vehicle 800 and outputs the generated location send request to the data communication circuit 204a with the vehicle 800 as the destination. When the data communication circuit 204a, after having sent the location send request to the vehicle 800, receives location information of the vehicle 800, the acquirer 210 acquires the location information from the data communication circuit 204a.

The selector 240 of the information processing device 200 outputs a location send request with the vehicle 900 as the destination, and the acquirer 210 acquires location information of the vehicle 900. Subsequently, the selector 240 selects a transport vehicle that is caused to transport a product targeted by the order, based on the location of the vehicle 800, the location of the vehicle 900, and the start location of transport, indicated by the acquired location information (step S28).

In the present embodiment, the vehicles 800 and 900 autonomously move in circulation along a preset circulation route without being controlled by the information processing device 200 except while passing through a route set by the information processing device 200 and moving to the start location of transport, while transporting a product targeted by an order from the start location of transport to a transport destination, and while, after having finished transport of a product targeted by an order, returning to the start location of transport. The circulation route for the vehicles 800 and 900 is a predetermined ring-shaped route starting from the start location of a predetermined circulation route and ending at the start location of the circulation route. In the present embodiment, the start location of the circulation route is set to the same location as the start location of transport in advance.

A purpose of the vehicles 800 and 900 moving along the circulation route is to suppress reduction in use efficiency of a region in which the vehicles 800 and 900 park or come to a stop (hereinafter, referred to as a parking/stopping region) compared with a case where the vehicles 800 and 900, for example, park or have come to a stop in a region including the start location of transport, which is the location of the shipping door of the warehouse. Although, in the present embodiment, a use efficiency of a parking/stopping region is calculated by dividing area of a region that a person who uses the parking/stopping region can use by area of the parking/stopping region, the present embodiment is not limited thereto. In addition, although the area of the region that a person who uses the parking/stopping region can use includes area of a region within the parking/stopping region and in which no object, including the vehicles 800 and 900, is placed, the present embodiment is not limited thereto.

Although, in the present embodiment, the vehicles 800 and 900 moves along the circulation route with no load in order to suppress consumption of energy, the present embodiment is not limited thereto, and the vehicles 800 and 900 may move along the circulation route with a product stored therein. In this case, the vehicles 800 and 900 may, for example, move along the circulation route with samples or a specimen of the product stored therein in an unlocked state in such a way that a passer-by can take out the samples or specimen.

In addition, although, in the present embodiment, the circulation route is a route passing through a predetermined target area, the present embodiment is not limited thereto, and the circulation route may, for example, be set in advance in such a way as to include a plurality of purchase locations at which a predetermined product, which is the same as or different from a product targeted by the order, is regularly purchased. In this case, the vehicles 800 and 900 may move along the circulation route with the predetermined products stored therein in such a way as to arrive at each of the plurality of purchase locations at a time predetermined with respect to each of the plurality of purchase locations.

In addition, the circulation route may, for example, be set in advance in such a way as to include a plurality of distribution locations at each of which a sample or specimen of a product is distributed. In this case, the vehicles 800 and 900 may move along the circulation route with samples or specimens of the product stored therein in such a way as to arrive at each of the plurality of distribution locations at a time predetermined with respect to each of the plurality of distribution locations or at a time determined based on, for example, software-generated random numbers or a predetermined rule.

Because of these configurations, the circulation route is set in advance in such a way as to have wider route width than a predetermined width in order to suppress contact between a person who makes regular purchase or a passer-by and the vehicles 800 and 900. In addition, the circulation route is set in advance in such a way as to have a smaller altitude difference than a predetermined altitude difference in order to suppress a consumed amount of energy required for the vehicles 800 and 900 to perform circulation movement.

The selector 240 of the information processing device 200 executes processing of determining whether or not the vehicle IDs of the vehicles 800 and 900 are stored in the order table in FIG. 10. When, on this occasion, the selector 240 determines that the vehicle ID of the vehicle 800 and the vehicle ID of the vehicle 900 are not stored as a vehicle ID of a transport vehicle in the order table, the selector 240 determines that both the vehicle 800 and the vehicle 900 are selectable as a transport vehicle.

Next, the acquirer 210 of the information processing device 200 acquires information indicating the circulation route that the information storage 290 stores in advance. The information indicating the circulation route includes information indicating locations of a plurality of nodes included in the circulation route in latitude, longitude, and altitude and information indicating a visiting sequence of the plurality of nodes. Subsequently, the selector 240 of the information processing device 200 calculates a shortest distance on the circulation route from the location of the vehicle 800 to the start location, based on the acquired information indicating the circulation route, location information of the vehicle 800, and information indicating the start location. In the present embodiment, the shortest distance on the circulation route means the shorter one between a distance on the circulation route measured in a predetermined forward direction and a distance on the circulation route measured in a backward direction opposite to the forward direction.

Next, the selector 240 of the information processing device 200 calculates a shortest distance on the circulation route from the location of the vehicle 900 to the start location. Subsequently, when the shortest distance of the vehicle 800 is equal to or less than the shortest distance of the vehicle 900, the selector 240 selects the vehicle 800 as a transport vehicle. In contrast, when the shortest distance of the vehicle 800 is longer than the shortest distance of the vehicle 900, the selector 240 selects the vehicle 900.

In contrast, when the selector 240 of the information processing device 200 determines that, although the vehicle ID of the vehicle 800 is not stored, the vehicle ID of the vehicle 900 is stored in the order table in FIG. 10, the selector 240 determines that, although the vehicle 900 cannot be selected, the vehicle 800 is selectable as a transport vehicle. Thus, the selector 240 selects the vehicle 800 as a transport vehicle. In contrast, when the selector 240 determines that, although the vehicle ID of the vehicle 800 is stored, the vehicle ID of the vehicle 900 is not stored in the order table, the selector 240 selects the vehicle 900 as a transport vehicle. Further, in contrast, when the selector 240 determines that the vehicle IDs of the vehicles 800 and 900 are stored in the order table, the selector 240 determines that it is impossible to select a transport vehicle. Subsequently, the selector 240 sleeps for a predetermined amount of time and subsequently repeats the above-described process from the processing of determining whether or not the vehicle IDs of the vehicles 800 and 900 are stored in the order table.

When the selector 240 of the information processing device 200 selects the vehicle 800 or 900 as a transport vehicle, the updater 230 stores the vehicle ID of the selected vehicle 800 or 900 in the order table as the vehicle ID of the transport vehicle in association with a user ID identifying the user of the terminal device 100.

Subsequently, the acquirer 210 of the information processing device 200 sleeps until the data communication circuit 204a of the information processing device 200 receives data from the terminal device 100. In the specific example of the order processing, a search request requesting a search for a product based on a keyword is first sent from the terminal device 100. Therefore, when the data communication circuit 204a of the information processing device 200 receives the search request output in step S06 in FIG. 3A, the acquirer 210 returns from the sleep mode, acquires the received data from the data communication circuit 204a, and determines that the acquired data is a search request (step S29; Yes).

Subsequently, the acquirer 210 of the information processing device 200 acquires a keyword from the acquired search request and searches a not-illustrated product table that the information storage 290 stores in advance for outline information indicating outline of one or a plurality of products associated with the acquired keyword. A plurality of records is stored in the product table in advance, and, in each record, a keyword describing a product, outline information of the product, and detail information of the product are associated with one another in advance and stored.

Subsequently, the acquirer 210 of the information processing device 200 generates information indicating a search result including the outline information of one or a plurality of products found in the search and outputs the generated information to the data communication circuit 204a with the terminal device 100 as the destination (step S30).

Next, the updater 230 of the information processing device 200, by executing the same processing as the processing in step S23, determines whether or not a product is placed in the shopping cart (step S31). The reason why the determination is performed in step S31 is that, since, when a search request is repeatedly received, the processing in step S31 is repeatedly executed, there is a possibility that a result different from a result of the determination performed in step S23 is acquired in step S31.

In the specific example of the order processing, no product is placed into the shopping cart from the time when it is determined, in step S23, that no product is placed in the shopping cart until a first search request is sent. Thus, the updater 230 of the information processing device 200 determines that no product is placed in the shopping cart (step S31; No). Subsequently, the updater 230 updates, in the order table in FIG. 10, the status ID associated with the user ID identifying the user of the terminal device 100 with the status ID "S2" of the search status, which is a state in which a search for a product to be targeted by the order is made (step S32). Through this processing, the updater 230 causes the status of the order to transition to the search status. Subsequently, the information processing device 200 returns to step S29 and repeats the above-described process from the processing of sleeping until data is received.

Next, in the specific example of the order processing, a detail send request requesting sending of detail information of a product found in a search is sent from the terminal device 100. Thus, when the data communication circuit 204a of the information processing device 200 receives the detail send request output in step S09 in FIG. 3A, the acquirer 210 returns from the sleep mode and acquires the received data from the data communication circuit 204a. Next, the acquirer 210 determines that the received data is not a search request, but a detail send request (step S29; No and step S33; Yes). Next, the acquirer 210 acquires the product ID of a product selected by the user, from the acquired detail send request and acquires detail information associated with the product ID from the not-illustrated product table that the information storage 290 stores. Subsequently, the acquirer 210 outputs the acquired detail information to the data communication circuit 204a with the terminal device 100 as the destination (step S34).

Next, when the updater 230 of the information processing device 200 determines that no product is placed in the shopping cart (step S35; No), the updater 230 updates, in the order table in FIG. 10, the status ID associated with the user ID identifying the user of the terminal device 100 with the status ID "S3" of the product selection status, which is a state in which a product is selected (step S36). Through this processing, the updater 230 causes the status of the order to transition to the product selection status. Subsequently, the information processing device 200 returns to step S29 and repeats the above-described process from the processing of sleeping until data is received.

Next, in the specific example of the order processing, a consideration report announcing that purchase of a product is considered is sent from the terminal device 100. Thus, when the data communication circuit 204a of the information processing device 200 receives the consideration report output in step S12 in FIG. 3A, the acquirer 210 returns from the sleep mode and acquires the received data from the data communication circuit 204a. Next, the acquirer 210 determines that the received data is neither a search request nor a detail send request, but a consideration report (step S29; No, step S33; No, and step S37; Yes). Subsequently, the acquirer 210 acquires the product ID of the product the purchase of which is considered from the acquired consideration report. Next, the updater 230 stores the acquired product ID in the order table in FIG. 10 in association with the user ID identifying the user of the terminal device 100 (step S38). This operation causes a product identified by the product ID to be placed into the shopping cart of the user.

Subsequently, the updater 230 of the information processing device 200 updates, in the order table, the status ID associated with the user ID of the user with the status ID "S4" of the consideration status, which is a state in which purchase of a product is considered (step S39). Through this processing, the updater 230 causes the status of the order to transition to the consideration status.

Next, the updater 230 of the information processing device 200 updates, in the order table, the value of a non-execution flag associated with the user ID with a value "true" indicating that movement control corresponding to the consideration status has not been executed. Subsequently, the information processing device 200 returns to step S29 and repeats the above-described process from the processing of sleeping until data is received.

Next, in the specific example of the order processing, a search request is sent from the terminal device 100. The reason why a search request is sent is to cause the information processing device 200 to search for a product different from the product placed in the shopping cart. Thus, when receiving a search request, the information processing device 200, by returning from the sleep mode and executing the processing in steps S29 and S30 (steps S29 and S30), outputs information indicating a result of a search performed in response to the search request. Subsequently, the updater 230 of the information processing device 200 determines that a product is placed in the shopping cart (step S31; Yes) and, without causing the status of the order to transition to the search status, maintains the status of the order in the consideration status. Subsequently, the information processing device 200 returns to step S29 and repeats the above-described process from the processing of sleeping until data is received.

Next, in the specific example of the order processing, an order completion request is sent from the terminal device 100. The reason why an order completion request is sent is that the user of the terminal device 100 who has visually recognized the search result has decided to purchase only the product placed in the shopping cart. Thus, when the data communication circuit 204a of the information processing device 200 receives the order completion request output in step S16 in FIG. 3B, the acquirer 210 returns from the sleep mode and acquires the received data from the data communication circuit 204a. Next, the acquirer 210 determines that the acquired data is none of a search request, a detail send request, and a consideration report, but an order completion request (step S29; No, step S33; No, step S37; No, and step S40; Yes).

Next, the acquirer 210 of the information processing device 200, by acquiring a product ID associated with the user ID identifying the user of the terminal device 100 in the order table in FIG. 10, identifies a product targeted by the order. Next, the acquirer 210 acquires outline information associated with the acquired product ID and acquires information indicating a price of the product from the acquired outline information, in the not-illustrated product table, which the information storage 290 stores. Subsequently, the acquirer 210 calculates the sum of a purchase price that the user pays to purchase the product targeted by the order, based on the price indicated by the acquired information.

Next, the acquirer 210 of the information processing device 200 acquires settlement information associated with the user ID of the user in the user table in FIG. 9. Subsequently, the acquirer 210 generates a settlement request that includes the acquired settlement information and information indicating the calculated sum of the purchase price and that requests settlement of the sum of the purchase price by use of the settlement information. Next, the acquirer 210 acquires a URL of a settlement server that the information storage 290 stores in advance and outputs the generated settlement request to the data communication circuit 204a with the acquired URL as the destination (step S41).

Next, the updater 230 of the information processing device 200 updates, in the order table in FIG. 10, the status ID associated with the user ID identifying the user of the terminal device 100 with the status ID "S5" of the settlement status (step S42). Through this processing, the updater 230 causes the status of the order to transition to the settlement status. Next, the updater 230 updates, in the order table, the value of the non-execution flag associated with the user ID with the value "true" indicating that movement control corresponding to the settlement status has not been executed.

When the data communication circuit 204a of the information processing device 200, after having sent the settlement request to the settlement server, receives a settlement failure report announcing failure in settlement, the updater 230 of the information processing device 200 determines that the settlement has not succeeded (step S43; No) and determines to cancel the order.

Thus, the updater 230 updates, in the order table, the status ID associated with the user ID identifying the user of the terminal device 100 with the character string "NULL" indicating that the order has not been accepted (step S44). Through this processing, the updater 230 causes the status of the order to transition to a state in which the order has not been accepted.

In addition, the updater 230 of the information processing device 200 updates the vehicle ID and the non-execution flag associated with the user ID with the character string "NULL". On the other hand, the updater 230 does not update the product ID associated with the user ID with the character string "NULL" and maintains the current product ID. This operation causes a product identified by the product ID to be maintained, kept placed in the shopping cart.

Subsequently, the updater 230 of the information processing device 200 outputs a message announcing that the settlement has failed and the order is canceled to the data communication circuit 204a with the terminal device 100 as the destination and subsequently terminates the execution of the sale processing. When the data communication circuit 104a of the terminal device 100 receives the message, the CPU 101 of the terminal device 100 causes the display device 105b to display the message. The user who has visually recognized the message, by, for example, increasing the spending limit of a credit card to which a number included in the settlement information is assigned, enables settlement using the credit card. Subsequently, the user, by performing the operation to start up the sale app and the purchase operation on the terminal device 100 again, causes the settlement of the purchase price of the product placed in the shopping cart to be made, using settlement information of the credit card that has been enabled to be used in settlement.

In contrast, when the data communication circuit 204a of the information processing device 200 receives a settlement success report announcing success in settlement, the updater 230 of the information processing device 200 determines that the settlement has succeeded (step S43; Yes). Subsequently, the updater 230 updates, in the order table, the status ID associated with the user ID identifying the user of the terminal device 100 with the status ID "S6" of the completion status (step S45). Through this processing, the updater 230, by causing the status of the order to transition to the completion status, completes the order. Next, the updater 230 updates, in the order table, the value of the non-execution flag associated with the user ID with the value "true" indicating that movement control corresponding to the completion status has not been executed. Subsequently, the updater 230 terminates the execution of the sale processing.

In the present embodiment, since the information processing device 200 completes the order after having determined that settlement has succeeded in step S43, the status of the order can be caused to transition to the completion status in step S45 only after having been caused to transition to the settlement status in step S42. In addition, in the present embodiment, since the information processing device 200 outputs a settlement request requesting settlement of a purchase price with respect to a product placed in the shopping cart in step S41, the status of the order can be caused to transition to the settlement status only after having been caused to transition to the consideration status in step S39. That is, the status of the order can be caused to transition from the consideration status to the completion status only after having passed through the settlement status.

Thus, probability of the status of the order being caused to transition from the settlement status to the completion status (hereinafter, referred to as probability of the settlement status) is higher than probability of the status of the order being caused to transition from the consideration status to the completion status (hereinafter, referred to as probability of the consideration status). In addition, time required for the status of the order to be caused to transition from the settlement status to the completion status (hereinafter, referred to as transition time of the settlement status) is shorter than time required for the status of the order to be caused to transition from the consideration status to the completion status (hereinafter, referred to as transition time of the consideration status).

Further, in the present embodiment, unless a product found in a search is selected, the product is not placed into the shopping cart. In addition, unless a search for a product is made, a product found in the search is not selected, and unless the sale service is selected, a search for a product targeted by an order is not made. Because of these restrictions, the status of the order can be caused to transition to the consideration status only after having been caused to transition to the product selection status in step S36, the status of the order can be caused to transition to the product selection status only after having been caused to transition to the search status in step S32, and the status of the order can be caused to transition to the search status only after having been caused to transition to the service selection status in step S25.

Because of these restrictions, probability of the status of the order being caused to transition from the search status to the completion status (hereinafter, referred to as probability of the search status) is higher than probability of the status of the order being caused to transition from the service selection status to the completion status (hereinafter, referred to as probability of the service selection status). In addition, probability of the status of the order being caused to transition from the product selection status to the completion status (hereinafter, referred to as probability of the product selection status) is higher than the probability of the search status, and the probability of the consideration status is higher than the probability of the product selection status.

For the same reason, time required for the status of the order to be caused to transition from the search status to the completion status (hereinafter, referred to as transition time of the search status) is shorter than time required for the status of the order to be caused to transition from the service selection status to the completion status (hereinafter, referred to as transition time of the service selection status). In addition, time required for the status of the order to be caused to transition from the product selection status to the completion status (hereinafter, referred to as transition time of the product selection status) is shorter than the transition time of the search status, and the transition time of the consideration status is shorter than the transition time of the product selection status.

Figure 11A:
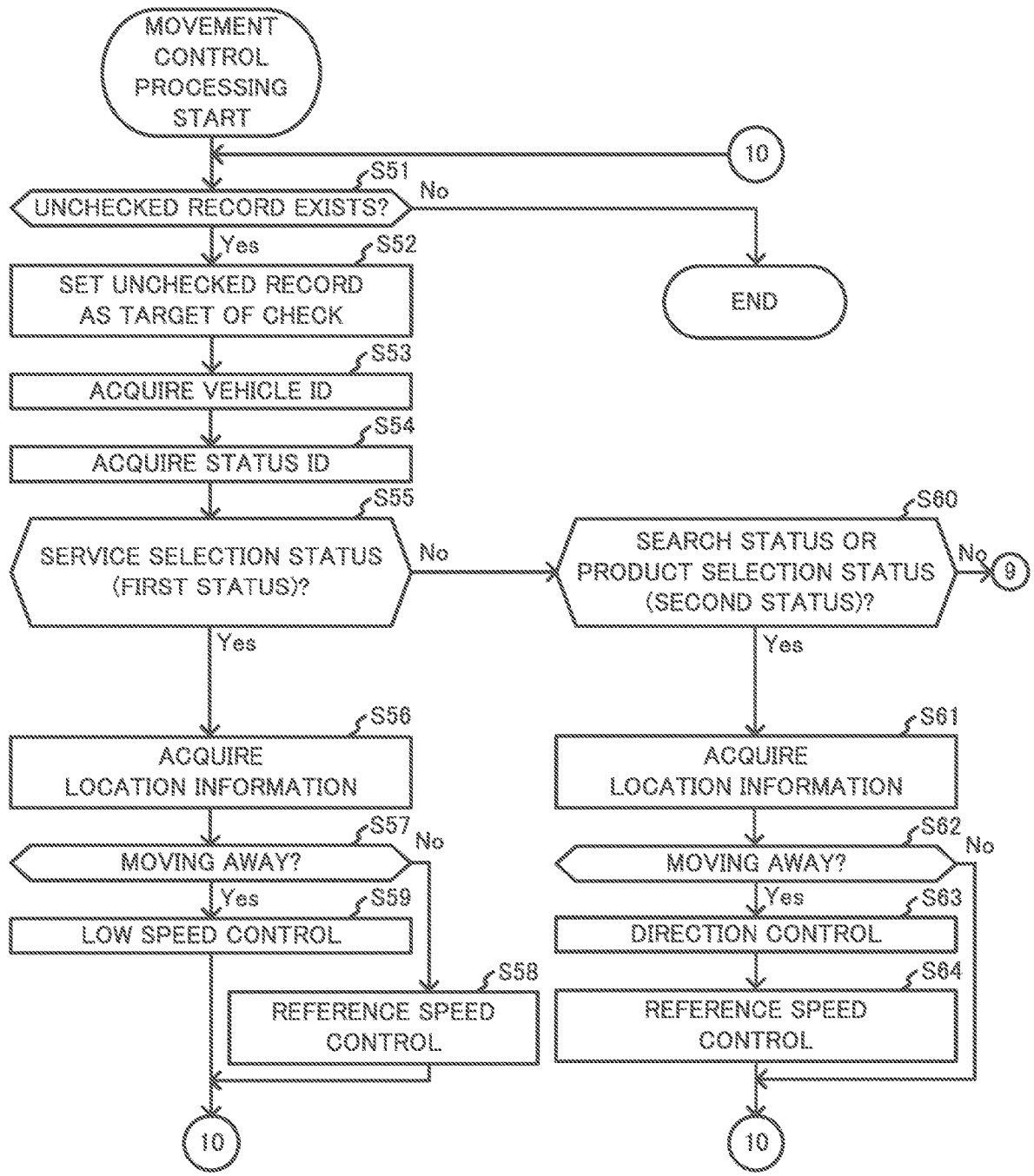

Because of these restrictions, the CPU 201 of the information processing device 200 executes movement control processing of controlling movement of the vehicle 800 or 900 according to the status of the order as illustrated in FIGS. 11A and 11B at a predetermined time interval. Through this processing, the CPU 201 of the information processing device 200 functions as a controller 250, as illustrated in FIG. 7, that performs movement control to suppress an increase in movement distance from the location of the vehicle 800 or 900 that is caused to transport a product, to the start location of transport, on the vehicle 800 or 900 according to the status of the order.

When the execution of the movement control processing in FIGS. 11A and 11B is started, the acquirer 210 of the information processing device 200 acquires, from the order table in FIG. 10, one or a plurality of records in each of which a status ID that is different from the character string "NULL", which indicates that an order has not been accepted, is stored. Next, the acquirer 210 determines whether or not there exists a record that has not been checked among the acquired one or plurality of records (step S51). When, on this occasion, the acquirer 210 determines that there exists a record that has not been checked (step S51; Yes), the acquirer 210 sets one of records that have not been checked, as a target of a check and sets the record as a checked record (step S52).

Next, the acquirer 210 of the information processing device 200 acquires a vehicle ID and a status ID of an order stored in the checked record (steps S53 and S54). Next, the acquirer 210 determines whether or not the acquired status ID is the status ID "S1" of the service selection status, which is also referred to as a first status (step S55).

When, on this occasion, the acquirer 210 of the information processing device 200 determines that the acquired status ID is the status ID "S1" of the first status (step S55; Yes), the acquirer 210 executes the same processing as the processing in step S28. Through this processing, the acquirer 210 acquires location information of the transport vehicle 800 or 900 identified by the acquired vehicle ID. In addition, when a predetermined period has elapsed since the location information was acquired, the acquirer 210 acquires the location information of the transport vehicle 800 or 900 again (step S56).

Next, the controller 250 of the information processing device 200, by executing the same processing as the processing in step S28, calculates a shortest distance on the circulation route from a location of the transport vehicle 800 or 900, the location being indicated by the location information acquired in the first round, to the start location of transport (hereinafter, referred to as a first-round distance) and a shortest distance on the circulation route from a location of the transport vehicle 800 or 900, the location being indicated by the location information acquired in the second round, to the start location of transport (hereinafter, referred to as a second-round distance).

Subsequently, the controller 250 of the information processing device 200 determines whether or not the transport vehicle 800 or 900 moves away from the start location of transport, based on whether or not the first-round distance is shorter than the second-round distance (step S57). When, on this occasion, the controller 250 of the information processing device 200 determines that the transport vehicle 800 or 900 does not move away from the start location because length of the first-round distance is equal to or greater than length of the second-round distance (step S57; No), the acquirer 210 acquires information indicating a reference speed that the information storage 290 stores in advance.

Next, the controller 250 of the information processing device 200 performs speed control to cause the transport vehicle 800 or 900 to change movement speed thereof to the reference speed indicated by the acquired information (hereinafter, referred to as reference speed control) (step S58). For this purpose, the controller 250 outputs a reference speed command commanding movement at the reference speed to the data communication circuit 204a with the transport vehicle 800 or 900 as the destination. Subsequently, the information processing device 200 repeats the above-described process from step S51.

When, in step S57, the controller 250 of the information processing device 200 determines that the transport vehicle 800 or 900 moves away from the start location because the first-round distance is shorter than the second-round distance (step S57; Yes), the acquirer 210 acquires information indicating a low speed that the information storage 290 stores in advance. The low speed is a speed that is slower than the reference speed. Next, the controller 250 performs speed control to cause the transport vehicle 800 or 900 to change the movement speed thereof to the low speed indicated by the acquired information (hereinafter, referred to as low speed control) (step S59). For this purpose, the controller 250 outputs a low speed command that includes the information indicating the low speed and that commands movement at the low speed to the data communication circuit 204a with the transport vehicle 800 or 900 as the destination. Subsequently, the information processing device 200 repeats the above-described process from step S51.

In the present embodiment, when the transport vehicle 800 or 900 moves away from the start location of transport, the low speed control is executed regardless of whether or not the low speed control, which is movement control corresponding to the first status, has not been executed. In addition, when the transport vehicle 800 or 900 does not move away from the start location of transport, the reference speed control is executed regardless of whether or not the reference speed control corresponding to the first status has not been executed. The reason why the low speed control and the reference speed control are executed regardless of whether or not the low speed control and the reference speed control have not been executed as described above is that the transport vehicle 800 or 900 comes close to and moves away from the start location of transport as time passes because the transport vehicle 800 or 900 continues circulation movement.

When, in step S55, the acquirer 210 of the information processing device 200 determines that the acquired status ID is not the status ID "S1" of the first status (step S55; No), the acquirer 210 determines whether or not the acquired status ID is the status ID "S2" of the search status, which is referred to as a second status, or the status ID "S3" of the product selection status, which is also referred to as the second status (step S60). When, on this occasion, the acquirer 210 determines that the acquired status ID is the status ID "S2" or "S3" (step S60; Yes), the acquirer 210, by executing the same processing as the processing in steps S56 and S57 (steps S61 and S62), determines whether or not the transport vehicle 800 or 900 moves away from the start location of transport.

When, on this occasion, it is determined that the transport vehicle 800 or 900 does not move away from the start location of transport (step S62; No), the information processing device 200 repeats the above-described process from step S51. In contrast, when it is determined that the transport vehicle 800 or 900 moves away from the start location of transport (step S62; Yes), the controller 250 performs direction control to change the direction of movement of the transport vehicle 800 or 900 from a direction in which the transport vehicle 800 or 900 moves away from the start location of transport to a direction in which the transport vehicle 800 or 900 comes close to the start location (step S63).

The direction control is control to change the direction of movement of the transport vehicle 800 or 900 to the direction in which the transport vehicle 800 or 900 comes close to the start location of transport. Thus, the direction control further suppresses an increase in the movement distance from the location of the transport vehicle 800 or 900 to the start location of transport than the low speed control, which changes the movement speed of the transport vehicle 800 or 900 to a low speed when the direction of movement of the transport vehicle 800 or 900 is a direction in which the transport vehicle 800 or 900 moves away from the start location of transport.

In the present embodiment, the direction control is (i) control to, when the transport vehicle 800 or 900 moves along the circulation route in the predetermined forward direction, cause the transport vehicle 800 or 900 to change the direction of movement thereof to the backward direction opposite to the forward direction and (ii) control to, when the transport vehicle 800 or 900 moves in the backward direction, cause the transport vehicle 800 or 900 to change the direction of movement thereof to the forward direction. The transport vehicle 800 or 900, by moving along the circulation route in the forward direction, moves on the forward path of the circulation route and, by moving along the circulation route in the backward direction, moves on the backward path of the circulation route. Thus, the direction control is also (i) control to, when the transport vehicle 800 or 900 moves on the forward path, cause the transport vehicle 800 or 900 to move on the backward path and (ii) control to, when the transport vehicle 800 or 900 moves on the backward path, cause the transport vehicle 800 or 900 to move on the forward path.

In addition, in the present embodiment, the direction control is reversing control to reverse the direction of movement of the transport vehicle 800 or 900 in order to cause the direction of movement of the transport vehicle 800 or 900 to be changed from the forward direction to the backward direction or from the backward direction to the forward direction. For this purpose, in step S63, the controller 250 outputs a reversing command commanding reversal of the direction of movement to the data communication circuit 204a with the transport vehicle 800 or 900 as the destination.

Next, the controller 250 of the information processing device 200, by executing the same processing as the processing in step S58, performs the reference speed control to cause the transport vehicle 800 or 900 to move at the reference speed (step S64). Subsequently, the information processing device 200 repeats the above-described process from step S51.

In the present embodiment, when the transport vehicle 800 or 900 moves away from the start location of transport, the direction control and the reference speed control, which are movement control corresponding to the second status, are executed regardless of whether or not the direction control and the reference speed control have not been executed. The reason why the direction control and the reference speed control are executed regardless of whether or not the direction control and the reference speed control have not been executed as described above is that the transport vehicle 800 or 900 continues circulation movement.

After, in steps S55 and S60, the acquirer 210 of the information processing device 200 has determined that the acquired status ID is none of the status IDs "S1" to "S3" (step S55; No and step S60; No), the acquirer 210 determines whether or not the acquired status ID is the status ID "S4" of the consideration status, which is referred to as a third status (step S65). When, on this occasion, the acquirer 210 determines that the acquired status ID is the status ID "S4" (step S65; Yes), the acquirer 210 acquires, from the order table in FIG. 10, a non-execution flag associated with the user ID identifying the user of the terminal device 100 and the status ID "S4" of the third status. On this occasion, the acquirer 210 determines whether or not movement control corresponding to the third status has not been executed, based on a value of the acquired non-execution flag (step S66). When, on this occasion, it is determined that the movement control has been executed because the value of the non-execution flag is a value "false" (step S66; No), the information processing device 200 repeats the above-described process from step S51.

In contrast, when the acquirer 210 of the information processing device 200 determines that the movement control corresponding to the third status has not been executed because the value of the non-execution flag is the value "true" (step S66; Yes), the acquirer 210 performs speed control to cause the transport vehicle 800 or 900 to change the movement speed thereof to a high speed faster than the reference speed (hereinafter, referred to as high speed control), as the movement control (step S67).

In this processing, the status of the order is caused to transition to the third status by way of the second status. Thus, after, in step S60, the status of the order has been determined to be the second status and, in steps S63 and S64, the direction control and the reference speed control have been performed, respectively, in step S65, the status of the order is determined to be the third status and, in step S67, the high speed control is executed. That is, the high speed control is performed after the direction control and the reference speed control being performed has caused the direction of movement of the transport vehicle 800 or 900 to be changed to the direction in which the transport vehicle 800 or 900 comes close to the start location of transport and the movement speed to be changed to the reference speed. Thus, the transport vehicle 800 or 900 is caused to move at a high speed faster than the reference speed in the direction in which the transport vehicle 800 or 900 comes close to the start location of transport. Therefore, the high speed control further reduces the movement distance from the location of the transport vehicle 800 or 900 to the start location of transport than the direction control and the reference speed control.

In order to perform the high speed control, the acquirer 210 of the information processing device 200 acquires information indicating a high speed that the information storage 290 stores in advance. Next, the controller 250 outputs a high speed command that includes the information indicating the high speed and that commands movement at the high speed to the data communication circuit 204a with the transport vehicle 800 or 900 as the destination. Next, the updater 230 updates, in the order table in FIG. 10, the value of the non-execution flag associated with the user ID identifying the user of the terminal device 100 and the status ID "S4" of the third status with the value "false" indicating that movement control corresponding to the third status has been executed. Subsequently, the information processing device 200 repeats the above-described process from step S51.

After, in steps S55, S60, and S65, the acquirer 210 of the information processing device 200 has determined that the acquired status ID is none of the status IDs "51" to "S4" (step S55; No, step S60; No, and step S65; No), the acquirer 210 determines whether or not the acquired status ID is the status ID "S5" of the settlement status, which is referred to as a fourth status (step S68). When, on this occasion, the acquirer 210 determines that the acquired status ID is the status ID "S5" (step S68; Yes), the acquirer 210, by executing the same processing as the processing in step S66, determines whether or not movement control corresponding to the fourth status has not been executed (step S69). When, on this occasion, it is determined that the movement control has been executed (step S69; No), the information processing device 200 repeats the above-described process from step S51.

In contrast, when the acquirer 210 of the information processing device 200 determines that the movement control corresponding to the fourth status has not been executed (step S69; Yes), the acquirer 210, by executing the same processing as the processing in step S28, acquires location information indicating the location of the transport vehicle 800 or 900 in latitude, longitude, and altitude (step S70).

Next, the controller 250 of the information processing device 200 determines a first route that starts from the location of the transport vehicle 800 or 900 indicated by the acquired location information and that reaches the start location of transport (step S71). On this occasion, the controller 250 determines the first route in such a way that length of the first route is shorter than the shortest distance on the circulation route from the location of the transport vehicle 800 or 900 to the start location of transport. The shortest distance on the circulation route from the location of the transport vehicle 800 or 900 to the start location of transport is distance over which the transport vehicle 800 or 900 moves from the location of the transport vehicle 800 or 900 to the start location of transport along the circulation route, which has been set to the transport vehicle 800 or 900 as a movement route when routing control resetting a movement route of the transport vehicle 800 or 900 is not performed.

For this purpose, the acquirer 210 acquires information indicating the start location of transport in latitude, longitude, and altitude from the information storage 290. Next, the acquirer 210 reads a plurality of records stored in a partial route table that the information storage 290 stores in advance. In the partial route table, a plurality of records in each of which information relating to a partial route, such as a road and a sidewalk, on which the vehicles 800 and 900 can move is stored are stored in advance.

In each record of the partial route table, latitude, longitude, and altitude of the start node of an edge, which is a partial route, latitude, longitude, and altitude of the end node of the edge, and information indicating length of the edge are associated with one another and stored in advance. In addition, information indicating width of the edge, which is, for example, a road or a sidewalk, is associated with the latitudes, longitudes, and altitudes of the start node and the end node in advance.

Next, the controller 250 of the information processing device 200 executes a route search algorithm, such as Dijkstra's algorithm, using lengths of edges and latitudes, longitudes, and altitudes of the start nodes and the end nodes of the edges, which are stored in respective records in the read partial route table, latitude, longitude, and altitude indicating the location of the transport vehicle 800 or 900, and latitude, longitude, and altitude indicating the start location of transport. Through this processing, the controller 250 searches for a plurality of entire routes starting from the location of the transport vehicle 800 or 900 and reaching the start location, by combining partial routes.

Subsequently, the acquirer 210 of the information processing device 200 acquires information indicating the circulation route from the information storage 290. Next, the controller 250 calculates a shortest distance required for the transport vehicle 800 or 900 to move along the circulation route from the location of the transport vehicle 800 or 900 to the start location of transport (that is, a shortest distance on the circulation route), based on the information indicating the circulation route, the location information of the transport vehicle 800 or 900, and the information indicating the start location of transport.

Subsequently, the controller 250 of the information processing device 200 identifies N entire routes (where N is a natural number) the total lengths of which are shorter than the shortest distance on the circulation route, in ascending order of the total length from among the plurality of entire routes found in the search. Through this processing, N entire routes that are different from the circulation route are identified.

Subsequently, the controller 250 of the information processing device 200 calculates, with respect to each of the N entire routes, an evaluation value indicating to what extent the entire route is evaluated to be appropriate as a route along which the transport vehicle 800 or 900 is caused to move. Although, in the present embodiment, a higher evaluation value is calculated for an entire route that is evaluated to be more appropriate, the present embodiment is not limited thereto, and a lower evaluation value may be calculated for an entire route that is evaluated to be more appropriate.

In order to calculate an evaluation value for each of the N entire route, the controller 250 of the information processing device 200 assigns numbers 1 to N to the identified N entire routes in ascending order of the total length. Subsequently, the controller 250 initializes a variable n indicating the number of an entire route to a value "1". Next, the controller 250 calculates a first evaluation value based on total length, a second evaluation value based on safety, and a third evaluation value based on a consumed amount of energy with respect to an n-th entire route.

In order to calculate a first evaluation value based on total length, the controller 250 of the information processing device 200 calculates a higher first evaluation value as the total length of the n-th entire route is shorter. The reason why the controller 250 calculates a first evaluation value in this manner is that the shorter the total length is, the earlier the transport vehicle 800 or 900 can move to the start location of transport.

Although, in the present embodiment, the controller 250 of the information processing device 200 uses, as a calculation method of a first evaluation value, a method of using a reciprocal of total length as a first evaluation value, the present embodiment is not limited thereto. The controller 250 may use any calculation method, provided that the method is a method of calculating a higher positive first evaluation value as the total length is shorter.

Next, in order to calculate a second evaluation value based on safety, the controller 250 of the information processing device 200 identifies a plurality of edges included in the n-th entire route. Subsequently, the controller 250 acquires, with respect to each of the identified plurality of edges, information indicating the length of the edge and information indicating the width of the edge associated with the latitude, longitude, and altitude of the start node of the edge and the latitude, longitude, and altitude of the end node of the edge from the not-illustrated partial route table. Subsequently, the controller 250 calculates, with respect to each of the plurality of edges, an area of the edge by multiplying the width of the edge by the length of the edge. Subsequently, the controller 250 calculates the sum of areas of the plurality of edges included in the n-th entire route and, by dividing the calculated sum by the total length, calculates an average value of the width of the entire route. Next, the controller 250 calculates a higher second evaluation value based on safety as the calculated average value of the width is larger. The reason why the controller 250 calculates a second evaluation value in this manner is that the larger the average value of the width of an entire route is, the lower the contact probability is. The contact probability is probability of the transport vehicle 800 or 900 coming into contact with, for example, a person, an animal, an obstacle, or a vehicle while moving along the entire route.

In the present embodiment, the controller 250 of the information processing device 200 uses, as a calculation method of a second evaluation value, a method of setting a value obtained by adding a predetermined positive constant C1 to the average value of the width of an entire route as a second evaluation value. However, the calculation method is not limited to this method, and the controller 250 may use any calculation method, provided that the method is a method of calculating a higher positive second evaluation value as the average value of the width of an entire route is larger.

Next, in order to calculate a third evaluation value based on a consumed amount of energy, the acquirer 210 of the information processing device 200 acquires information indicating weight of the transport vehicle 800 or 900 that the information storage 290 stores in advance. Next, the controller 250, with respect to each of a plurality of edges included in the n-th entire route, subtracts the altitude of the start node of the edge from the altitude of the end node of the edge when the altitude of the end node is higher than the altitude of the start node. Through this processing, the controller 250 calculates an increased amount of altitude of the transport vehicle 800 or 900 that occurs when the transport vehicle 800 or 900 moves along the edge. Subsequently, the controller 250 calculates, with respect to each of the plurality of edges, an increased amount of potential energy of the transport vehicle 800 or 900 that occurs when the transport vehicle 800 or 900 moves along the edge by multiplying the increased amount of altitude by the weight of the transport vehicle 800 or 900. Next, the controller 250 calculates the sum of the calculated increased amounts of potential energy as, for example, a consumed amount of energy accumulated in a battery that the transport vehicle 800 or 900 includes.

Subsequently, the controller 250 of the information processing device 200 calculates a higher third evaluation value as the calculated consumed amount of energy is smaller. In the present embodiment, the controller 250 of the information processing device 200 uses, as a calculation method of a third evaluation value, a method of setting a reciprocal of a value obtained by adding a predetermined positive constant C2 to the calculated consumed amount of energy as a third evaluation value. However, the calculation method is not limited to this method, and the controller 250 may use any calculation method, provided that the method is a method of calculating a higher positive third evaluation value as the calculated consumed amount of energy is smaller.

After the first to third evaluation values have been calculated, the acquirer 210 of the information processing device 200, with respect to a first weighting factor used in weighting of the first evaluation value, acquires information indicating a positive first initial value from the information storage 290. Likewise, the acquirer 210, with respect to a second weighting factor and a third weighting factor used in weighting of the second evaluation value and the third evaluation value, acquires information indicating a positive second initial value and information indicating a positive third initial value from the information storage 290, respectively. Subsequently, the controller 250 initializes the first weighting factor to the first initial value indicated by the acquired information and initializes the second weighting factor and the third weighting factor to the second initial value and the third initial value indicated by the acquired information, respectively.

Subsequently, the controller 250 of the information processing device 200 calculates, as an overall evaluation value of the n-th entire route, the sum of (i) a value obtained by weighting the first evaluation value by the first weighting factor, (ii) a value obtained by weighting the second evaluation value by the second weighting factor, and (iii) a value obtained by weighting the third evaluation value by the third weighting factor. Next, the controller 250 of the information processing device 200, after having increased the value of the variable n by "1", repeats the above-described process from the processing of calculating a first individual evaluation value until the value of the variable n exceeds the total number N of entire routes.

When overall evaluation values are calculated with respect to the N entire routes, the controller 250 of the information processing device 200 determines an entire route for which a highest overall evaluation value is calculated among the N overall evaluation values as the first route along which the vehicle 800 or 900 is caused to move. However, the determination method is not limited to this method, and the controller 250 may determine, as the first route, an entire route for which the N'-th highest overall evaluation value (where N' is a natural number that is 2 or more and less than N) is calculated or an entire route that is selected from among N' entire routes for which the highest to N'-th highest overall evaluation values are calculated, based on, for example, software-generated random numbers or a predetermined rule.

Subsequently, the controller 250 of the information processing device 200 performs routing control to cause the transport vehicle 800 or 900 to move along the first route (hereinafter, referred to as first routing control) as movement control corresponding to the fourth status (step S72). The first routing control is control to change the movement route of the transport vehicle 800 or 900 to the first route, which has a shorter length than the distance on the circulation route. Thus, the first routing control further reduces the movement distance from the location of the transport vehicle 800 or 900 to the start location of transport than the high speed control, which changes the movement speed of the transport vehicle 800 or 900 to a high speed.

In order to perform the first routing control, the controller 250 of the information processing device 200 generates information indicating the first route that includes information indicating locations of a plurality of nodes included in the first route in latitude, longitude, and altitude and information indicating a visiting sequence of the plurality of nodes. Next, the controller 250 outputs a first route command that includes the generated information indicating the first route and that commands the transport vehicle 800 or 900 to move along the first route to the data communication circuit 204a with the transport vehicle 800 or 900 as the destination. Next, the updater 230 updates, in the order table in FIG. 10, the value of the non-execution flag associated with the user ID identifying the user of the terminal device 100 and the status ID "S5" of the fourth status with the value "false". Subsequently, the information processing device 200 repeats the above-described process from step S51.

When, in steps S55, S60, S65, and S68, the acquirer 210 of the information processing device 200 determines that the acquired status ID is none of the status IDs "S1" to "S5" (step S55; No, step S60; No, step S65; No, and step S68; No), the acquirer 210 determines that the acquired status ID is a status ID "S6" of the completion status, which is referred to as a fifth status. Next, the acquirer 210, by executing the same processing as the processing in step S66, determines whether or not movement control corresponding to the fifth status has not been executed (step S73). When, on this occasion, it is determined that the movement control has been executed (step S73; No), the information processing device 200 repeats the above-described process from step S51.

In contrast, when the acquirer 210 of the information processing device 200 determines that the movement control corresponding to the fifth status has not been executed (step S73; Yes), the acquirer 210, by executing the same processing as the processing in step S70, acquires the location information of the transport vehicle 800 or 900 (step S74).

Next, the controller 250 of the information processing device 200 determines a second route that starts from the location of the transport vehicle 800 or 900 indicated by the acquired location information and that reaches the start location of transport. When, since, on this occasion, the transport vehicle 800 or 900 has not started movement along the first route yet, the location of the transport vehicle 800 or 900 indicated by the acquired location information is the same as the location used in the determination of the first route, the controller 250 determines a second route in such a way that the second route has (i) a shorter length than the entire route of the first route, which starts from the location indicated by the acquired location information and reaches the start location of transport, but (ii) a greater consumed amount of energy than the entire route of the first route and (iii) lower safety than the entire route of the first route. In contrast, when, since the transport vehicle 800 or 900 has started movement along the first route, the location of the transport vehicle 800 or 900 indicated by the acquired location information is different from the location used in the determination of the first route, the controller 250 determines a second route in such a way that the second route has (i) a shorter length than a partial route of the first route, the partial route starting from the location indicated by the newly acquired location information and reaching the start location of transport, but (ii) a greater consumed amount of energy than the partial route of the first route and (iii) lower safety than the partial route of the first route (step S75).

For this purpose, the controller 250 of the information processing device 200, by executing the same processing as the processing in step S71, identifies M routes (where M is a natural number that is 1 or more and less than N) that are entire routes from the location of the transport vehicle 800 or 900 to the start location of transport and that have shorter total lengths than the entire route or the partial route of the first route, in ascending order of the total length.

Subsequently, the controller 250 of the information processing device 200 calculates, with respect to each of the M entire routes, a first evaluation value based on total length, a second evaluation value based on safety, and a third evaluation value based on a consumed amount of energy. Next, the controller 250 initializes the first weighting factor to the first initial value and initializes the second weighting factor and the third weighting factor to the second initial value and the third initial value, respectively.

Subsequently, the controller 250 of the information processing device 200 does not correct the first weighting factor, which is used in weighting of the first evaluation value based on total length, and respectively corrects the second weighting factor, which is used in weighting of the second evaluation value based on safety, and the third weighting factor, which is used in weighting of the third evaluation value based on a consumed amount of energy, to values smaller than the values before correction. The reason why the controller 250 performs such correction is that, even when an order has been completed, transport of a product is not started unless the transport vehicle 800 or 900 moves to the start location of transport. Thus, after the completion of an order, a route having a short total length is relatively more appropriate than a route having a long total length and high safety and a route having a long total length and a small consumed amount of energy as a route along which the transport vehicle 800 or 900 is caused to move.

Next, the controller 250 of the information processing device 200 calculates, with respect to each of the M entire routes, the sum of (i) a value obtained by weighting the first evaluation value by the uncorrected first weighting factor, (ii) a value obtained by weighting the second evaluation value by the corrected second weighting factor, and (iii) a value obtained by weighting the third evaluation value by the corrected third weighting factor as an overall evaluation value. Subsequently, the controller 250 determines an entire route for which a highest overall evaluation value is calculated among the M overall evaluation values as the second route along which the vehicle 800 or 900 is caused to move. However, the determination method is not limited to this method, and the controller 250 may determine, as the second route, an entire route for which the M'-th highest overall evaluation value (where M' is a natural number that is 2 or more and less than M) is calculated or an entire route that is selected from among M' entire routes for which the highest to M'-th highest overall evaluation values are calculated, based on, for example, software-generated random numbers or a predetermined rule.

Subsequently, the controller 250 of the information processing device 200 performs routing control to cause the transport vehicle 800 or 900 to move along the second route (hereinafter, referred to as second routing control) as movement control corresponding to the fifth status (step S76). The second routing control is control to change the movement route of the transport vehicle 800 or 900 to the second route, which has a shorter length than the length of the first route or the partial route of the first route. Therefore, the second routing control further reduces the movement distance from the location of the transport vehicle 800 or 900 to the start location of transport than the first routing control.

In order to perform the second routing control, the controller 250 of the information processing device 200 generates information indicating the second route that includes information indicating locations of a plurality of nodes included in the second route in latitude, longitude, and altitude and information indicating a visiting sequence of the plurality of nodes. Next, the controller 250 outputs a second route command that includes the generated information indicating the second route and that commands the transport vehicle 800 or 900 to move along the second route to the data communication circuit 204a with the transport vehicle 800 or 900 as the destination. Next, the updater 230 updates, in the order table in FIG. 10, the value of the non-execution flag associated with the user ID identifying the user of the terminal device 100 and the status ID "S6" of the fifth status with the value "false". Subsequently, the information processing device 200 repeats the above-described process from step S51.

When, in step S51, the acquirer 210 determines that there exists no record that has not been checked (step S51; No), the acquirer 210 terminates the execution of the movement control processing.

Figure 12:
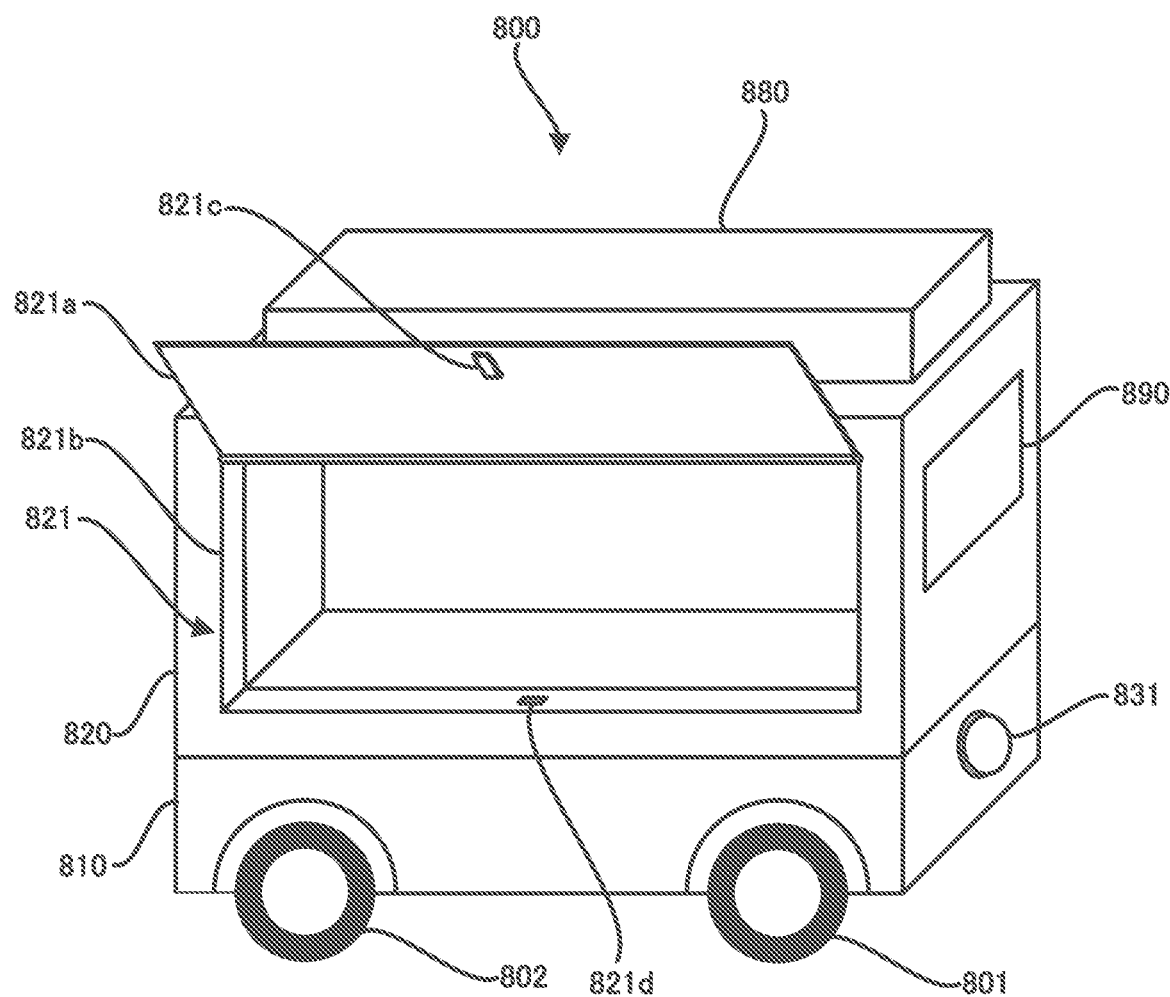
FIG. 12 is an appearance configuration diagram illustrating an appearance example of a vehicle according to the embodiment.

The vehicle 800 the movement of which is controlled by the information processing device 200 is, for example, an unmanned ground vehicle, which is a traveling machine that can travel on the ground without human intervention. The vehicle 800 includes, as illustrated in FIG. 12, a chassis 810 that is provided with a plurality of wheels including wheels 801 and 802, the storage cabinet 820 that is installed on the upper surface of the chassis 810, and an information processing device 890 that is built into the storage cabinet 820.

The storage cabinet 820 of the vehicle 800 includes a storage box 821. The storage box 821 includes a not-illustrated bottom plate, ceiling plate, and back plate and not-illustrated two side plates and includes a box body that is closed by the plates and that forms a space the front of which is opened. A door frame 821b that receives a door 821a is installed on the opening of the box body. The door 821a includes a deadbolt 821c that is a bolt, and the door frame 821b includes a strike 821d that is a strike plate for the deadbolt 821c.

The door 821a of the storage cabinet 820 that the vehicle 800 includes further includes a not-illustrated motor that, in order to lock the door 821a, causes the deadbolt 821c to be inserted into the strike 821d in accordance with a signal output from the information processing device 890 of the vehicle 800. The motor, in order to unlock the door 821a, causes the deadbolt 821c to be pulled out from the strike 821d in accordance with a signal output from the information processing device 890.

The vehicle 800 further includes a light detection and ranging (LiDAR) sensor 831 that is installed on the front surface of the chassis 810 and a not-illustrated LiDAR sensor that is installed on the back surface of the chassis 810.

The LiDAR sensor 831 on the front surface that the vehicle 800 includes emits laser light in a plurality of directions that, when the front direction of the vehicle 800 is used as a reference azimuthal direction, are included in a range of azimuth angle formed with the reference azimuthal direction from −90 degrees to +90 degrees and elevation angle formed with the front direction of the vehicle 900 from −90 degrees to +90 degrees. The LiDAR sensor 831 on the front surface receives reflected light of the emitted laser light and, based on a time from the emission of the laser light to the reception of the reflected light, measures distances to a plurality of reflection points at which the laser light is reflected. Next, the LiDAR sensor 831 on the front surface calculates coordinate values of the plurality of reflection points in a three-dimensional coordinate system of the vehicle 800 with the center point of the vehicle 800 taken as the origin, based on the emission directions of the laser light and the measured distances. Subsequently, the LiDAR sensor 831 on the front surface outputs the calculated coordinate values of the plurality of reflection points to the information processing device 890 of the vehicle 800.

The LiDAR sensor on the back surface that the vehicle 800 includes emits infrared laser light in a plurality of directions that, when the rearward direction of the vehicle 800 is used as a reference azimuthal direction, are included in a range of azimuth angle formed with the reference azimuthal direction from −90 degrees to +90 degrees and elevation angle formed with the rearward direction of the vehicle 900 from −90 degrees to +90 degrees. In addition, the LiDAR sensor on the back surface calculates coordinate values of a plurality of reflection points of the emitted laser light in the three-dimensional coordinate system of the vehicle 800 and outputs the calculated coordinate values of the plurality of reflection points to the information processing device 890 of the vehicle 800.

The reason why the LiDAR sensor 831 on the front surface and the LiDAR sensor on the back surface that the vehicle 800 includes output the coordinate values of a plurality of reflection points to the information processing device 890 is that, in order to travel avoiding objects, such as an obstacle, the information processing device 890 of the vehicle 800 identifies the coordinate values in the three-dimensional space and sizes of objects existing in all directions with the vehicle 800 used as a reference.

Figure 13:
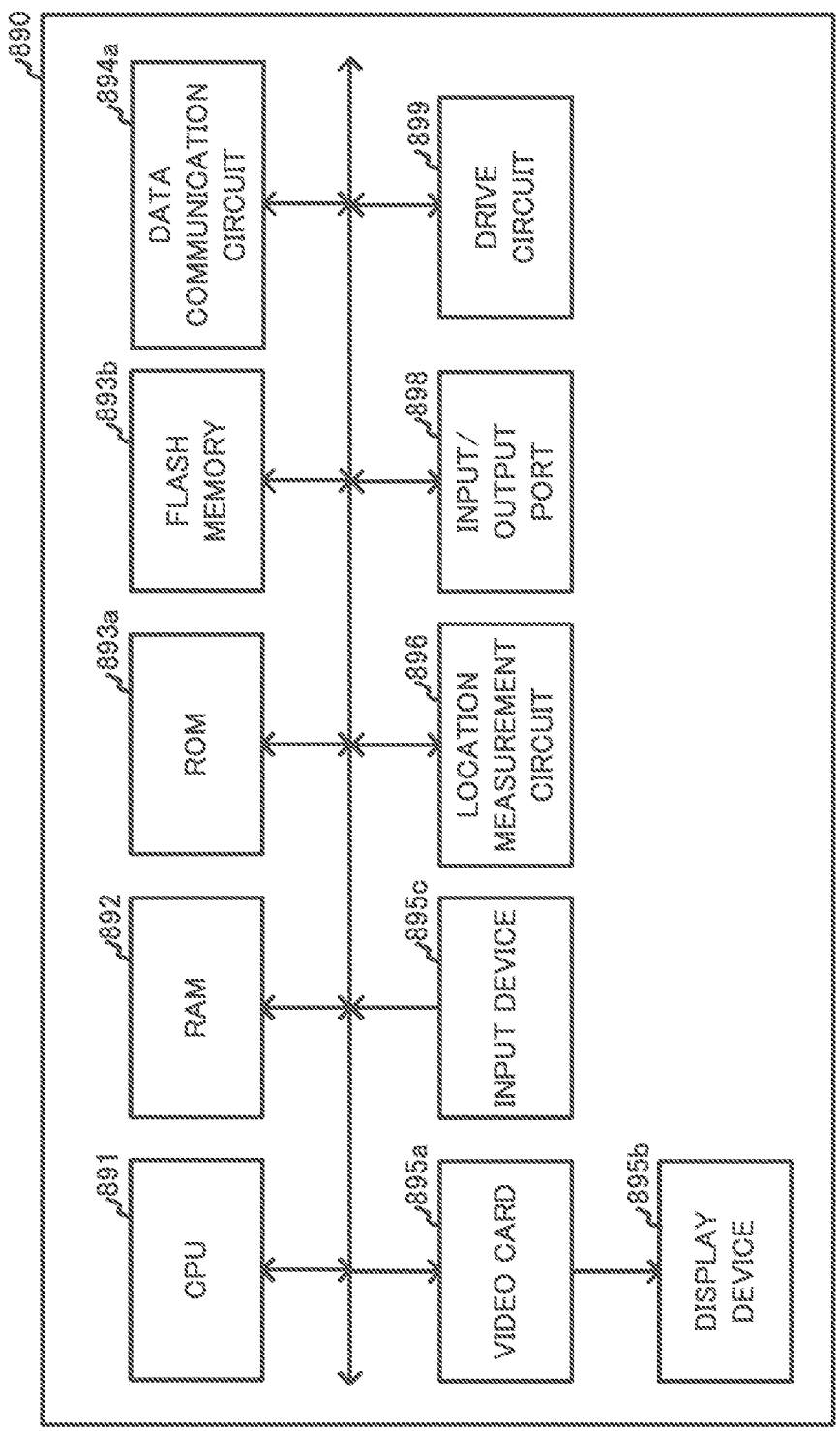
FIG. 13 is a hardware configuration diagram illustrating a configuration example of an information processing device that the vehicle includes.

The information processing device 890 of the vehicle 800 includes a CPU 891, a RAM 892, a ROM 893a, a flash memory 893b, a data communication circuit 894a, a video card 895a, a display device 895b, an input device 895c, a location measurement circuit 896, an input/output port 898, and a drive circuit 899, which are hardware components, as illustrated in FIG. 13. Although, in the present embodiment, the vehicle 800 includes one CPU 891, the vehicle 800 may include a plurality of CPUs. In addition, the vehicle 800 may include a plurality of RAMs and may include a plurality of flash memories.

Configurations and functions of the CPU 891, the RAM 892, the ROM 893a, the flash memory 893b, the data communication circuit 894a, the video card 895a, the display device 895b, the input device 895c, and the location measurement circuit 896 of the vehicle 800 are the same as the configurations and functions of the CPU 101, the RAM 102, the ROM 103*a*, the flash memory 103*b*, the data communication circuit 104*a*, the video card 105*a*, the display device 105*b*, input device 105*c*, and the location measurement circuit 106 of the terminal device 100, respectively.

The input/output port 898 of the vehicle 800 is connected to not-illustrated cables that are respectively connected to the LiDAR sensor 831 on the front surface and the LiDAR sensor on the back surface, via not-illustrated cables. The input/output port 898 inputs signals representing coordinate values that the LiDAR sensor 831 on the front surface and the LiDAR sensor on the back surface respectively output, to the CPU 891.

The drive circuit 899 of the vehicle 800 is connected to not-illustrated cables that are respectively connected to not-illustrated motors that rotate the plurality of wheels. The drive circuit 899 rotates the plurality of wheels by driving the motors in accordance with a control signal output by the CPU 891. The not-illustrated motors that rotate the plurality of wheels are driven using power supplied from a battery 880 that the vehicle 800 includes. Although the battery 880 is a lithium-ion battery, the battery 880 is not limited thereto, and the battery 880 may be any type of storage battery including, for example, a lead-acid storage battery and a nickel metal hydride battery.

The drive circuit 899 of the vehicle 800 is also connected to a cable connected to a not-illustrated motor that causes the deadbolt 821*c* that the door 821*a* includes to be pulled out from the strike plate 821*d* or causes the deadbolt 821*c* to be inserted into the strike 821*d*, and drives the motor in accordance with a signal output by the CPU 891.

Figure 14:
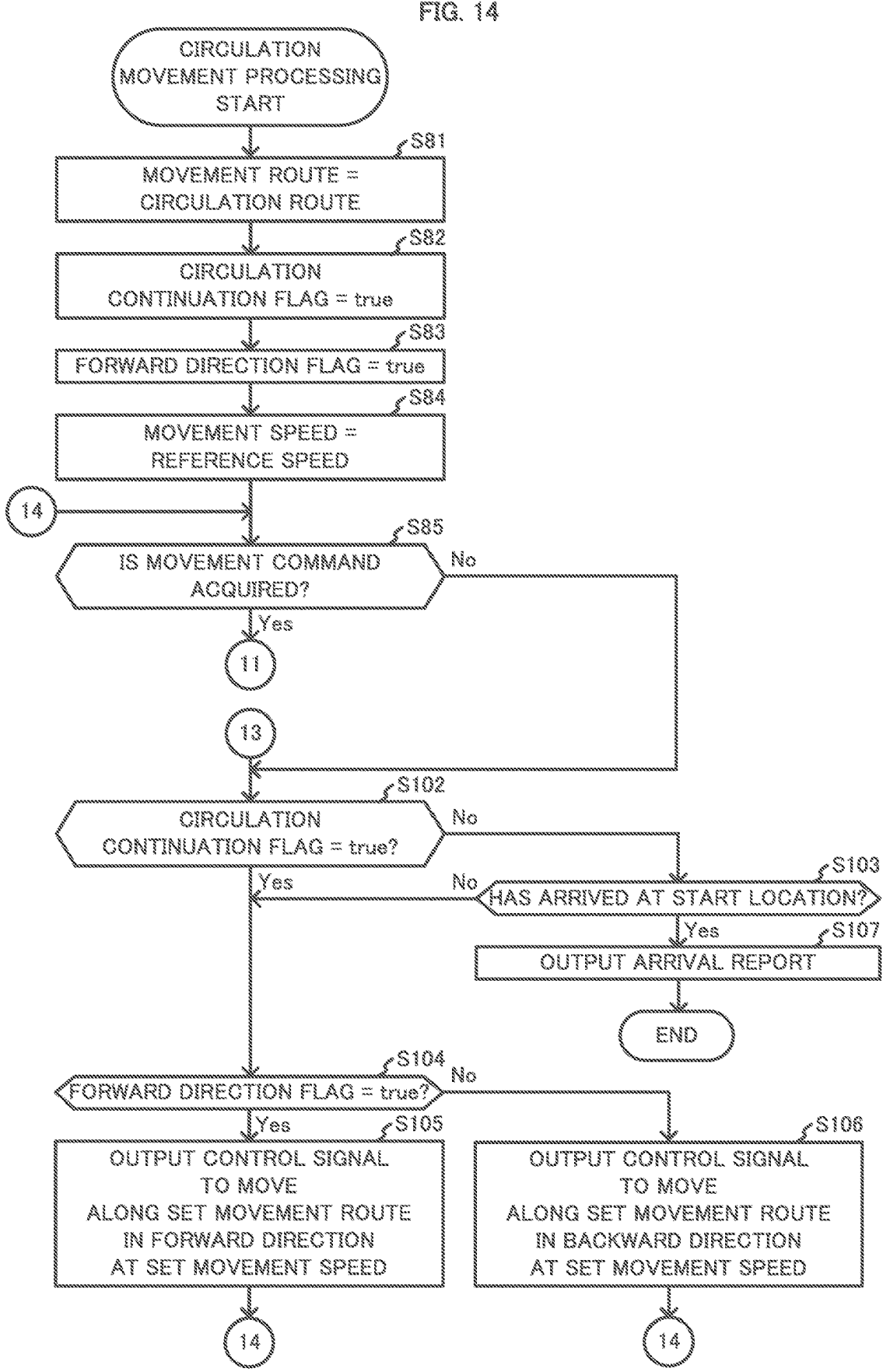
FIG. 14 is a portion of a flowchart illustrating an example of circulation movement processing that the vehicle according to the embodiment executes.

When an employee of the sales company performs an operation to cause the vehicle 800 to move in circulation, on the vehicle 800, the input device 895*c* of the vehicle 800 outputs a signal corresponding to the operation. When the signal is output from the input device 895*c*, the CPU 891 of the vehicle 800 executes circulation movement processing of causing the vehicle 800 to move in circulation, as illustrated in FIGS. 14, 15A, and 15B.

When the execution of the circulation movement processing is started, the CPU 891 of the vehicle 800 acquires information indicating the circulation route that is stored in the flash memory 893*b* in advance. Next, the CPU 891, by storing information indicating the circulation route in a storage area of the RAM 892, the storage area being an area in which information indicating a movement route along which the vehicle 800 is caused to move is loaded, sets the movement route to the circulation route (step S81).

Subsequently, the CPU 891 of the vehicle 800 initializes a value of a circulation continuation flag that indicates whether or not the vehicle 800 repeatedly moves along the circulation route to a value "true" indicating the repeated movement (step S82). In addition, the CPU 891 initializes a value of a forward direction flag that indicates whether or not the vehicle 800 moves along the circulation route in a predetermined forward direction to a value "true" indicating movement in the forward direction (step S83).

Next, the CPU 891 of the vehicle 800 acquires information indicating a reference speed that is stored in the flash memory 893*b* in advance. Subsequently, the CPU 891, by storing the information indicating the reference speed in a storage area of the RAM 892, the storage area being an area in which information indicating a movement speed of the vehicle 800 is loaded, sets the movement speed to the reference speed (step S84).

Next, the CPU 891 of the vehicle 800 tries to acquire a command received from the information processing device 200, from the data communication circuit 894*a* of the vehicle 800. When, on this occasion, the CPU 891 receives a command (step S85; Yes), the CPU 891 determines whether or not the acquired command is a low speed command commanding the vehicle 800 to move at a low speed slower than the reference speed (step S86). When, on this occasion, the CPU 891 determines that the acquired command is a low speed command (step S86; Yes), the CPU 891 acquires information indicating a low speed from the low speed command. Subsequently, after the CPU 891, by executing the same processing as the processing in step S84, has set the movement speed of the vehicle 800 to the low speed indicated by the acquired information (step S87), the CPU 891 executes processing in step S102, which will be described later.

When, after, in step S86, having determined that the acquired command is not a low speed command (step S86; No), the CPU 891 of the vehicle 800 determines that the acquired command is a reference speed command (step S88; Yes), the CPU 891, by executing the same processing as the processing in step S84, sets the movement speed of the vehicle 800 to the reference speed (step S89). Subsequently, the CPU 891 executes the processing in step S102, which will be described later.

When, in steps S86, S88, and S90, the CPU 891 of the vehicle 800 determines that the acquired command is neither a low speed command nor a reference speed command (step S86; No and step S88; No) but is a reversing command (step S90; Yes), the CPU 891 determines whether or not the value of the forward direction flag is the value "true", which indicates movement in the forward direction (step S91). When, on this occasion, the CPU 891 determines that the value of the forward direction flag is the value "true" (step S91; Yes), the CPU 891 sets the value of the forward direction flag to the value "false", which indicates movement in the backward direction, which is opposite to the forward direction (step S92). In contrast, when the CPU 891 determines that the value of the forward direction flag is the value "false" (step S91; No), the CPU 891 sets the value of the forward direction flag to the value "true" (step S93).

After the processing in step S92 or S93 has been executed, the CPU 891 of the vehicle 800 sets the value of the circulation continuation flag, which indicates whether or not the vehicle 800 repeatedly moves along the circulation route, to a value "false" indicating that the vehicle 800 does not repeat the movement along the circulation route (step S94). The reason why the value of the circulation continuation flag is set to the value "false" is to suppress the vehicle 800 from, after having arrived at the start location of transport, repeating movement along the circulation route and thereby moving away from the start location. Subsequently, after the CPU 891 of the vehicle 800 has set the movement speed of the vehicle 800 to the reference speed (step S95), the CPU 891 executes the processing in step S102, which will be described later.

When, in steps S86, S88, S90, and S96, the CPU 891 of the vehicle 800 determines that the acquired command is none of a low speed command, a reference speed command, and a reversing command (step S86; No, step S88; No, and step S90; No) but is a high speed command (step S96; Yes), the CPU 891 acquires information indicating a high speed from the high speed command. Subsequently, after the CPU 891 has set the movement speed of the vehicle 800 to the high speed indicated by the acquired information (step S97), the CPU 891 executes the processing in step S102, which will be described later.

When, in steps S86, S88, S90, S96, and S98, the CPU 891 of the vehicle 800 determines that the acquired command is none of a low speed command, a reference speed command, a reversing command, and a high speed command (step S86; No, step S88; No, step S90; No, and step S96; No) but is a first route command (step S98; Yes), the CPU 891 acquires information indicating a first route from the first route command. Subsequently, the CPU 891, by executing the same processing as the processing in step S81, resets the movement route of the vehicle 800 to the first route indicated by the acquired information (step S99).

Subsequently, after the CPU 891 of the vehicle 800 has set the value of the forward direction flag to the value "true" in order to move along the first route in the forward direction (step S100), the CPU 891 executes the processing in step S102, which will be described later.

When, in steps S86, S88, S90, S96, and S98, the CPU 891 of the vehicle 800 determines that the acquired command is none of a low speed command, a reference speed command, a reversing command, a high speed command, and a first route command (step S86; No, step S88; No, step S90; No, step S96; No, and step S98; No), the CPU 891 determines that the acquired command is a second route command. Next, the CPU 891 acquires information indicating a second route from the second route command and resets the movement route of the vehicle 800 to the second route indicated by the acquired information (step S101). Subsequently, the CPU 891 executes the processing in step S102, which will be described later.

When, in step S85, no command is acquired (step S85; No), or after the processing in step S87, S89, S95, S97, S100, or S101 has been executed, the CPU 891 of the vehicle 800 determines whether or not the value of the circulation continuation flag is the value "true" (step S102). When, on this occasion, the CPU 891 determines that the value of the circulation continuation flag is the value "true" (step S102; Yes), the CPU 891 executes processing in step S104, which will be described later, in order to continue movement along the circulation route.

In contrast, when the CPU 891 of the vehicle 800 determines that the value of the circulation continuation flag is the value "false" (step S102; No), the CPU 891 of the vehicle 800 identifies latitude, longitude, and altitude of the vehicle 800, based on a signal output from the location measurement circuit 896. Next, the CPU 891 calculates a distance from the vehicle 800 to the start location, based on the latitude, longitude, and altitude of the start location of transport and the latitude, longitude, and altitude of the vehicle 800. Subsequently, the CPU 891 determines whether or not the vehicle 800 has arrived at the start location of transport, based on whether or not the calculated distance is equal to or less than a predetermined distance (step S103). When, on this occasion, the CPU 891 determines that the vehicle 800 has not arrived at the start location of transport because the distance from the vehicle 800 to the start location is longer than the predetermined distance (step S103; No), the CPU 891 executes the processing in step S104, which will be described later, in order to continue movement along the circulation route, the first route, or the second route.

When, in step S102, it is determined that the value of the circulation continuation flag is the value "true" (step S102; Yes) or when it is determined that the vehicle 800 has not arrived at the start location of transport (step S103; No), the CPU 891 of the vehicle 800 determines whether or not the value of the forward direction flag is the value "true" (step S104).

When, on this occasion, the CPU 891 of the vehicle 800 determines that the value of the forward direction flag is the value "true" (step S104; Yes), the CPU 891 outputs a control signal for movement along the movement route set in step S81, S99, or S101 at the movement speed set in step S84, S87, S89, S95, or S97 in the forward direction (step S105).

For this purpose, the CPU 891 of the vehicle 800 identifies latitude, longitude, and altitude of the vehicle 800, based on a signal output from the location measurement circuit 896. Next, the CPU 891, based on the identified latitude, longitude, and altitude and the latitudes, longitudes, and altitudes of a plurality of nodes included in the set movement route, identifies a node that is located ahead of the location of the vehicle 800 in the forward direction on the movement route and that is closest to the location of the vehicle 800 on the movement route. Subsequently, the CPU 891 generates a control signal to cause the vehicle 800 to move at the set movement speed in such a way as to cause a difference between the latitude, longitude, and altitude of the identified node and the latitude, longitude, and altitude of the vehicle 800 to be reduced. Subsequently, the CPU 891 outputs the generated control signal to the drive circuit 899. The drive circuit 899 rotates the plurality of wheels in accordance with the control signal. Subsequently, the CPU 891 repeats the above-described process from step S85.

In contrast, when the CPU 891 of the vehicle 800 determines that the value of the forward direction flag is the value "false" (step S104; No), the CPU 891 outputs a control signal for movement along the set movement route at the set movement speed in the backward direction (step S106).

For this purpose, the CPU 891 of the vehicle 800 identifies a node that is located ahead of the location of the vehicle 800 in the backward direction on the movement route and that is closest to the location of the vehicle 800 on the movement route. Subsequently, the CPU 891 outputs a control signal to cause the vehicle 800 to move at the set movement speed in such a way as to cause a difference between the latitude, longitude, and altitude of the identified node and the latitude, longitude, and altitude of the vehicle 800 to be reduced to the drive circuit 899. Subsequently, the CPU 891 repeats the above-described process from step S85.

When, in step S103, the CPU 891 of the vehicle 800 determines that the vehicle 800 has arrived at the start location because the distance from the vehicle 800 to the start location of transport is equal to or less than the predetermined distance (step S103; Yes), the CPU 891 acquires the vehicle ID of the vehicle 800 that the flash memory 893b stores in advance. Next, the CPU 891 generates an arrival report that includes the vehicle ID of the vehicle 800 and that announces that the vehicle 800 has arrived at the start location. Subsequently, the CPU 891 outputs the generated arrival report to the data communication circuit 894a with the information processing device 200 as the destination (step S107) and subsequently terminates the execution of the circulation movement processing.

When the data communication circuit 894a of the vehicle 800 receives a location send request from the information processing device 200 while the CPU 891 of the vehicle 800 executes the circulation movement processing, the CPU 891 generates a thread different from a thread executing the circulation movement processing. Next, the CPU 891 executes processing of acquiring location information indicating the location of the vehicle 800 in latitude, longitude, and altitude, based on a signal output from the location measurement circuit 896, in the generated thread. Next, the CPU 891 executes processing of outputting the acquire location information to the data communication circuit 894*a* with the information processing device 200 as the destination, in the generated thread and subsequently removes the generated thread.

A configuration and the functions of the vehicle 900 are the same as the configuration and the functions of the vehicle 800.

When the data communication circuit 204*a* of the information processing device 200 receives an arrival report, the acquirer 210 of the information processing device 200 acquires the arrival report from the data communication circuit 204*a* and acquires a vehicle ID included in the acquired arrival report. Next, the acquirer 210 acquires a product ID associated with the vehicle ID in the order table in FIG. 10. Subsequently, the CPU 201 causes the display device 205*b* to display a message that includes the acquired vehicle ID and product ID and that prompts the transport vehicle 800 or 900 identified by the vehicle ID to load a product identified by the product ID. The employee of the sales company who has visually recognized the message, after having found the product in the warehouse and loaded the found product on the transport vehicle 800 or 900, performs an operation to input the vehicle ID of the transport vehicle 800 or 900 on which the product is loaded on the information processing device 200.

When the input device 205*c* of the information processing device 200 outputs a signal corresponding to the operation by the employee, the acquirer 210 acquires the vehicle ID, based on the signal. Next, the acquirer 210 acquires, from the order table in FIG. 10, a user ID associated with the acquired vehicle ID and acquires, from the user table in FIG. 9, information indicating a transport destination in an address associated with the acquired user ID. Through this processing, the acquirer 210 identifies the transport destination of the product loaded on the transport vehicle 800 or 900.

Subsequently, the acquirer 210 of the information processing device 200 acquires information indicating latitude, longitude, and altitude of the transport destination that the information storage 290 associates with the information indicating the transport destination in an address in advance and stores. Next, the controller 250 of the information processing device 200, by executing the same processing as the processing in step S71 in FIG. 11B, determines a transport route from the location of the transport vehicle 800 or 900 to the transport destination. Subsequently, the controller 250 outputs a transport command that includes information indicating the transport route and that commands the transport vehicle 800 or 900 to move along the transport route to the transport destination to the data communication circuit 204*a* with the transport vehicle 800 or 900 as the destination. Subsequently, the updater 230 updates, in the order table in FIG. 10, the status ID and the product ID associated with the user ID identifying the user of the terminal device 100 with the character strings "NULL" but maintains the vehicle ID without updating the vehicle ID with the character string "NULL". The reason why the vehicle ID is not updated is that, since the transport of the product has not been completed, the vehicle 800 or 900 identified by the vehicle ID remains selected as the transport vehicle.

When the data communication circuit 894*a* of the vehicle 800 receives a transport command sent from the information processing device 200, the CPU 891 of the vehicle 800 executes transport processing of causing the vehicle 800 to transport a product in accordance with the transport command, as illustrated in FIG. 16.

When starting the execution of the transport processing, the CPU 891 of the vehicle 800, by outputting a signal to cause the deadbolt 821*c* to be inserted into the strike 821*d* to the drive circuit 899, locks the door of the storage cabinet 820 (step S111).

Next, the CPU 891 of the vehicle 800 acquires the transport command from the data communication circuit 894*a* and acquires information indicating a transport route from the acquired transport command (step S112).

Next, the CPU 891 of the vehicle 800 acquires information indicating the location of the vehicle 800 in latitude, longitude, and altitude, based on a signal output from the location measurement circuit 896. Subsequently, the CPU 891 identifies information indicating, in latitude, longitude, and altitude, the location of the first node in the visiting sequence among one or a plurality of unvisited nodes included in the transport route. Next, the CPU 891, based on the information indicating the location of the vehicle 800 in latitude, longitude, and altitude and the identified information, generates a control signal to cause the vehicle 800 to move at the reference movement speed in such a way as to cause distance from the vehicle 800 to the first node among unvisited nodes in the visiting sequence to be reduced. Subsequently, the CPU 891, by outputting the generated control signal to the drive circuit 899 (step S113), causes the vehicle 800 to move along the transport route in the forward direction.

Subsequently, when the CPU 891 of the vehicle 800 determines that, since the vehicle 800 has not visited all of the one or plurality of nodes included in the transport route, the vehicle 800 has not reached the transport destination (step S114; No), the CPU 891 repeats the above-described process from step S113. In contrast, when the CPU 891 determines that, since the vehicle 800 has visited all of the one or plurality of nodes included in the transport route, the vehicle 800 has reached the transport destination (step S114; Yes), the CPU 891 outputs a control signal to cause the vehicle 800 to come to a stop or park at the transport destination to the drive circuit 899. Subsequently, the CPU 891, by outputting, to the drive circuit 899, a signal to cause the deadbolt 821*c* to be pulled out from the strike 821*d*, unlocks the door of the storage cabinet 820 (step S115).

Subsequently, a first user who is a user of the terminal device 100 and who is present at the transport destination or a second user who is requested to receive the product by the first user and who is preset at the transport destination takes out the product from the storage cabinet 820 of the vehicle 800 and subsequently operates the input device 895*c* of the vehicle 800. When the input device 895*c* outputs a signal corresponding to the operation, the CPU 891 outputs, to the drive circuit 899, a control signal to cause the vehicle 800 to move along the transport route in the reverse direction and return to the start location of transport (step S116).

Subsequently, when the CPU 891 determines that the vehicle 800 has arrived at the start location of transport, the CPU 891 outputs a return report that includes the vehicle ID of the vehicle 800 and that announces that the vehicle 800 has returned to the start location of transport to the data communication circuit 894*a* with the information processing device 200 as the destination (step S117) and subsequently terminates the execution of the transport processing. Subsequently, the vehicle 800, by starting execution of the circulation movement processing illustrated in FIGS. 14, 15A, and 15B, resumes movement along the circulation route.

When the data communication circuit 204a of the information processing device 200 receives a return report, the acquirer 210 of the information processing device 200 acquires the return report from the data communication circuit 204a and acquires the vehicle ID of the vehicle 800 included in the acquired return report. Next, the updater 230 updates the vehicle ID of the vehicle 800 stored in the order table in FIG. 10 with the character string "NULL". Through this processing, the vehicle 800 is released from selection as a transport vehicle.

According to the above-described configuration, the information processing device 200 includes the acquirer 210 that acquires a status of an order. The information processing device 200 also includes the controller 250 that performs movement control according to the acquired status when the acquired status is one of the first to fourth statuses before the status transitions to the completion status. The movement control is control over the transport vehicle 800 or 900, which is caused to transport a product targeted by the order and suppresses an increase in the movement distance from the location of the transport vehicle 800 or 900 to the start location at which the transport is started. The completion status is a state in which the order has been completed. Since, for this reason, the information processing device 200 can suppress an increase in required time required to cause the transport vehicle 800 or 900 to move to the start location at which the transport is started, the information processing device 200 can suppress an increase in waiting time for transport start required from the completion of the order to the start of transport.

Note that, since there is a possibility that an order is not completed, there is a possibility that the status of an order does not transition to the completion status. Thus, when the movement control is performed before the completion of an order, use efficiency of the transport vehicle 800 or 900 is reduced. However, according to the above-described configuration, the statuses before transition to the completion status include a first status and a second status and the second status has a higher probability of transition to the completion status than the probability of transition to the completion status that the first status has. In addition, the movement control corresponding to the second status further suppresses an increase in the movement distance than the movement control corresponding to the first status. Because of these reasons, the information processing device 200 can suppress reduction in the use efficiency of the transport vehicle 800 or 900 and, at the same time, suppress an increase in the required time required to cause the transport vehicle 800 or 900 to move to the start location of transport.

In the present embodiment, the use efficiency of the transport vehicle 800 or 900 include, for example, transport efficiency, and the transport efficiency may be represented by the sum of times during which the transport vehicle 800 or 900 moved along the circulation route in order to transport a target different from a target of an order, within a predetermined period. Alternatively, the transport efficiency may be represented by the number of times that the transport vehicle 800 or 900 transported targets different from a target of an order or the number of transported targets different from the target of the order, within a predetermined period. The target different from a target of an order may, for example, be a product regularly purchased or a sample or a specimen of a product. Alternatively, the target different from a target of an order may be (i) luggage of a person who moves on board the transport vehicle 800 or 900 along the circulation route or (ii) the person himself/herself when the transport vehicle 800 or 900 has a boarding space or a passenger seat.

In addition, according to the above-described configuration, the movement control according to a status includes (i) speed control to control the movement speed of the transport vehicle 800 or 900, (ii) direction control to control the direction of movement of the transport vehicle 800 or 900, and (iii) routing control to, when a movement route of the transport vehicle 800 or 900 is set, reset the set movement route.

Further, according to the above-described configuration, the speed control includes low speed control to, when the transport vehicle 800 or 900 moves away from the start location of transport, cause the transport vehicle 800 or 900 to change movement speed thereof to a low speed slower than a reference speed and high speed control to, when the transport vehicle 800 or 900 comes close to the start location, cause the transport vehicle 800 or 900 to change movement speed thereof to a high speed faster than the reference speed. In addition, the direction control includes control to, when the transport vehicle 800 or 900 moves away from the start location of transport, cause the transport vehicle 800 or 900 to change the direction of movement thereof to a direction in which the transport vehicle 800 or 900 comes close to the start location. Further, the routing control includes first routing control to cause the transport vehicle 800 or 900 to move along a first route having a shorter length than a distance over which the transport vehicle 800 or 900 moves from the location of the transport vehicle 800 or 900 to the start location of transport when the routing control is not performed. The distance over which the transport vehicle 800 or 900 moves from the location of the transport vehicle 800 or 900 to the start location of transport when the routing control is not performed is distance over which the transport vehicle 800 or 900 moves from the location of the transport vehicle 800 or 900 to the start location of transport along a movement route that is set to the transport vehicle 800 or 900. Because of these configurations, the information processing device 200 can surely suppress an increase in the required time required to cause the transport vehicle 800 or 900 to move to the start location of transport.

In addition, according to the above-described configuration, the routing control further includes second routing control to cause the transport vehicle 800 or 900 to move along a second route having a shorter length but a larger consumed amount of energy and lower safety than the first route. Thus, the information processing device 200 performs, depending on the status of an order, (i) the first routing control to cause the transport vehicle 800 or 900 to move along the first route having a longer length but a smaller consumed amount of energy and higher safety than the second route or (ii) the second routing control to cause the transport vehicle 800 or 900 to move along the second route. Therefore, the information processing device 200 can reduce required time required to cause the transport vehicle 800 or 900 to move to the start location of transport and, at the same time, suppress an increase in the consumed amount of energy and a reduction in the safety.

Further, according to the above-described configuration, the transport vehicle 800 or 900 moves in circulation. In addition, the direction control includes reversing control to, when the transport vehicle 800 or 900 moving in circulation moves away from the start location of transport, cause the transport vehicle 800 or 900 to reverse the direction of movement thereof. Further, the lengths of the first route and the second route are shorter than the distance over which the transport vehicle 800 or 900 moves from the location of the transport vehicle 800 or 900 to the start location of transport when the transport vehicle 800 or 900 moves in circulation. Because of these configurations, the information processing device 200 can surely reduce the required time required to cause the transport vehicle 800 or 900 to move to the start location of transport.

In addition, according to the above-described configurations, the controller 250 of the information processing device 200 performs the low speed control as movement control when it is determined that an acquired status is the first status and the transport vehicle 800 or 900 moves away from the start location of transport. In addition, the controller 250, by performing the reversing control as movement control when it is determined that an acquired status is the second status and the transport vehicle 800 or 900 moves away from the start location of transport, further reduces movement distance than the movement control corresponding to the first status. Further, according to the above-described configurations, the statuses before transition to the completion status further include a third status, and the third status has a higher probability of transition to the completion status than the probability of transition to the completion status that the second status has. In addition, the controller 250, by performing the high speed control as movement control when an acquired status is the third status, further reduces the movement distance than the movement control corresponding to the second status.

In addition, according to the above-described configurations, the statuses before transition to the completion status further include a fourth status, and the fourth status has a higher probability of transition to the completion status than the probability of transition to the completion status that the third status has. Moreover, the controller 250 of the information processing device 200, by performing the first routing control as movement control when an acquired status of an order is the fourth status, further reduces the movement distance than the high speed control corresponding to the third status. Further, according to the above-described configurations, the controller 250, by performing the second routing control as movement control when an acquired status of an order is the fifth status, which is the completion status, further reduces the movement distance than the first routing control corresponding to the fourth status. Because of these capabilities, the information processing device 200 can suppress reduction in the use efficiency of the transport vehicle 800 or 900 and, at the same time, reduce the required time required to cause the transport vehicle 800 or 900 to move to the start location of transport.

In addition, according to the above-described configurations, the information processing device 200 further includes the selector 240 that selects the transport vehicle 800 or 900 that is caused to transport a target of an order from among a plurality of vehicles, which is the vehicles 800 and 900. Thus, the information processing device 200 is capable of improving transport efficiency of a product targeted by an order. The transport efficiency of a product targeted by an order may be represented by the sum of times during which the transport vehicle 800 or 900 moved in order to transport the product within a predetermined period. Alternatively, the transport efficiency may be represented by the number of times that the transport vehicle 800 or 900 transported targets of orders or the number of targets of orders that the transport vehicle 800 or 900 transported, within a predetermined period.

Modified Example 1 of Embodiment

In the embodiment, it was described that the user using the terminal device 100, after having placed a product in the shopping cart, visually recognized a result of a search for a product different from the product placed in the shopping cart. In addition, in the embodiment, it was described that the user who had visually recognized the search result performed purchase operation in order to purchase only the product placed in the cart because the user was not able to find a product that the user desired to purchase.

However, the embodiment is not limited to the above description, and, in the present modified example, the following description will be made using, as a specific example, a case where the user has not been able to find a product that the user desires to purchase even when having visually recognized the search result and performs the termination operation in order to terminate the execution of the sale app.

In the present modified example, when the CPU 101 of the terminal device 100, after having caused the search result screen to be displayed in step S07 in FIG. 3A, determines that the product selection operation has not been performed, based on a signal output from the input device 105c (step S08; No), the CPU 101 determines that the termination operation is performed (step S13; Yes). Subsequently, the CPU 101 outputs an order cancel request requesting an order from the user of the terminal device 100 to be canceled to the data communication circuit 104a with the information processing device 200 as the destination (step S17) and subsequently terminates the execution of the order processing.

In the present modified example, the information processing device 200 sends a search result to the terminal device 100 in step S30 in FIG. 6A and subsequently executes the processing in steps S31 and S32 (steps S31 and S32). Subsequently, the information processing device 200 returns to step S29 and sleeps until data is received.

When the data communication circuit 204a of the information processing device 200 receives an order cancel request output in step S17 in FIG. 3B, the acquirer 210 returns from the sleep mode and acquires the received data from the data communication circuit 204a. Next, the acquirer 210 determines that the acquired data is an order cancel request because the acquired data is none of a search request, a detail send request, a consideration report, and an order completion request (step S29; No, step S33; No, step S37; No, and step S40; No). Subsequently, the updater 230 executes the processing in step S44 in order to cancel an order from the user using the terminal device 100 (step S44). Through this processing, although the status ID associated in the order table in FIG. 10 with the user ID of the user is updated with the character string "NULL" indicating that the order has not been accepted, the product ID associated with the user ID is maintained without being updated with the character string "NULL". That is, a product identified by the product ID is maintained, kept placed in the shopping cart.

In the present modified example, the following description will further be made using, as a specific example, a case where the user of the terminal device 100, after having terminated the execution of the sale app, decides to purchase a product that has been kept placed in the shopping cart and performs an operation to start up the sale app on the terminal device 100.

When the input device 105c of the terminal device 100 outputs a signal corresponding to the operation by the user, the CPU 101 of the terminal device 100 starts execution of the order processing in FIGS. 3A and 3B, which is defined by the sale app. Subsequently, the CPU 101, by executing the processing in steps S01 to S03 (steps S01 to S03), acquires cart information including a product ID identifying the product that has been kept placed in the shopping cart of the user of the terminal device 100.

Next, the CPU 101 of the terminal device 100, after having acquired the search screen from the flash memory 103b, determines that a product is placed in the shopping cart, based on the cart information, and performs setting to enable the objects used in the purchase operation and the like, on the search screen. Subsequently, the CPU 101 causes the display device 105b to display the search screen in which the setting has been performed (step S04).

In the present modified example, the user who has visually recognized the search screen performs the purchase operation on the terminal device 100 in order to purchase the product that has been kept placed in the shopping cart. Thus, the CPU 101 of the terminal device 100 determines, based on a signal output from the input device 105c, that the purchase operation is performed (step S05; No, step S13; No, step S14; No, and step S15). Subsequently, the CPU 101 outputs an order completion request to the data communication circuit 104a with the information processing device 200 as the destination (step S16) and subsequently terminates the execution of the order processing.

When the data communication circuit 204a of the information processing device 200 receives an order acceptance request output in step S01 in FIG. 3A, the CPU 201 of the information processing device 200 starts execution of the sale processing in FIGS. 5, 6A, and 6B. Subsequently, after the processing in steps S21 and S22 has been executed (steps S21 and S22), the updater 230 determines that a product is placed in the cart of the user, because the user ID identifying the user of the terminal device 100 and a product ID are associated with each other in the order table in FIG. 10 (step S23; Yes).

Next, the updater 230 of the information processing device 200 updates, in the order table, the character string "NULL" that is associated with the user ID of the user and that indicates that no order has been accepted with the status ID "S4" of the consideration status, which is a state in which purchase of a product placed in the shopping cart is considered (step S24). Through this processing, the updater 230 accepts the order in accordance with the order acceptance request and sets the status of the accepted order to the consideration status.

Subsequently, the information processing device 200 executes the processing in steps S26 to S29, S33, S37, and S40 to S42 (steps S26 to S29, S33, S37, and S40 to S42). Through this processing, the information processing device 200 causes the status of the order to transition to the settlement status, which is a state in which a purchase price of a product placed in the shopping cart is being settled.

Subsequently, the information processing device 200, by executing the processing in steps S43 and S45 (steps S43 and S45), causes the status of the order to transition to the completion status and subsequently terminates the execution of the sale processing.

Modified Example 2 of Embodiment

In the embodiment, it was described that the user using the terminal device 100, after having placed a product into the shopping cart, performed the keyword input operation in order to cause a result of a search for a product different from the product placed in the shopping cart to be displayed.

However, the embodiment is not limited to the above description, and, in the present modified example, the following description will be made using, as a specific example, a case where the user, after having placed a product into the shopping cart, performs a product selection operation to select a product different from the product placed into the shopping cart.

In the present modified example, when the terminal device 100 determines that the product selection operation to select a product different from the product placed into the shopping cart is performed in step S08 in FIG. 3A (step S08; Yes), the terminal device 100 outputs a detail send request requesting sending of detail information of the selected product, with the information processing device 200 as the destination (step S09).

In the present modified example, when the acquirer 210 of the information processing device 200 determines that data received from the terminal device 100 is a detail send request (step S33 in FIG. 6A; Yes), the acquirer 210 outputs detail information of the selected product with the terminal device 100 as the destination (step S34). Next, the updater 230 of the information processing device 200 determines that a product is placed in the shopping cart (step S35; Yes) and, without causing the status of the order to transition to the product selection status, maintains the status of the order in the consideration status. Subsequently, the information processing device 200 returns to step S29 and repeats the above-described process.

Modified Example 3 of Embodiment

In the embodiment, it was described that the status of an order, after having become the service selection status, transitioned to five statuses, namely the search status, the product selection status, the consideration status, the settlement status, and the completion status, in this order.

However, the embodiment is not limited to the above description, and the status of an order may, after having become the service selection status, repeat transition to the search status, which is a state in which a search for a product is made, and the product selection status, which is a state in which a product found in a search is selected to confirm detail information, in this order m times (where m is a natural number of 2 or more) and subsequently transition to the consideration status, the settlement status, and the completion status in this order.

Modified Example 4 of Embodiment

Although, in the embodiment, it was described that the statuses before transition to the completion status include five statuses, namely the service selection status, the search status, the product selection status, the consideration status, and the settlement status, the embodiment is not limited thereto. The statuses before transition to the completion status may further include one or a plurality of statuses other than the five statuses. In addition, the statuses before transition to the completion status may include only any one or more and four or less statuses among the five statuses. In addition, the statuses before transition to the completion status may include any one or more and four or less statuses among the five statuses and one or a plurality of statuses other than the five statuses.

Modified Example 5 of Embodiment

In the embodiment, it was described that the service selection status is referred to as the first status, the search status and the product selection status are referred to as the second status, the consideration status is referred to as the third status, the settlement status is referred to as the fourth status, and the completion status is referred to as the fifth status.

However, the embodiment is not limited to the above description, and any one or more of one or a plurality of statuses that succeed the service selection status and precede the completion status (that is, the search status, the product selection status, the consideration status, and the settlement status) may be referred to as the first status.

In addition, any one or more of one or a plurality of statuses that succeeds the first status and precede the completion status may be referred to as the second status. That is, when the search status is referred to as the first status, any one or more of the product selection statuses, the consideration status, and the settlement status may be referred to as the second status.

In addition, any one or more of one or a plurality of statuses that succeeds the second status and precede the completion status may be referred to as the third status. Furthermore, any one or more of one or a plurality of statuses that succeeds the third status and precede the completion status may be referred to as the fourth status.

In addition, the fifth status is not limited to the completion status, and any one or more of one or a plurality of statuses that succeeds the fourth status and precede the completion status may be referred to as the fifth status.

Modified Example 6 of Embodiment

In the embodiment, it was described that the movement control included all of (i) the speed control to control the movement speed of the transport vehicle 800 or 900, (ii) the direction control to control the direction of movement of the transport vehicle 800 or 900, and (iii) the routing control to reset a movement route that has been set to the transport vehicle 800 or 900. However, the embodiment is not limited to the above description, and the movement control may be any one or two of (i) the speed control, (ii) the direction control, and (ii) the routing control.

In addition, although, in the embodiment, it was described that the speed control included both speed control corresponding to the first status and speed control corresponding to the third status, the embodiment is not limited thereto, and the speed control may include only one of the speed control corresponding to the first status and the speed control corresponding to the third status. Further, although it was described that the speed control corresponding to the first status included both the low speed control to, when the transport vehicle 800 or 900 moves away from the start location of transport, cause the transport vehicle 800 or 900 to change movement speed thereof to a low speed slower than a reference speed and the reference speed control to, when the transport vehicle 800 or 900 does not move away from the start location of transport, cause the transport vehicle 800 or 900 to change movement speed thereof to the reference speed, the embodiment is not limited thereto, and the speed control corresponding to the first status may include only the low speed control that is performed when the transport vehicle 800 or 900 moves away from the start location of transport.

In addition, although, in the embodiment, it was described that the routing control included both the first routing control corresponding to the fourth status and the second routing control corresponding to the fifth status, the embodiment is not limited thereto, and the routing control may include only the first routing control corresponding to the fourth status.

Modified Example 7 of Embodiment

In the embodiment, it was described that the second route was a route that has a shorter length but a larger consumed amount of energy and lower safety than the entire route or a partial route of the first route, which starts from the location of the transport vehicle 800 or 900 and reaches the start location of transport. However, the embodiment is not limited to the above description, and the second route may be a route that has a shorter length but a larger consumed amount of energy than the entire route or the partial route of the first route.

In this case, the controller 250 of the information processing device 200 initializes the first weighting factor, which is used in weighting of the first evaluation value based on total length, the second weighting factor, which is used in weighting of the second evaluation value based on safety, and the third weighting factor, which is used in weighting of the third evaluation value based on a consumed amount of energy, to the first to third initial values, respectively, in step S75 in FIG. 11B. Subsequently, the controller 250, although not correcting the first weighting factor and the second weighting factor, corrects the third weighting factor to a smaller value than a value before correction.

Next, the controller 250 of the information processing device 200 calculates, as an overall evaluation value, the sum of values obtained by respectively weighting the first to third evaluation values by the uncorrected first weighting factor and second weighting factor and the corrected third weighting factor, with respect to each of the M entire routes that have shorter lengths than the entire route or a partial route of the first route. Subsequently, the controller 250 determines an entire route for which a highest overall evaluation value is calculated among the M overall evaluation values as the second route along which the vehicle 800 or 900 is caused to move.

In addition, the second route may be a route that has a shorter length but lower safety than the entire route or a partial route of the first route. In this case, the controller 250 of the information processing device 200 corrects the second weighting factor, which is used in weighting of the second evaluation value based on safety and has been initialized, to a value smaller than the value before correction. In contrast, the controller 250 does not correct the first weighting factor, which is used in weighting of the first evaluation value based on total length and has been initialized, and the third weighting factor, which is used in weighting of the third evaluation value based on a consumed amount of energy and has been initialized.

Next, the controller 250 of the information processing device 200 calculates, as an overall evaluation value, the sum of values obtained by respectively weighting the first to third evaluation values by the uncorrected first weighting factor and third weighting factor and the corrected second weighting factor, with respect to each of the M entire routes that have shorter lengths than the entire route or a partial route of the first route. Subsequently, the controller 250 determines the second route from among the M entire routes, based on the overall evaluation values.

Modified Example 8 of Embodiment

Although, in the embodiment, it was described that, when the movement route was set to the circulation route, the vehicles 800 and 900, by moving along the movement route, moved in circulation, the embodiment is not limited thereto. The vehicles 800 and 900 may move in circulation when no movement route is set.

For this purpose, when no movement route is set, the vehicles 800 and 900 are only required to move in circulation by repeating the following first processing and second processing. The first processing is processing of repeating movement over a predetermined distance in a direction that is a direction in which the vehicles 800 and 900 can move and that is selected from among a plurality of directions that moves away from the start location of transport, based on, for example, software-generated random numbers or a predetermined rule, over a predetermined period. The second processing is processing of repeating movement over a predetermined distance in a direction that is a direction in which the vehicles 800 and 900 can move and that is selected from among a plurality of directions that comes close to the start location of the transport, based on, for example, software-generated random numbers or a predetermined rule, until the vehicle 800 or 900 arrives at the start location of the movement.

In this case, the controller 250 of the information processing device 200 is required to execute, as the movement control corresponding to the fourth status, first routing control of (i) determining a first route that has a shorter length than a predicted distance and (ii) setting the movement route of the transport vehicle 800 or 900, the movement route not having been set to any route, to the determined first route. The predicted distance is a distance over which the transport vehicle 800 or 900 to which no movement route is set is predicted to move from the location of the transport vehicle 800 or 900 to the start location of transport when the routing control is not performed.

In order to calculate a predicted distance, the controller 250 of the information processing device 200 is only required to calculate a distance over which the transport vehicle 800 or 900 moves, a predetermined number of times by, for example, executing simulation using a probability model and software-generated random numbers multiple times and set an average value of a plurality of calculated distances as a predicted distance. In addition, the calculation method of a predicted distance is not limited to this method, and the controller 250 may, for example, theoretically calculate an expected value of distance over which the transport vehicle 800 or 900 moves, using a probability model and set the calculated expected value as a predicted distance.

In addition, the controller 250 of the information processing device 200 is only required to execute, as movement control corresponding to the fifth status, the second routing control of (i) setting the movement route of the transport vehicle 800 or 900, the movement route not having been set to any route, to the second route or (ii) resetting the movement route of the transport vehicle 800 or 900, the movement route has been set to the first route, to the second route.

In addition, when, although no movement route is set, a first destination and a second destination are set, the vehicles 800 and 900 may move in circulation between the first destination and the second destination by repeating the following third processing and fourth processing. The third processing is processing of repeating movement over a predetermined distance in a direction that is a direction in which the vehicles 800 and 900 can move and that is selected from among a plurality of directions that comes close to the first destination, based on, for example, software-generated random numbers or a predetermined rule, until the vehicle 800 or 900 arrives at the first destination. The fourth processing is processing of repeating movement over a predetermined distance in a direction that is a direction in which the vehicles 800 and 900 can move and that is selected from among a plurality of directions that come close to the second destination, based on, for example, software-generated random numbers or a predetermined rule, until the vehicle 800 or 900 arrives at the second destination.

Further, the vehicles 800 and 900 do not have to move in circulation and may, for example, move to a set destination without setting a movement route. In this case, the vehicles 800 and 900 may repeat movement over a predetermined distance in a direction that is a direction in which the vehicles 800 and 900 can move and that is selected from among a plurality of directions that comes close to the destination, based on, for example, software-generated random numbers or a predetermined rule, until the vehicle 800 or 900 arrives at the destination.

Modified Example 9 of Embodiment

In the embodiment, it was described that the vehicles 800 and 900 move in circulation. The circulation movement may include repeating cyclic movement starting from a predetermined start location of movement, passing a plurality of predetermined transit locations in a predetermined sequence, and arriving at the start location of movement. In this case, a direction of movement for passing the plurality of predetermined transit locations in the predetermined sequence is the forward direction, and a direction of movement for passing the predetermined transit locations in the reverse sequence to the predetermined sequence is the backward direction.

In addition, the movement along the circulation route may include shuttle movement of repeating outward movement of moving along a predetermined route from the start location of the route to the end location and homeward movement of moving along the route from the end location to the start location.

Further, in the embodiment, it was described that the circulation route was ring-shaped. Although the ring shape includes, for example, a circular shape and an elliptical shape, the shape of the circulation route is not limited thereto. The shape of the circulation route may be a shape, such as the shape of the number 8, in which the route crosses itself or a polygonal shape, such as a triangular shape.

Modified Example 10 of Embodiment

In the embodiment, it was described that the information processing device 200 performed movement control according to a status of an order on the transport vehicle 800 or 900 that was moving in circulation. However, the embodiment is not limited to the above description, and the information processing device 200 may perform movement control according to a status of an order on the transport vehicle 800 or 900 that has finished transport of a product and that moves to the start location of transport or a location on the circulation route.

In addition, the information processing device 200 may perform movement control according to a status of an order on the transport vehicle 800 or 900 that has come to a stop, parks, or is performing shuttle movement at a location different from the start location of transport.

Modified Example 11 of Embodiment

In the embodiment, it was described that the sale app, which was used for provision of a sale service to perform sale and transport of a product, was executed. In the embodiment, it was also described that an order was a request requesting sale and transport of a product and a target of an order was a product of which the sale and transport were requested.

However, in the present modified example, the following description will be made using, as a specific example, a case where, for example, a ride app that is used for provision of a ride service to perform transport of a user is executed. In addition, in the present modified example, the following description will be made using, as a specific example, a case where an order is a request requesting dispatch of the vehicle 800 or 900 for transport of the user, and a target of an order is the user himself/herself.

Although, in the present modified example, it will be described that, since transport of a user is performed for profit, the transport vehicle 800 or 900 functions as a driverless taxi, the present modified example is not limited thereto. The transport vehicle 800 or 900 may function as a free driverless transporter when the transport of a user is performed without charge.

A user who uses the terminal device 100 according to the present modified example performs an operation to start up the ride app used for provision of a ride service, on the terminal device 100. Thus, the terminal device 100, by starting execution of the ride app, starts execution of not-illustrated order processing that is defined by the ride app.

When starting execution of the order processing, the terminal device 100 acquires location information indicating a location of the terminal device 100 in latitude, longitude, and altitude, based on a signal output from the location measurement circuit 106. Next, the terminal device 100, by executing processing similar to the processing in step S01 in FIG. 3A, sends an order acceptance request that includes a service ID of the ride service and the location information of the terminal device 100 and that requests acceptance of an order and provision of the ride service, to the information processing device 200. Subsequently, when the terminal device 100, by executing processing similar to the processing in steps S02 and S03, determines that the order is accepted by the information processing device 200, the terminal device 100 receives cart information from the information processing device 200.

In the present modified example, in the shopping cart of the user who uses the terminal device 100, a transport route candidate reaching a transport destination selected by the user is placed. Thus, in the present modified example, the statement that a transport route candidate is placed in the shopping cart of the user means that information indicating a transport route candidate is stored in the information processing device 200 in association with the user ID of the user. Therefore, when a transport route candidate is placed in the shopping cart of the user, the cart information of the user includes information indicating the transport route candidate that the information processing device 200 stores in association with the user ID of the user. In contrast, when the shopping cart is empty and no transport route candidate is placed in the shopping cart, the cart information does not include information indicating a transport route candidate.

In the present modified example, in order to simplify description, the following description will be made using, as a specific example, a case where the shopping cart is empty because the user of the terminal device 100 causes a dispatch app to be executed for the first time. Thus, when the terminal device 100 acquires a search screen used for a search for a transport destination from the flash memory 103*b* and subsequently determines that the shopping cart is empty, the terminal device 100 performs setting to disable an object used in an operation to determine a transport route candidate placed in the shopping cart as the transport route (hereinafter, referred to as a determination operation), on the search screen. On the other hand, the terminal device 100 performs setting to enable an object that is used in a keyword input operation to input a keyword used for a search for a transport destination, on the search screen. Subsequently, the terminal device 100, by executing processing similar to the processing in step S04, displays the search screen in which the setting has been performed.

Next, in the present modified example, the following description will be made using, as a specific example, a case where the keyword input operation is performed in order to search for a transport destination. Thus, when the terminal device 100, by executing processing similar to the processing in step S05, determines that the keyword input operation is performed, the terminal device 100, by executing processing similar to the processing in step S06, acquires a keyword used in the search for a transport destination. Subsequently, the terminal device 100 generates a search request that includes information indicating the acquired keyword and that requests sending of information indicating a result of the search for a transport destination based on the keyword. Subsequently, the terminal device 100, as with step S06, sends the generated search request to the information processing device 200.

When the terminal device 100 receives information indicating a search result from the information processing device 200, the terminal device 100 acquires a search result screen from the flash memory 103*b* and, since the shopping cart is empty, performs setting to disable an object used in the determination operation, on the search result screen. On the other hand, the terminal device 100 performs setting to enable an object that is used in an operation to select one of one or a plurality of transport destinations found in the search and cause a detail screen in which a transport route candidate reaching the selected transport destination is described to be displayed (hereinafter, referred to as a transport destination selection operation), on the search result screen. Subsequently, the terminal device 100, by executing processing similar to the processing in step S07, adds a search result indicated by the received information to the search result screen in which the setting has been performed and displays the search result screen to which the search result has been added.

Next, in the present modified example, the following description will be made using, as a specific example, a case where the transport destination selection operation is performed. Thus, when the terminal device 100, by executing processing similar to the processing in step S08, determines that the transport destination selection operation is performed, the terminal device 100 identifies a selected transport destination, based on a signal output from the input device 105*c*. Subsequently, the terminal device 100 generates a route send request that includes information indicating the identified transport destination and that requests sending of information indicating a transport route candidate reaching the transport destination. Subsequently, the terminal device 100, as with step S09, sends the generated route send request to the information processing device 200.

When the terminal device 100 receives one or a plurality of pieces of information indicating transport route candidates from the information processing device 200, the terminal device 100, as with step S10, acquires a detail screen from the flash memory 103*b*. Next, the terminal device 100 determines that the shopping cart is empty and performs setting to disable the object used in the determination operation, on the detail screen. In contrast, the terminal device 100 selects a transport route candidate from among the one or plurality of transport route candidates and performs setting to enable an object used in a route selection operation to place the selected transport route candidate into the shopping cart, on the detail screen. Next, the terminal device 100 adds a transport route candidate indicated by each of the acquired one or plurality of pieces of information to the detail screen in which the setting has been performed. Subsequently, the terminal device 100 displays the detail screen to which the one or plurality of transport route candidates have been added.

Next, in the present modified example, the following description will be made using, as a specific example, a case where the route selection operation is performed. Thus, when the terminal device 100, by executing processing similar to the processing in step S11, determines that the route selection operation is performed, the terminal device 100 adds information indicating a selected transport route candidate to the cart information. Subsequently the terminal device 100, as with step S12, sends a consideration report that includes information indicating the transport route candidate added to the cart information and that announces that determining the transport route candidate as the transport route is considered, to the information processing device 200.

Next, the terminal device 100, by executing processing similar to the processing in step S10, determines that a transport route candidate is placed in the shopping cart. Subsequently, the terminal device 100 performs setting to enable the object used in the determination operation to determine the transport route candidate in the shopping cart as the transport route, on the detail screen.

Next, in the present modified example, the following description will be made using, as a specific example, a case where the determination operation is performed. Thus, when the terminal device 100, by executing processing similar to the processing in steps S11 and S13 to S16, determines that the determination operation is performed, the terminal device 100 sends an order completion request to the information processing device 200 and subsequently terminates the execution of the order processing.

The information processing device 200 according to the present modified example stores, in place of the user table in FIG. 9, a not-illustrated user table in advance. Although, in each record of the not-illustrated user table, a user ID identifying a user, information indicating a password of the user, and settlement information of the user are associated with one another and stored in advance, no information indicating a transport destination is stored in advance. The reason why no information indicating a transport destination is stored in advance is that, in the present modified example, the transport destination is not specified by a user before the order processing is executed but is specified during execution of the order processing.

In addition, the information storage 290 of the information processing device 200 stores, in place of the order table in FIG. 10, a not-illustrated order table. In each record of the not-illustrated order table, as with the embodiment, a user ID of a user who makes an order is stored in advance. In addition, in a record in which the user ID of a user whose order has been accepted is stored, a status ID identifying a status of the order and information indicating a transport route candidate that is placed in the shopping cart of the user are stored in association with the user ID. In addition, in the record in which the user ID is stored, the vehicle ID of the vehicle 800 or 900 that is selected as a transport vehicle caused to transport the user and a non-execution flag indicating whether or not movement control according to the status has not been executed are stored in association with the user ID. In contrast, in a record in which the user ID of a user whose order has not been accepted is stored, character strings "NULL" are stored in association with the user ID.

When the information processing device 200 receives an order acceptance request from the terminal device 100, the information processing device 200 determines that the service ID included in the received order acceptance request is the service ID of the ride service. Next, the information processing device 200 executes not-illustrated dispatch processing in order to provide the ride service.

When the information processing device 200 starts the execution of the dispatch processing, the information processing device 200, by executing processing similar to the processing in steps S21 and S22 in FIG. 5, acquires the order acceptance request and authenticates the user of the terminal device 100, based on authentication information included in the order acceptance request.

Next, the updater 230 of the information processing device 200 determines whether or not a transport route candidate is placed in the shopping cart of the user, based on whether or not the user ID identifying the user of the terminal device 100 and information indicating the transport route candidate are associated with each other in the not-illustrated order table.

In the present modified example, the description of the dispatch processing will be made using the same example as the specific example having been used for describing the not-illustrated order processing. Thus, the information processing device 200, by executing processing similar to the processing in step S23, determines that no transport route candidate is placed in the shopping cart. Next, the updater 230 of the information processing device 200, by executing processing similar to the processing in step S25, updates, in the not-illustrated order table, the character string "NULL" associated with the user ID identifying the user of the terminal device 100 with the status ID of the service selection status, which is a state in which the ride service is selected. Note that, when the information processing device 200 determines that a transport route candidate is placed in the shopping cart, the information processing device 200, by executing processing similar to the processing in step S24, updates the status ID associated with the user ID with the status ID of the consideration status. In this way, the information processing device 200 accepts the order in accordance with the order acceptance request.

Subsequently, the information processing device 200, by executing processing similar to the processing in steps S26 and S27, sends an acceptance report and cart information to the terminal device 100. Next, the acquirer 210 of the information processing device 200 acquires the location information of the terminal device 100 from the order acceptance request. Subsequently, the controller 250 identifies a location that is closest to the location of the terminal device 100 and at which the vehicles 800 and 900 can come to a stop or park, based on the acquired location information and information indicating a location at which the vehicles 800 and 900 can come to a stop or park that the information storage 290 stores in advance.

Although, subsequently, the controller 250 of the information processing device 200 determines the identified location as a start location of transport, the start location of transport is not limited thereto. The controller 250 may determine, as the start location of transport, a location that is closer to the location of the terminal device 100 than a location apart from the location of the terminal device 100 by a predetermined distance and at which the vehicles 800 and 900 can come to a stop or park.

Next, the information processing device 200, by executing processing similar to the processing in step S28, selects a transport vehicle caused to transport the user, based on the location of the vehicle 800, the location of the vehicle 900, and the start location of transport.

Next, in the present modified example, a search request requesting a search for a transport destination based on a keyword is sent from the terminal device 100. Thus, when the information processing device 200 receives the search request, the information processing device 200 executes processing similar to the processing in steps S29 and S30. Through this processing, the acquirer 210 of the information processing device 200 searches a not-illustrated address table, which the information storage 290 stores in advance, for one or a plurality of pieces of information indicating addresses associated with the keyword included in the search request, as information indicating transport destinations. A plurality of records is stored in the address table in advance, and, in each record, information indicating an address and a keyword describing the address or a facility existing at the address are associated with each other in advance and stored.

Subsequently, the acquirer 210 of the information processing device 200, by executing processing similar to the processing in step S30, outputs information indicating one or a plurality of transport destinations found in the search to the data communication circuit 204a with the terminal device 100 as the destination, as information indicating a search result. Next, the information processing device 200, by executing processing similar to the processing in steps S31 and S32, causes the status of the order to transition to the search status.

Next, in the present modified example, a transport route candidate is identified, which reaches the transport destination selected by the user from among the one or plurality of transport destinations found in the search, and a route send request requesting sending of information indicating the identified transport route candidate is sent from the terminal device 100. Thus, when the information processing device 200 receives the route send request, the information processing device 200 executes processing similar to the processing in steps S29, S33, and S34. Through this processing, the acquirer 210 of the information processing device 200 acquires information indicating the transport destination included in the route send request. Next, the controller 250, by executing processing similar to the processing in step S71 in FIG. 11B, identifies a transport route candidate from the start location of transport to the transport destination or a plurality of transport route candidates from the start location of transport to the transport destination in ascending order of the total length. Subsequently, the acquirer 210 outputs a piece of information indicating each of the one or plurality of transport route candidates found in the search to the data communication circuit 204a with the terminal device 100 as the destination. Next, the information processing device 200, by executing processing similar to the processing in steps S35 and S36, causes the status of the order to transition to a transport destination selection status.

Next, in the present modified example, a consideration report is sent from the terminal device 100. The consideration report is a report announcing that determination of transport route is considered and the determination of transport route is determining, as the transport route, a transport route candidate selected by the user from among the one or plurality of transport route candidates. Thus, when the information processing device 200 receives the consideration report, the information processing device 200, by executing processing similar to the processing in steps S29, S33, S37, and S38, acquires information indicating the considered transport route candidate from the consideration report. Subsequently, the updater 230 of the information processing device 200 stores the acquired information indicating the transport route candidate in the not-illustrated order table in association with the user ID identifying the user of the terminal device 100. This operation causes the transport route candidate to be placed into the shopping cart of the user. Subsequently, the information processing device 200, by executing processing similar to the processing in step S39, causes the status of the order to transition to the consideration status.

Next, in the present modified example, an order completion request is sent from the terminal device 100. Thus, when the information processing device 200 receives the order completion request, the information processing device 200 executes the processing in steps S29, S33, S37, and S40 to S42. Through this processing, the information processing device 200 sends a settlement request requesting settlement of a transport price of the user and subsequently causes the status of the order to transition to the settlement status. Subsequently, when the information processing device 200, by executing processing similar to the processing in steps S43 and S45, succeeds in the settlement, the information processing device 200 causes the status of the order to transition to the completion status and subsequently terminates the execution of the dispatch processing.

In the present modified example, as with the embodiment, the status of the order can be caused to transition to the completion status only after having been caused to transition to the settlement status. In addition, the status of the order can be caused to transition to the settlement status only after having been caused to transition to the consideration status. Thus, as with the embodiment, probability of the status of the order being caused to transition from the settlement status to the completion status is higher than probability of the status of the order being caused to transition from the consideration status to the completion status. In addition, transition time required for the status of the order to be caused to transition from the settlement status to the completion status is shorter than transition time required for the status of the order to be caused to transition from the consideration status to the completion status.

Further, in the present modified example, the status of the order can be caused to transition to the consideration status only after having been caused to transition to the transport destination selection status, the status of the order can be caused to transition to the transport destination selection status only after having been caused to transition to the search status, and the status of the order can be caused to transition to the search status only after having been caused to transition to the service selection status.

Because of this configuration, the probability of the search status is higher than the probability of the service selection status. In addition, probability of the status of the order being caused to transition from the transport destination selection status to the completion status (hereinafter, referred to as probability of the transport destination selection status) is higher than the probability of the search status. Further, the probability of the consideration status is higher than the probability of the transport destination selection status.

For the same reason, the transition time of the search status is shorter than the transition time of the service selection status. In addition, time required for the status of the order to be caused to transition from the transport destination selection status to the completion status (hereinafter, referred to as transition time of the transport destination selection status) is shorter than the transition time of the search status. Further, the transition time of the consideration status is shorter than the transition time of the transport destination selection status.

Because of these restrictions, in the present modified example, as with the embodiment, not-illustrated movement control processing of controlling movement of the vehicle 800 or 900 according to the status of the order is performed at a predetermined time interval. In the present modified example, as with the embodiment, the service selection status is referred to as a first status, the consideration status is referred to as a third status, the settlement status is referred to as a fourth status, and the completion status is referred to as a fifth status. In contrast, in the present modified example, the search status and the transport destination selection status are referred to as a second status.

When the information processing device 200 starts the execution of the movement control processing according to the present modified example, the information processing device 200, by executing processing similar to the processing in steps S51 to S55 in FIG. 11A, acquires one or a plurality of records in which status IDs of the order are stored from the not-illustrated order table. Next, the information processing device 200 sets one of records that have not been checked among the acquired one or plurality of records as a target of a check and acquires a status ID from the checked record.

Subsequently, when the information processing device 200 determines that the acquired status ID is the status ID of the first status, the information processing device 200 executes processing similar to the processing in step S56. Through this processing, the information processing device 200 acquires the location information of the transport vehicle 800 or 900 twice at a predetermined time interval.

Next, the acquirer 210 of the information processing device 200 acquires information indicating a circulation route from the information storage 290. Subsequently, the controller 250 identifies a location located in the vicinity of the start location of transport (hereinafter, referred to as a vicinity location) on the circulation route, based on the start location of transport and the information indicating the circulation route. The reason why the vicinity location is identified is that, in the present modified example, the start location of the circulation route is set to a location that has no relation to the start location of transport determined based on the location of the terminal device 100, in advance.

In the present modified example, the vicinity location is a location, on the circulation route, at which the vehicles 800 and 900 can come to a stop or park and that is the closest location closest to the start location of transport. However, the present modified example is not limited to the above description, and the vicinity location may be any location, provided that the location is a location within a section of the circulation route from a boundary line to the closest location and is a location at which the vehicles 800 and 900 can come to a stop or park. The boundary line is apart from the closest location by a predetermined distance.

Subsequently, the controller 250 of the information processing device 200, by executing processing similar to the processing in step S28 in FIG. 5, calculates a shortest distance on the circulation route from a location of the transport vehicle 800 or 900, the location being indicated by the location information acquired in the first round, to the vicinity location, as a first-round distance. Next, the controller 250 calculates a shortest distance on the circulation route from a location of the transport vehicle 800 or 900, the location being indicated by the location information acquired in the second round, to the vicinity location, as a second-round distance. Subsequently, the controller 250, by executing processing similar to the processing in step S57 in FIG. 11A, determines whether or not the transport vehicle 800 or 900 moves away from the vicinity location, based on whether or not the first-round distance is shorter than the second-round distance.

When, on this occasion, the information processing device 200 determines that the transport vehicle 800 or 900 does not move away from the vicinity location, the information processing device 200 determines that the transport vehicle 800 or 900 does not move away from the start location of transport. Next, the information processing device 200, by executing processing similar to the processing in step S58, performs the reference speed control. In contrast, when the information processing device 200 determines that the transport vehicle 800 or 900 moves away from the vicinity location, the information processing device 200 determines that the transport vehicle 800 or 900 moves away from the start location of transport. Next, the information processing device 200, by executing processing similar to the processing in step S59, performs the low speed control. The information processing device 200, after having executed the reference speed control or the low speed control, repeats the above-described process from processing similar to the processing in step S51.

When the information processing device 200, by executing processing similar to the processing in step S55, determines that the acquired status ID is not the status ID of the first status, the information processing device 200, by executing processing similar to the processing in step S60, determines whether or not the acquired status ID is the status ID of the second status. When, on this occasion, the information processing device 200 determines that the acquired status ID is the status ID of the second status, the information processing device 200 executes processing similar to the processing in steps S61 to S64. When, through this processing, the information processing device 200 determines that the transport vehicle 800 or 900 moves away from the start location of transport, the information processing device 200 performs the direction control and the reference speed control. Subsequently, the information processing device 200 repeats the above-described process from processing similar to the processing in step S51.

When the information processing device 200, by executing processing similar to the processing in steps S55 and S60, determines that the acquired status ID is neither the status ID of the first status nor the status ID of the second status, the information processing device 200, by executing processing similar to the processing in step S65, determines whether or not the acquired status ID is the status ID of the third status. When, on this occasion, the information processing device 200 determines that the acquired status ID is the status ID of the third status, the information processing device 200 executes processing similar to the processing in steps S66 and S67. When, through this processing, the information processing device 200 determines that the high speed control, which is movement control corresponding to the third status, has not been executed, the information processing device 200 executes the high speed control. On this occasion, the controller 250 of the information processing device 200 outputs a high speed command that includes information indicating a high speed and the information indicating the vicinity location and that commands movement along the circulation route at the high speed to the vicinity location, to the data communication circuit 204a with the transport vehicle 800 or 900 as the destination. Subsequently, the information processing device 200 repeats the above-described process from processing similar to the processing in step S51.

When, in processing similar to the processing in steps S55, S60, and S65, the information processing device 200 determines that the acquired status ID is none of the status IDs of the first to third statuses, the information processing device 200, by executing processing similar to the processing in step S68, determines whether or not the acquired status ID is the status ID of the fourth status. When, on this occasion, the information processing device 200 determines that the acquired status ID is the status ID of the fourth status, the information processing device 200 executes processing similar to the processing in steps S69 to S72. When, through this processing, the information processing device 200 determines that the first routing control, which is movement control corresponding to the fourth status, has not been executed, the information processing device 200 executes the first routing control. Subsequently, the information processing device 200 repeats the above-described process from processing similar to the processing in step S51.

In contrast, when the information processing device 200 determines that the acquired status ID is not the status ID of the fourth status, the information processing device 200 determines that the acquired status ID is the status ID of the fifth status and subsequently executes processing similar to the processing in steps S73 to S76. When, through this processing, the information processing device 200 determines that the second routing control, which is movement control corresponding to the fifth status, has not been executed, the information processing device 200 executes the second routing control. Subsequently, the information processing device 200 repeats the above-described process from processing similar to the processing in step S51.

When, in processing similar to the processing in step S51, the information processing device 200 determines that there exists no record that has not been checked, the information processing device 200 terminates the execution of the movement control processing.

Figure 17A:
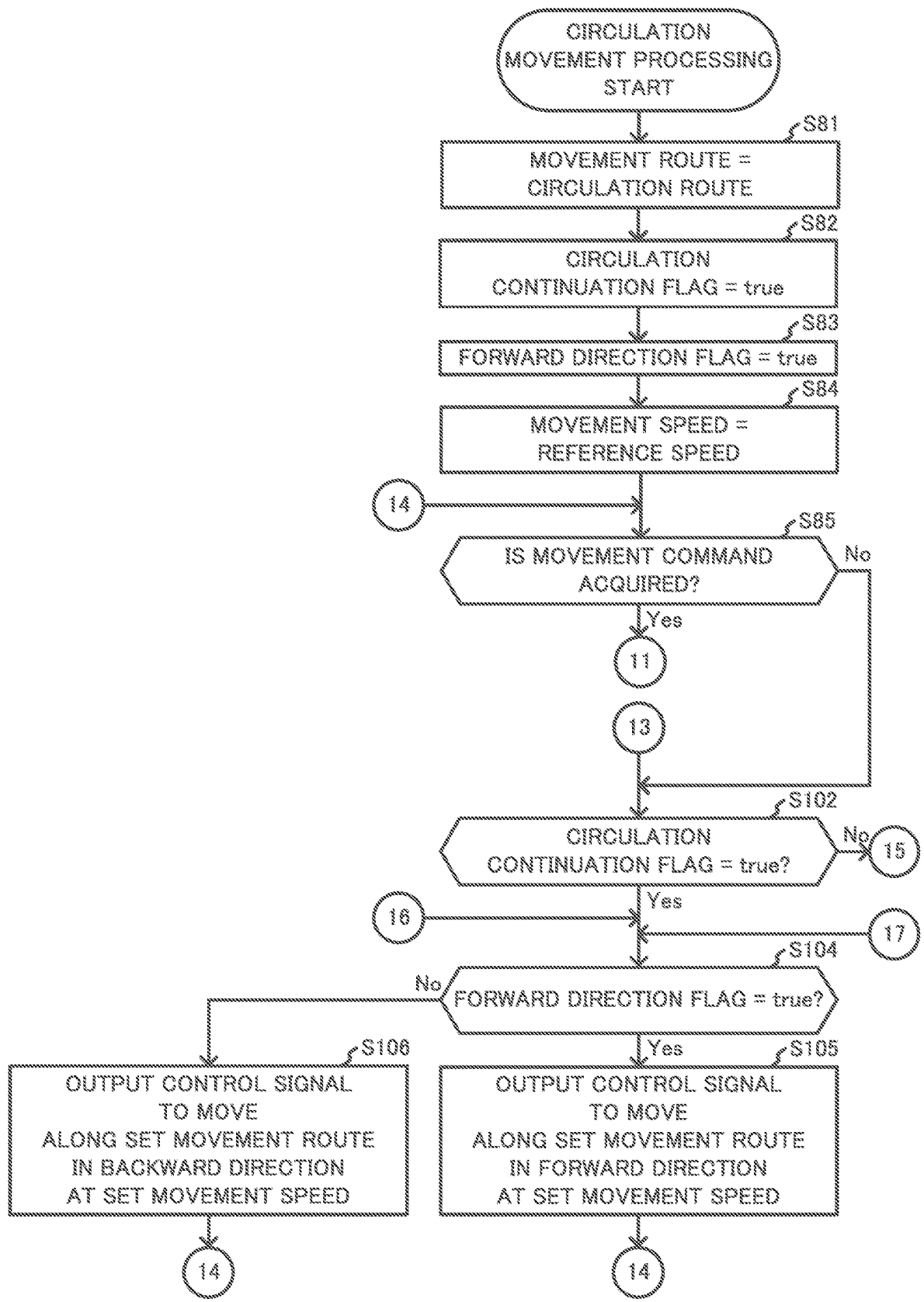
FIGS. 17A and 17B are a portion of a flowchart illustrating an example of circulation movement processing that a vehicle according to Modified Example 11 of the embodiment executes.
Figure 17B:
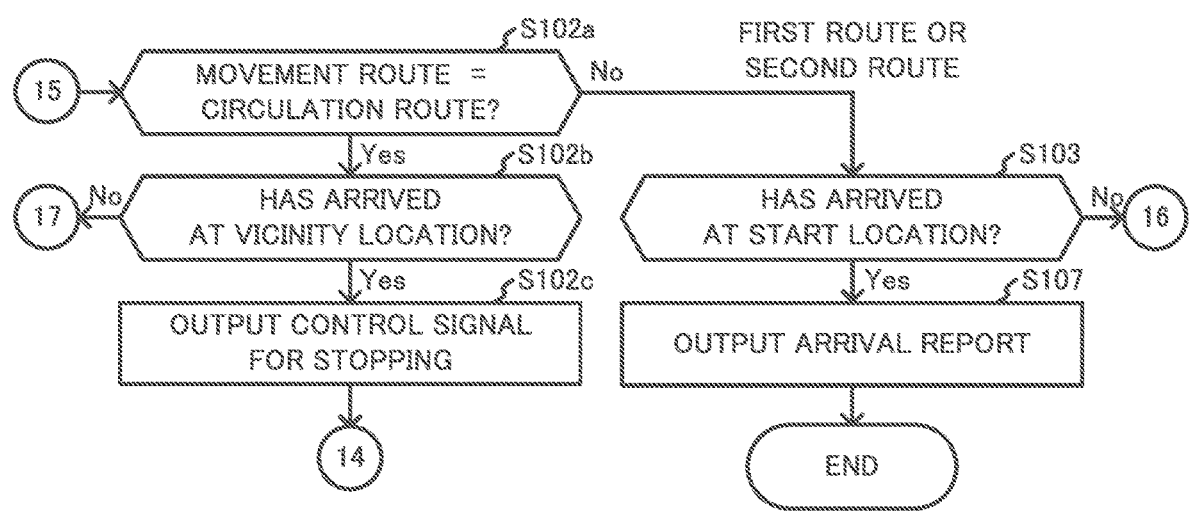

The CPU 891 of the vehicle 800 according to the present modified example executes circulation movement processing as illustrated in FIGS. 17A and 17B. When the CPU 891 starts the execution of the circulation movement processing in FIGS. 17A and 17B, the CPU 891 executes the processing in steps S81 to S102 described in the embodiment (steps S81 to S102). Subsequently, when the CPU 891 determines that the value of the circulation continuation flag is the value "true" (step S102; Yes), the CPU 891 executes processing in steps S104 to S106, which was described in the embodiment, in order to continue movement along the circulation route. Subsequently, the CPU 891 repeats the above-described process from step S85.

In contrast, when the CPU 891 of the vehicle 800 determines that the value of the circulation continuation flag is the value "false" (step S102; No), the CPU 891 determines whether or not the movement route is set to the circulation route (step S102a). When, on this occasion, the CPU 891 determines that the movement route is set to the circulation route (step S102a; Yes), the CPU 891 acquires information indicating the vicinity location included in the high speed command. Next, the CPU 891, by executing processing similar to the processing in step S103, which was described in the embodiment, determines whether or not the vehicle 800 has arrived at the vicinity location (step S102b). When, on this occasion, the CPU 891 determines that the vehicle 800 has not arrived at the vicinity location (step S102b; No), the CPU 891 executes the processing in steps S104 to S106, which was described in the embodiment, in order to move along the circulation route in the direction in which the vehicle 800 comes close to the vicinity location. Subsequently, the CPU 891 repeats the above-described process from step S85.

In contrast, when the CPU 891 of the vehicle 800 determines that the vehicle 800 has arrived at the vicinity location located in the vicinity of the start location of transport (step S102b; Yes), the CPU 891 outputs a control signal to come to a stop or park at the vicinity location to the drive circuit 899 (step S102c) and subsequently repeats the above-described process from step S85.

When, in step S102a, the CPU 891 of the vehicle 800 determines that the movement route is not set to the circulation route (step S102a; No), the CPU 891 determines that the movement route has been reset to the first route or the second route. Next, when the CPU 891 determines that the vehicle 800 has not arrived at the start location of transport, which is the end point of the first route or the second route, (step S103; No), the CPU 891 executes the processing in steps S104 to S106, which was described in the embodiment, in order to continue movement along the first route or the second route. Subsequently, the CPU 891 repeats the above-described process from step S85.

In contrast, when the CPU 891 of the vehicle 800 determines that the vehicle 800 has arrived at the start location of transport (step S103; Yes), the CPU 891, by executing the processing in step S107, outputs an arrival report and subsequently terminates the execution of the circulation movement processing.

The vehicle 800 according to the present modified example includes a not-illustrated seat and a not-illustrated body covering the seat instead of the storage cabinet 820 on the upper surface of the chassis 810 including a plurality of wheels. The body includes a not-illustrated instrument panel, and the instrument panel includes the information processing device 890 at a location at which the user who is seated on the seat can operate the information processing device 890. In addition, the body includes a not-illustrated door, and, when the vehicle 800 arrives at the start location of transport, the user opens the door and rides on the vehicle 800, and, after having been seated on the seat, performs an operation to start movement on the information processing device 890. When the input device 895c of the information processing device 890 outputs a signal corresponding to the operation, the CPU 891 of the information processing device 890, by executing the transport processing illustrated in FIG. 16, transports the user to the transport destination.

Modified Example 12 of Embodiment

Figure 18:
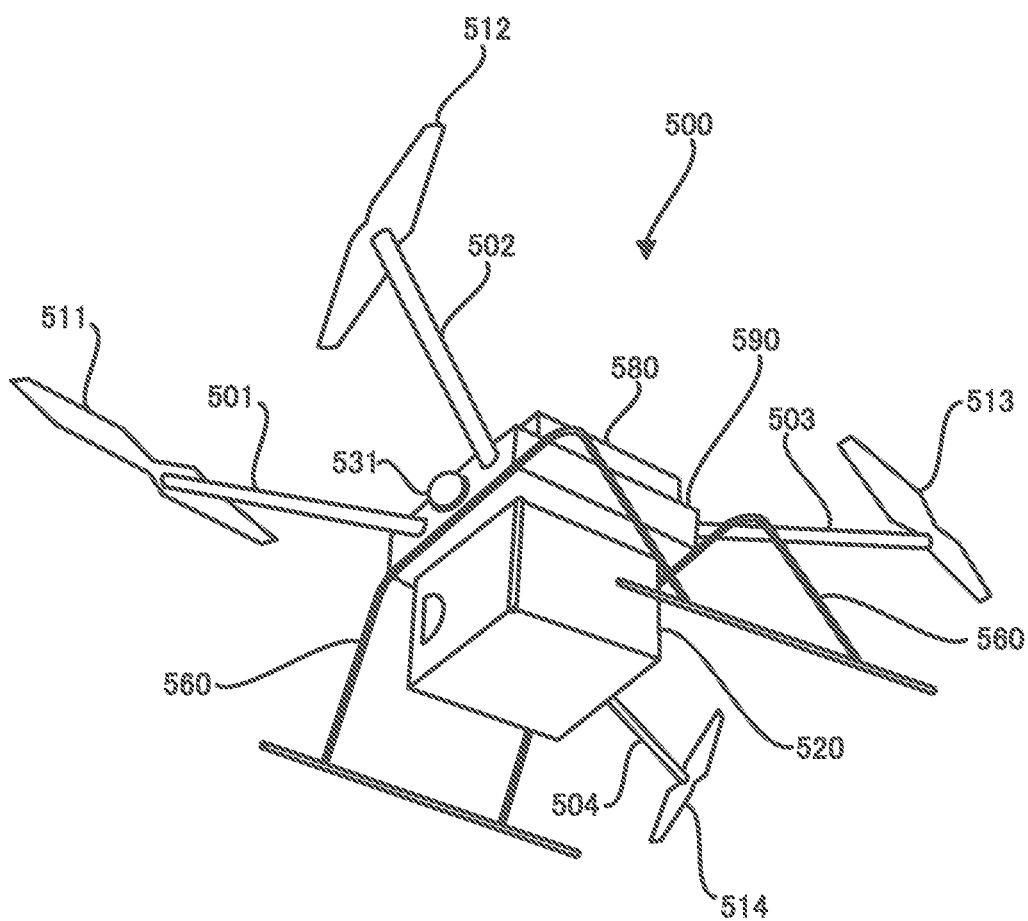
FIG. 18 is an appearance configuration diagram illustrating an appearance example of a vehicle according to Modified Example 12 of the embodiment.

In the embodiment, it was described that the information processing system 1 included the vehicles 800 and 900 that are unmanned ground vehicles. However, the embodiment is not limited to the configuration, and the information processing system 1 according to the present modified example includes a vehicle 500, as illustrated in FIG. 18, that is an unmanned aircraft, such as a drone, and the vehicle 900, which is an unmanned ground vehicle.

In the present modified example, the information storage 290 of the information processing device 200 stores, in advance, a not-illustrated partial route table in each record of which latitude, longitude, and altitude of the start node and latitude, longitude, and altitude of the end node of an edge, information indicating length of the edge, and information indicating a degree of congestion of the edge are stored in association with one another.

Although, in the present modified example, the degree of congestion is represented by the number of times that the vehicle 500 has performed avoidance movement, such as deceleration and change in flight altitude, in order to prevent contact with a vehicle other than the vehicle 500, an animal, such as a bird and a cat, or the like while the vehicle 500 flies the edge by a unit distance, the present modified example is not limited thereto. In addition, although, in the present modified example, the degree of congestion is an average value or a maximum value of actual values of the number of executions of avoidance movement per unit distance that is calculated based on a flight history of the vehicle 500, the present modified example is not limited thereto.

In the present modified example, when the controller 250 of the information processing device 200 determines a first route along which the vehicle 500 is caused to move in step S71 in FIG. 11B, the controller 250 calculates a second evaluation value based on safety, using the not-illustrated partial route table. Likewise, when the controller 250 determines a second route along which the vehicle 500 is caused to move in step S75, the controller 250 calculates a second evaluation value based on safety, using the not-illustrated partial route table.

For these purposes, the controller 250 of the information processing device 200 acquires, with respect to each of a plurality of edges included in an n-th entire route, information indicating the length of the edge and information indicating the degree of congestion of the edge associated with the latitude, longitude, and altitude of the start node and the latitude, longitude, and altitude of the end node of the edge from the partial route table.

Subsequently, the controller 250 of the information processing device 200, with respect to each of the plurality of edges, weights the degree of congestion of the edge with the length of the edge by multiplying the degree of congestion by the length. Subsequently, the controller 250 calculates the sum of weighted degrees of congestion of the plurality of edges included in the entire route and, by dividing the calculated sum by the total length, calculates an average value of the degree of congestion of the entire route. Next, the controller 250 calculates a higher second evaluation value based on safety as the calculated average value of the degree of congestion is smaller. Subsequently, the controller 250 determines a first route or a second route, based on the first evaluation value calculated based on the total length, the second evaluation value calculated based on the degree of congestion, and the third evaluation value calculated based on the consumed amount of energy.

The vehicle 500 according to the present modified example includes an information processing device 590 that controls an attitude and flight of the vehicle 500 and propeller arms 501 and 502 and propeller arms 503 and 504 that protrude right forward and left forward from the front surface of the information processing device 590 and left rearward and right rearward from the back surface of the information processing device 590, respectively. In addition, the vehicle 500 includes propellers 511 to 514 that are installed on the tips of the propeller arms 501 to 504, respectively and not-illustrated motors that rotate the propellers 511 to 514 in accordance with control by the information processing device 590. The not-illustrated motors that rotate the propellers 511 to 514 are driven using power accumulated in a battery 580 that the vehicle 500 includes. A configuration and functions of the battery 580 that the vehicle 500 includes are the same as the configuration and the functions of the battery 880 that the vehicle 800 includes.

Further, on the under surface of the information processing device 590 of the vehicle 500, a storage cabinet 520 for storing a product is installed. A configuration and functions of the storage cabinet 520 that the vehicle 500 includes are the same as the configuration and the functions of the storage cabinet 820 that the vehicle 800 includes.

The vehicle 500 also includes a LiDAR sensor 531 that is installed on the front surface of the information processing device 590 and a not-illustrated LiDAR sensor that is installed on the back surface of the information processing device 590. Configurations and functions of the LiDAR sensor 531 on the front surface and the LiDAR sensor on the back surface that the vehicle 500 includes are the same as the configurations and functions of the LiDAR sensor 831 on the front surface and the LiDAR sensor on the back surface that the vehicle 800 includes.

In addition, the vehicle 500 further includes support legs 560 that protrude downward from the under surface of the information processing device 590 and that support the information processing device 590.

The information processing device 590 of the vehicle 500 includes a not-illustrated CPU, RAM, ROM, flash memory, data communication circuit, video card, display device, input device, location measurement circuit, input/output port, and drive circuit, which are hardware components. Configurations and functions of the hardware components that the information processing device 590 of the vehicle 500 includes are the same as the configurations and functions of the hardware components that the information processing device 890 of the vehicle 800 illustrated in FIG. 13 includes.

The drive circuit of the vehicle 500 is connected to not-illustrated cables that are respectively connected to not-illustrated motors that rotate the propellers 511 to 514. The drive circuit drives, in accordance with signals output by the CPU, the not-illustrated motors that rotate the propellers 511 to 514.

When an employee of the sales company performs, on the vehicle 500, an operation to cause the vehicle 500 to fly in circulation, the CPU of the vehicle 500 executes the circulation movement processing illustrated in FIGS. 14, 15A, and 15B. Through this processing, the vehicle 500 flies in circulation along a circulation route and, when receiving a command from the information processing device 200, flies the circulation route, the first route, or the second route in accordance with the received command.

Subsequently, when, after the CPU of the vehicle 500 has finished the execution of the circulation movement processing, the data communication circuit of the vehicle 500 receives a transport command sent from the information processing device 200, the CPU of the vehicle 500 executes not-illustrated transport processing in order to transport a product in accordance with the transport command.

When the CPU of the vehicle 500 starts the execution of the transport processing, the CPU executes the same processing as the processing in steps S111 to S114 in FIG. 16. Through this processing, the CPU acquires the transport command, acquires information indicating a transport route from the transport command, and outputs a control signal for takeoff and a control signal for flight on the transport route at a reference movement speed in the forward direction to the drive circuit in order. The drive circuit drives, in accordance with the control signals, the motors that rotate the propellers 511 to 514.

Subsequently, when the CPU of the vehicle 500 determines that the vehicle 500 has arrived at the transport destination, the CPU outputs a control signal for landing on the transport destination to the drive circuit. Subsequently, the CPU of the vehicle 500 executes the same processing as the processing in steps S115 to S117. Through this processing, after a first user who is the user of the terminal device 100 or a second user who is requested to receive a product by the first user has taken out the product from the storage cabinet 520 of the vehicle 500, the vehicle 500 takes off from the transport destination and, by flying the transport route in the reverse direction, returns to the start location of transport. Subsequently, the vehicle 500 sends a return report and subsequently terminates the execution of the transport processing. Through this processing, the vehicle 500, which has finished transport of a product, by starting execution of the circulation movement processing illustrated in FIGS. 14, 15A, and 15B, resumes movement along the circulation route.

Although, in the embodiment and the present modified example, it was described that the vehicle 900 was a ground traveling vehicle, the embodiment and the present modified example are not limited thereto. The vehicle 900 may be an unmanned aircraft that has the same configuration and functions as the configuration and the functions of the vehicle 500.

Although, in the present modified example, it was described that the vehicle 500 was an unmanned aircraft, the present modified example is not limited thereto, and the vehicle 500 may be an unmanned flying object. Although, in the present modified example, it was described that the vehicle 500 was a drone that gains lift and thrust from the propeller 511 to 514, the present modified example is not limited thereto. The vehicle 500 may include wings and gain lift from the wings or may include a gasbag filled with gas the specific gravity of which is lower than air and gain lift from the gasbag. In addition, the vehicle 500 may include a jet engine or a rocket engine and gain thrust from the jet engine or the rocket engine.

The vehicle 900, as with the vehicle 500, may be an unmanned flying object, include wings and gain lift from the wings, include a gasbag and gain lift from the gasbag, or include a jet engine or a rocket engine and gain thrust from the jet engine or the rocket engine.

Modified Example 13 of Embodiment

Figure 19:
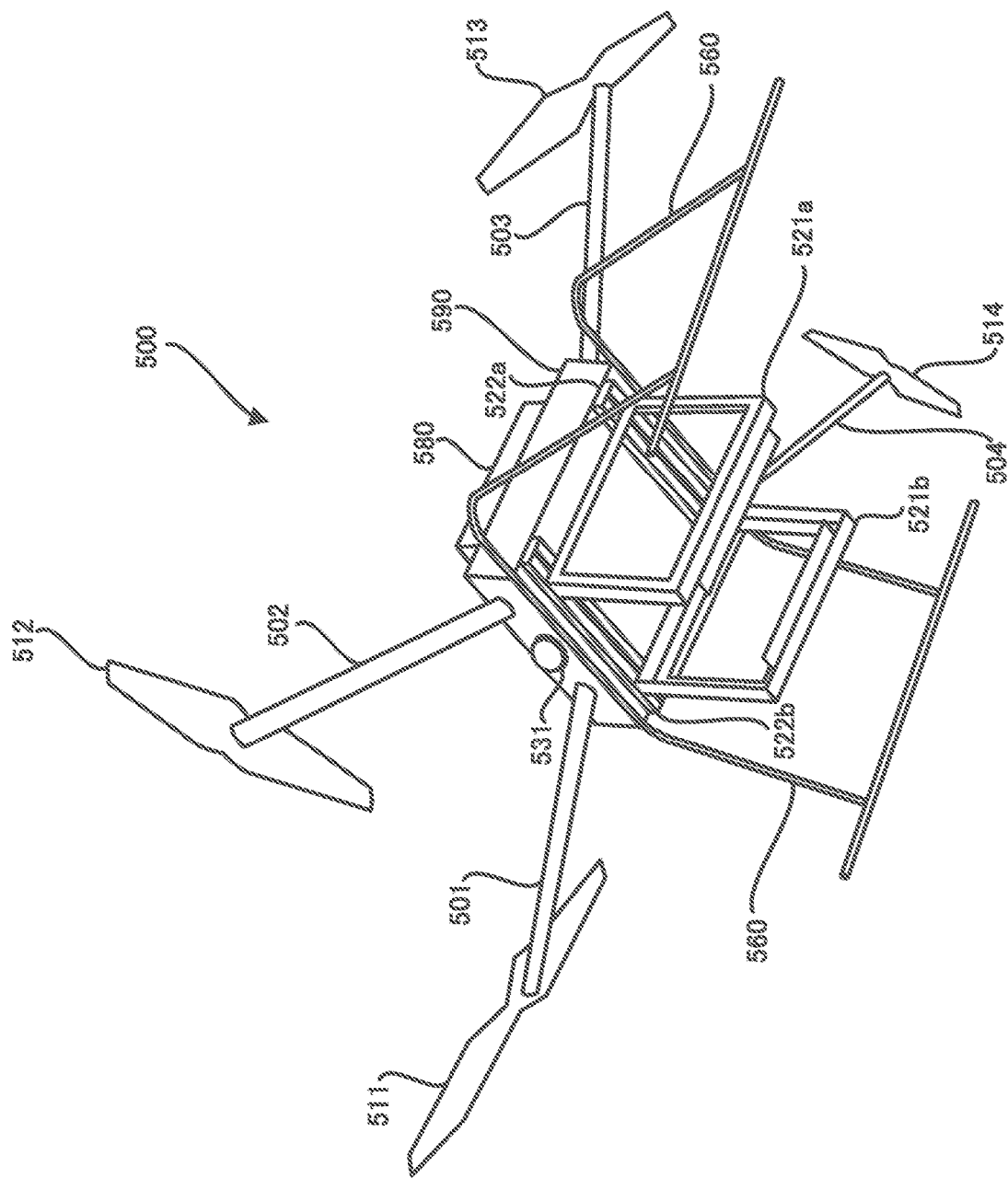
FIG. 19 is an appearance configuration diagram illustrating an appearance example of a vehicle according to Modified Example 13 of the embodiment.

Although, in Modified Example 12 of the embodiment, it was described that the vehicle 500 included the storage cabinet 520 in which a product is stored on the under surface of the information processing device 590, Modified Example 12 of the embodiment is not limited thereto. The vehicle 500 according to the present modified example includes, on the under surface of the information processing device 590, a first holding frame 521a and a second holding frame 521b, as illustrated in FIG. 19, that surround and hold a product.

The first holding frame 521a of the vehicle 500 surrounds and holds the four sides of one (hereinafter, referred to as a first surrounded face) of the side faces of a rectangular parallelepiped shaped cardboard in which a product is packaged, and the second holding frame 521b surrounds and holds the four sides of another side face (hereinafter, referred to as a second surrounded face) opposite to the first surrounded face surrounded and held by the first holding frame 521a.

In addition, the vehicle 500 according to the present modified example includes, on the under surface of the information processing device 590, guide rails 522a and 522b that extend in the normal direction of the first surrounded face and the second surrounded face of the product, suspend the first holding frame 521a and the second holding frame 521b, and have the movement direction of the first holding frame 521a and the second holding frame 521b as the extending direction.

Further, the vehicle 500 includes a not-illustrated motor that causes the first holding frame 521a and the second holding frame 521b to surround and hold a product by moving, in accordance with control by the information processing device 590, the first holding frame 521a and the second holding frame 521b in directions in which the first holding frame 521a and the second holding frame 521b come close to each other. The not-illustrated motor causes the first holding frame 521a and the second holding frame 521b to release a surrounded and held product by moving, in accordance with control by the information processing device 590, the first holding frame 521a and the second holding frame 521b in directions in which the first holding frame 521a and the second holding frame 521b move away from each other.

The not-illustrated drive circuit of the vehicle 500 drives, in accordance with a signal output by the not-illustrated CPU, the not-illustrated motor that moves the first holding frame 521a and the second holding frame 521b.

Modified Example 14 of Embodiment

Although, in the embodiment and Modified Examples 12 and 13 of the embodiment, it was described that the start location of transport was the location of a shipping door of a warehouse, the embodiment and Modified Examples 12 and 13 of the embodiment are not limited thereto. In addition, although, in the embodiment and Modified Examples 12 and 13 of the embodiment, it was described that the transport destination was the entrance to an apartment where the user who used the terminal device 100 lived, the embodiment and Modified Examples 12 and 13 of the embodiment are not limited thereto. The start location of transport and the transport destination may be any location, provided that the location is a location at which the vehicles 800 and 900 can come to a stop or park or a location at which the vehicle 500 can land.

The location at which the vehicles 800 and 900 can come to a stop or park may be, for example, an entrance of an apartment complex, an office building, a hotel, a commercial facility, or a public facility or an entranceway of a house. The location at which the vehicles 800 and 900 can come to a stop or park may also be a lobby of an apartment complex, an office building, a hotel, a commercial facility, or a public facility, a yard of a house, an apartment complex, an office building, a hotel, a commercial facility, or a public facility, a parking lot, a river beach, or a park.

The location at which the vehicle 500 can land may be, in addition to the location at which the vehicles 800 and 900 can come to a stop or park, a veranda or a rooftop of a house, an apartment complex, an office building, a hotel, a commercial facility, or a public facility.

In addition, when the vehicles 800 and 900 arrive at a transport destination, the vehicles 800 and 900 may, instead of coming to a stop or parking at the transport destination, travel in circulation or travel back and forth at a speed equal to or less than a predetermined speed in an area on the transport destination side of a boundary line that is apart from the transport destination by a predetermined distance.

In addition, when the vehicle 500 arrives at a transport destination, the vehicle 500 may, instead of landing at the transport destination, fly in circulation or fly back and forth at a speed equal to or less than a predetermined speed in airspace on the transport destination side of a boundary surface that is apart from the transport destination by a predetermined distance or perform a hovering flight in the airspace at an altitude within a predetermined range.

Modified Example 15 of Embodiment

In the embodiment, it was described that the vehicles 800 and 900 were unmanned ground vehicles. In addition, in Modified Examples 12 and 13 of the embodiment, it was described that the vehicle 500 was an unmanned aircraft. However, each of the vehicles 500, 800, and 900 is not necessarily unmanned, and provided that, with the exception of control by the information processing device 200, the vehicle is an object that autonomously moves, a person may be on board the vehicle.

Modified Example 16 of Embodiment

Although, in the embodiment, it was described that the controller 250 of the information processing device 200 calculated a higher second evaluation value based on safety as the average value of the width of an entire route was larger, the embodiment is not limited thereto. The controller 250 may calculate the second evaluation value, using any calculation method, provided that the calculation method is based on the width of the entire route, and the controller 250 may, for example, calculate a higher second evaluation value based on safety as the minimum value of the width of the entire route is larger.

Modified Example 17 of Embodiment

Although, in the embodiment, it was described that the controller 250 of the information processing device 200 calculated a higher second evaluation value based on safety as the average value of the width of an entire route was larger, the embodiment is not limited thereto. The controller 250 according to the present modified example calculates a higher second evaluation value based on safety as the average value of the degree of congestion of the entire route is smaller.

Although, in the present modified example, the degree of congestion is represented by the number of persons passing on a road surface having a predetermined area, the present modified example is not limited thereto, and the degree of congestion may be represented by (i) the number of vehicles passing on a road surface having a predetermined area or (ii) the number of persons and the number of vehicles passing on a road surface having a predetermined area.

Thus, in the not-illustrated partial route table according to the present modified example, the latitudes, longitudes, and altitudes of the start node and the end node of each edge, which is, for example, a road or a sidewalk, and information indicating a degree of congestion that was measured on the edge in the past are associated with one another in advance.

The controller 250 of the information processing device 200 according to the present modified example identifies a plurality of edges included in an entire route in order to calculate a second evaluation value based on safety. Subsequently, the controller 250 acquires, with respect to each of the identified plurality of edges, information indicating the degree of congestion and information indicating the length of the edge associated with the latitude, longitude, and altitude of the start node and the latitude, longitude, and altitude of the end node of the edge from the partial route table. Subsequently, the controller 250, with respect to each of the plurality of edges, weights the degree of congestion of the edge with the length of the edge by multiplying the degree of congestion by the length. Subsequently, the controller 250 calculates the sum of weighted degrees of congestion of the plurality of edges included in the entire route and, by dividing the calculated sum by the total length, calculates an average value of the degree of congestion of the entire route. Next, the controller 250 calculates a higher second evaluation value based on safety as the calculated average value of the degree of congestion is smaller. The reason why the controller 250 calculates a second evaluation value in this manner is that the smaller the average value of the degree of congestion of the entire route is, the lower the probability of the transport vehicle 800 or 900 coming into contact with, for example, a person or a vehicle while moving along the entire route is.

Although, in the present modified example, it was described that the controller 250 of the information processing device 200 calculated a higher second evaluation value based on safety as the average value of the degree of congestion of an entire route was larger, the present modified example is not limited thereto. The controller 250 may calculate the second evaluation value, using any calculation method, provided that the calculation method is based on the degree of congestion of the entire route, and the controller 250 may, for example, calculate a higher second evaluation value based on safety as the maximum value of the degree of congestion of the entire route is smaller.

Modified Example 18 of Embodiment

Although, in the embodiment, it was described that the direction control was reversing control that reverses the direction of movement of the transport vehicle 800 or 900, the embodiment is not limited thereto. The direction control may be angle control to change the direction of movement of the transport vehicle 800 or 900 by an angle based on the shape of the circulation route. The angle control includes control to, when the transport vehicle 800 or 900 is located at a bend bending at a 90-degree angle, cause the transport vehicle 800 or 900 to change the direction of movement thereof by 90°.

Modified Example 19 of Embodiment

In the embodiment, it was described that the statement that a product was placed in a shopping cart of a user meant that the product ID of the product was stored in the information processing device 200 in association with the user ID of the user. However, the embodiment is not limited to the above description, and the statement that a product is placed in a shopping cart of the user of the terminal device 100 may mean that the product ID of the product is stored in the terminal device 100 in association with the user ID of the user.

Modified Example 20 of Embodiment

Although, in the embodiment, it was described that the number of products targeted by an order was one and the transport vehicle 800 transported one product, the embodiment is not limited thereto. A plurality of products may be targeted by an order, and the transport vehicle 800 may store the plurality of products in the storage box 821 and transport the products.

Modified Example 21 of Embodiment

Although, in the embodiment, it was described that the terminal device 100 was a smartphone, the embodiment is not limited thereto, and the terminal device 100 may be a tablet-type personal computer or a laptop-type personal computer.

Modified Example 22 of Embodiment

In the embodiment, it was described that, when the information processing device 200, after it had been determined that the status ID of a status of an order was the status ID "S1" of the first status (step S55 in FIG. 11A; Yes), determined that the transport vehicle 800 or 900 moved away from the start location of transport (step S57; Yes), the information processing device 200 performed the low speed control (step S59). It was also described that, in contrast, when the information processing device 200 determined that the transport vehicle 800 or 900 did not move away from the start location of transport (step S57; No), the information processing device 200 performed the reference speed control (step S58).

However, the embodiment is not limited to the above description, and, in the present modified example, after it has been determined that the status ID of the status of the order is the status ID "S1" of the first status, the acquirer 210 of the information processing device 200 acquires a probability representing probability of the status of the order being caused to transition from the first status to the completion status.

Although, in the present modified example, a probability representing probability of the first status is a ratio of the number of times that the statuses of orders were caused to transition from the first status to the completion status in the past to the number of times that the statuses of orders were caused to transition to the first status in the past, the present modified example is not limited thereto.

In addition, in the present modified example, in the not-illustrated status table that the information storage 290 of the information processing device 200 stores in advance, the status ID "S1" of the first status and information that indicates a probability representing the probability of the first status are associated with each other in advance and stored. Thus, the acquirer 210 acquires information indicating a probability associated with the status ID "S1" in the status table.

In addition, when the controller 250 of the information processing device 200 determines (i) that the acquired probability is equal to or greater than a predetermined first threshold value and less than a predetermined second threshold value, and (ii) that the transport vehicle 800 or 900 moves away from the start location of transport (step S57; Yes), the controller 250 performs the low speed control (step S59). In contrast, when the controller 250 determines (i) that the acquired probability is equal to or greater than the predetermined first threshold value and less than the predetermined second threshold value, and (ii) that the transport vehicle 800 or 900 does not move away from the start location of transport (step S57; No), the controller 250 performs the reference speed control (step S58).

In addition, after it has been determined that the status ID of the status of the order is the status ID "S2" or "S3" of the second status, the acquirer 210 of the information processing device 200 acquires a probability representing probability of the second status associated with the status ID "S2" or "S3" in advance in the not-illustrated status table. Likewise, when it is determined that the status ID of the status of the order is the status ID "S4" of the third status, the information processing device 200 acquires a probability representing probability of the third status associated with the status ID "S4" in advance in the status table. Further, when it is determined that the status ID of the status of the order is the status ID "S5" of the fourth status, the information processing device 200 acquires a probability representing probability of the fourth status associated with the status ID "S5" in advance in the status table. Furthermore, when it is determined that the status ID of the status of the order is the status ID "S6" of the completion status, which is the fifth status, the information processing device 200 acquires a probability "100%" associated with the status ID "S6" in advance in the status table.

In addition, when the controller 250 of the information processing device 200 determines that the acquired probability is equal to or greater than the predetermined second threshold value and less than a predetermined third threshold value, the controller 250, by executing the processing in steps S61 to S64, performs the direction control and the reference speed control. Further, when the information processing device 200 determines that the acquired probability is equal to or greater than the predetermined third threshold value and less than a predetermined fourth threshold value, the information processing device 200, by executing the processing in steps S66 and S67, performs the high speed control. Furthermore, when the information processing device 200 determines that the acquired probability is equal to or greater than the predetermined fourth threshold value and less than a predetermined fifth threshold value, the information processing device 200, by executing the processing in steps S69 to S72, performs the first routing control. In addition, when the information processing device 200 determines that the acquired probability is equal to or greater than the predetermined fifth threshold value, the information processing device 200, by executing the processing in steps S73 to S76, performs the second routing control.

Note that, in the present modified example, the first to fifth threshold values are values of "0%" or more and "100%" or less, and the second threshold value is larger than the first threshold value, the third threshold value is larger than the second threshold value, the fourth threshold value is larger than the third threshold value, and the fifth threshold value is larger than the fourth threshold value. A person skilled in the art can determine, by experiment, suitable values for the first to fifth threshold values. In addition, the first threshold value is determined to be a value larger than "0%" in advance, and the controller 250 does not have to perform any of the low speed control, the reference speed control, the direction control, the high speed control, the first routing control, and the second routing control when the controller 250 determines that the acquired probability is less than the first threshold value.

Modified Example 23 of Embodiment

In the embodiment, it was described that, after it had been determined that the status ID of a status of an order was the status ID "S1" of the first status (step S55 in FIG. 11A; Yes), the information processing device 200, by executing the processing in steps S56 to S59, performed the low speed control or the reference speed control.

However, the embodiment is not limited to the above description, and, in the present modified example, after it has been determined that the status ID of the status of the order is the status ID "S1" of the first status, the acquirer 210 of the information processing device 200 acquires information indicating a predicted value of transition time required for the status of the order to be caused to transition from the first status to the completion status.

Although, in the present modified example, the predicted value of the transition time of the first status is an average value of time having been required for the status of the order to, after having been brought to the first status, be caused to transition to the completion status in the past, the present modified example is not limited thereto, and the predicted value may be a median value. In the present modified example, in the not-illustrated status table that the information storage 290 of the information processing device 200 stores in advance, the status ID "S1" of the first status and information indicating a predicted value of the transition time of the first status are associated with each other in advance and stored. Thus, the acquirer 210 acquires information indicating a predicted value of the transition time of the first status associated with the status ID "S1" in the status table.

In addition, when the controller 250 of the information processing device 200 determines that the predicted value of transition time indicated by the acquired information is less than a predetermined first threshold value and equal to or greater than a predetermined second threshold value, the controller 250, by executing the processing in steps S56 to S59, performs the low speed control or the reference speed control as movement control of the transport vehicle 800 or 900. In contrast, when the controller 250 determines that the predicted value of transition time indicated by the acquired information is equal to or greater than the first threshold value, the controller 250 does not perform any of the low speed control, the reference speed control, the direction control, the high speed control, the first routing control, and the second routing control.

In addition, after it has been determined that the status ID of the status of the order is the status ID "S2" or "S3" of the second status, the acquirer 210 of the information processing device 200 acquires information indicating a predicted value of the transition time of the second status associated with the status ID "S2" or "S3" in advance in the not-illustrated status table. Likewise, when it is determined that the status ID of the status of the order is the status ID "S4" of the third status, the information processing device 200 acquires information indicating a predicted value of the transition time of the third status associated with the status ID "S4" in advance in the status table. Further, when it is determined that the status ID of the status of the order is the status ID "S5" of the fourth status, the information processing device 200 acquires information indicating a predicted value of the transition time of the fourth status associated with the status ID "S5" in advance in the status table. Furthermore, when it is determined that the status ID of the status of the order is the status ID "S6" of the completion status, which is the fifth status, the information processing device 200 acquires a predicted value "0 minutes" of the transition time associated with the status ID "S6" in advance in the status table.

In addition, when the controller 250 of the information processing device 200 determines that the predicted value of transition time indicated by the acquired information is less than the predetermined second threshold value and equal to or greater than a predetermined third threshold value, the controller 250 executes the processing in steps S61 to S64. Through this processing, the controller 250, by performing the direction control and the reference speed control, further suppresses an increase in the movement distance from the location of the transport vehicle 800 or 900 to the start location of transport than the reference speed control executed in step S58 and the low speed control executed in step S59.

In addition, when the information processing device 200 determines that the predicted value of the transition time is less than the predetermined third threshold value and equal to or greater than a predetermined fourth threshold value, the information processing device 200 executes the processing in steps S66 and S67. Through this processing, the controller 250, by performing the high speed control, further reduces the movement distance from the location of the transport vehicle 800 or 900 to the start location of transport than the direction control executed in step S63 and the reference speed control executed in step S64.

Furthermore, when the information processing device 200 determines that the predicted value of the transition time is less than the predetermined fourth threshold value and equal to or greater than a predetermined fifth threshold value, the information processing device 200 executes the processing in steps S69 to S72. Through this processing, the controller 250, by performing the first routing control, causes the movement distance to be further reduced than the high speed control. In addition, when the information processing device 200 determines that the predicted value of the transition time is less than the predetermined fifth threshold value, the information processing device 200 executes the processing in steps S73 to S76. Through this processing, the controller 250, by performing the second routing control, causes the movement distance to be further reduced than the first routing control.

Note that, in the present modified example, the first to fifth threshold values are values of "0" or more, and the second threshold value is smaller than the first threshold value, the third threshold value is smaller than the second threshold value, the fourth threshold value is smaller than the third threshold value, and the fifth threshold value is smaller than the fourth threshold value. A person skilled in the art can determine, by experiment, suitable values for the first to fifth threshold values.

Modified Example 24 of Embodiment

Although, in the embodiment, it was described that the information processing device 200 included the information storage 290, the embodiment is not limited thereto. The information processing device 200 according to the present modified example does not include the information storage 290. The information processing device 200 according to the present modified example is connected to a not-illustrated information storage device that is, for example, a network attached storage (NAS) and that has the same functions as the functions of the information storage 290, via the Internet IN and performs the sale processing illustrated in FIGS. 5, 6A, and 6B and the movement control processing illustrated in FIGS. 11A and 11B, using information stored in the information storage device. The information processing system 1 according to the present modified example may include an information storage device or does not have to include an information storage device.

Modified Example 25 of Embodiment

In the embodiment, it was described that the information processing system 1 included the information processing device 200. In addition, in the embodiment, it was described that the CPU 201 of the information processing device 200, by executing the sale processing illustrated in FIGS. 5, 6A, and 6B and the movement control processing illustrated in FIGS. 11A and 11B, functioned as the acquirer 210, the authenticator 220, the updater 230, the selector 240, and the controller 250 illustrated in FIG. 7. In addition, it was described that the hard disk 203b of the information processing device 200 functioned as the information storage 290.

However, the embodiment is not limited to the configuration, and the information processing system 1 does not have to include the information processing device 200. In this case, the sale processing illustrated in FIGS. 5, 6A, and 6B and the movement control processing illustrated in FIGS. 11A and 11B may be executed by the CPU 891 of the information processing device 890 that the vehicle 800 includes. Therefore, the CPU 891 of the vehicle 800 may function as not-illustrated functional units equivalent to the acquirer 210, the authenticator 220, the updater 230, the selector 240, and the controller 250 of the information processing device 200. In addition, the flash memory 893b of the vehicle 800 may function as a not-illustrated functional unit equivalent to the information storage 290 of the information processing device 200.

In addition, the embodiment is not limited to the above configuration, the sale processing illustrated in FIGS. 5, 6A, and 6B and the movement control processing illustrated in FIGS. 11A and 11B may be executed by two or more of the CPU 201 of the information processing device 200, the CPU 891 of the vehicle 800, and the CPU 101 of the terminal device 100 in a distributed manner.

The embodiment and Modified Examples 1 to 25 of the embodiment of the present disclosure can be combined with one another.

It is possible to provide the present disclosure as not only the information processing device 200 that includes a configuration for achieving functions according to any one of the embodiment and Modified Examples 1 to 24 of the embodiment and the information processing device 890 that includes a configuration for achieving functions according to Modified Example 25 of embodiment but also a system that is a system constituted by a plurality of devices and that includes, as a whole system, a configuration for achieving functions according to any one of the embodiment and Modified Examples 1 to 25 of the embodiment of the present disclosure.

It is possible to provide the present disclosure as the information processing device 200 that includes, in advance, a configuration for achieving functions according to any one of the embodiment and Modified Examples 1 to 24 of the embodiment. It is also possible to, by applying a program, cause an existing information processing device to function as the information processing device 200 according to any one of the embodiment and Modified Examples 1 to 24 of the embodiment. That is, it is possible to, by a computer (CPU or the like) that controls an existing information processing device executing a program for achieving various functional configurations of the information processing device 200 exemplified in any one of the embodiment and Modified Examples 1 to 24 of the embodiment, cause the existing information processing device to function as the information processing device 200 according any one of the embodiment and Modified Examples 1 to 24 of the embodiment.

It is possible to provide the present disclosure as the information processing device 890 that includes, in advance, a configuration for achieving functions according to Modified Example 25 of the embodiment of the present disclosure. It is also possible to, by applying a program, cause an existing information processing device to function as the information processing device 890 according to Modified Example 25 of the embodiment. That is, it is possible to, by a computer (CPU or the like) that controls an existing information processing device executing a program for achieving various functional configurations of the information processing device 890 exemplified in Modified Example 25 of the embodiment, cause the existing information processing device to function as the information processing device 890 according Modified Example 25 of the embodiment.

Any distribution method of such programs can be used, and the programs can be stored and distributed in a recording medium, such as a memory card, a compact disc (CD)-ROM, and a digital versatile disc (DVD)-ROM, or can be distributed via a communication medium, such as the Internet.

A method according to the present disclosure can be implemented using the information processing device 200 according to any one of the embodiment and Modified Examples 1 to 24 of the embodiment and the information processing device 890 according to Modified Example 25 of the embodiment. In addition, the method according to the present disclosure can be implemented using the information processing system 1 according to any one of the embodiment and Modified Examples 1 to 25 of the embodiment.

The foregoing described some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. The detailed description, therefore, is not to be taken in a limiting sense, and the scope of the invention is defined only by the included claims, along with the full range of equivalents to which such claims are entitled.

APPENDICES

Appendix 1

An information processing device including:
at least one memory storing program code; and
at least one processor configured to read the program code and operate as instructed by the program code, wherein
the program code includes:
acquisition code configured to cause the at least one processor to acquire a status of an order; and
control code configured to cause the at least one processor to execute movement control according to the acquired status when the acquired status is a status before transition to a completion status, the movement control being control over a vehicle caused to transport a target of the order and suppressing an increase in movement distance from a location of the vehicle to a start location at which the transport is started, the completion status being a state in which the order is completed.

Appendix 2

The information processing device according to Appendix 1, wherein
statuses before transition to the completion status include a first status and a second status,
the second status has higher probability of transition to the completion status than probability of transition to the completion status that the first status has, and
the movement control corresponding to the second status further suppresses an increase in the movement distance than the movement control corresponding to the first status.

Appendix 3

The information processing device according to Appendix 2, wherein the movement control according to the status includes at least one of (i) speed control to control movement speed of the vehicle, (ii) direction control to control a direction of movement of the vehicle, or (iii) routing control to, when a movement route of the vehicle is not set, set the movement route of the vehicle or, when the movement route of the vehicle is set, reset the movement route that has been set.

Appendix 4

The information processing device according to Appendix 3, wherein
the speed control includes either or both of low speed control to, when the vehicle moves away from the start location, cause the vehicle to change the movement speed of the vehicle to a speed slower than a reference speed and high speed control to, when the vehicle comes close to the start location, cause the vehicle to change the movement speed of the vehicle to a speed faster than the reference speed,
the direction control includes control to, when the vehicle moves away from the start location, cause the vehicle to change the direction of movement of the vehicle to a direction in which the vehicle comes close to the start location, and
the routing control includes first routing control to cause the vehicle to move along a first route, the first route including a length shorter than a distance over which (i) the vehicle to which the movement route is set moves along the movement route or (ii) the vehicle to which the movement route is not set is predicted to move, the distance being from the location of the vehicle to the start location when the routing control is not performed.

Appendix 5

The information processing device according to Appendix 4,
wherein the routing control further includes second routing control to cause the vehicle to move along a second route, the second route including (i) a shorter length but a larger consumed amount of energy, (ii) a shorter length but lower safety, or (iii) a shorter length but a larger consumed amount of energy and lower safety than the first route.

Appendix 6

The information processing device according to Appendix 5, wherein
the vehicle moves in circulation,
the direction control includes reversing control to, when the vehicle moving in circulation moves away from the start location, cause the vehicle to reverse the direction of movement of the vehicle, and
lengths of the first route and the second route are shorter than distance over which the vehicle moves from the location of the vehicle to the start location when the vehicle moves in circulation.

Appendix 7

The information processing device according to Appendix 6, wherein
the control code
is configured to cause the at least one processor to execute the low speed control as the movement control when it is determined that the acquired status is the first status and the vehicle moves away from the start location, and
is configured to, by causing the at least one processor to execute the reversing control as the movement control when it is determined that the acquired status is the second status and the vehicle moves away from the start location, further reduce the movement distance than the movement control corresponding to the first status.

Appendix 8

The information processing device according to Appendix 6 or 7, wherein
the statuses before transition to the completion status further include a third status,
the third status has higher probability of transition to the completion status than the probability of transition to the completion status that the second status has, and
the control code is configured to, by causing the at least one processor to execute the high speed control as the movement control when the acquired status of the order is the third status, further reduce the movement distance than the movement control corresponding to the second status.

Appendix 9

The information processing device according to Appendix 8, wherein
the statuses before transition to the completion status further include a fourth status,
the fourth status has higher probability of transition to the completion status than the probability of transition to the completion status that the third status has, and
the control code is configured to, by causing the at least one processor to execute the first routing control as the movement control when the acquired status of the order is the fourth status, further reduce the movement distance than the movement control corresponding to the third status.

Appendix 10

The information processing device according to Appendix 9, wherein the control code is configured to, by causing the at least one processor to execute the second routing control as the movement control when the acquired status of the order is a fifth status, the fifth status being included in the statuses before transition to the completion status or being

Appendix 11

The information processing device according to Appendix 10, wherein the first status is a service selection status, the service selection status being a state in which a service to transport the target is selected, the second status is a search status, the search status being a state in which the target or a transport destination of the target is found in a search, the third status is a consideration status, the consideration status being a state in which purchase of the target or determination of a transport route to the transport destination is considered, and the fourth status is a settlement status, the settlement status being a state from a time when settlement of a purchase price of the target or a transport price to the transport destination is requested until the settlement succeeds or fails.

Appendix 12

The information processing device according to any one of Appendices 1 to 11, wherein the program code further includes selection code configured to cause the at least one processor to select the vehicle that is caused to transport the target from among a plurality of vehicles.

Appendix 13

The information processing device according to any one of Appendices 1 to 12, wherein the targets include a person, and the order is a dispatch request requesting dispatch of the vehicle that is caused to transport the target.

Appendix 14

The information processing device according to any one of Appendices 1 to 13, wherein the vehicle is capable of traveling without human intervention.

Appendix 15

The information processing device according to any one of Appendices 1 to 14, wherein the vehicle is a traveling machine that is configured to travel on the ground.

Appendix 16

The information processing device according to Appendix 1, wherein the movement control according to the status includes at least one of (i) speed control to control movement speed of the vehicle, (ii) direction control to control a direction of movement of the vehicle, or (iii) routing control to, when a movement route of the vehicle is not set, set the movement route of the vehicle or, when the movement route of the vehicle is set, reset the movement route that has been set.

the completion status, further reduce the movement distance than the first routing control corresponding to the fourth status.

Appendix 17

A system including:
at least one memory storing program code; and
at least one processor configured to read the program code and operate as instructed by the program code, wherein
the program code includes:
acquisition code configured to cause the at least one processor to acquire a status of an order;
a vehicle configured to transport a target of the order; and
control code configured to cause the at least one processor to execute movement control according to the acquired status when the acquired status is a status before transition to a completion status, the movement control being control over the vehicle and suppressing an increase in movement distance from a location of the vehicle to a start location at which the transport is started, the completion status being a state in which the order is completed.

Appendix 18

A method including:
acquiring, by an information processing device, a status of an order; and
executing, by the information processing device, movement control according to the acquired status when the acquired status is a status before transition to a completion status, the movement control being control over a vehicle caused to transport a target of the order and suppressing an increase in movement distance from a location of the vehicle to a start location at which the transport is started, the completion status being a state in which the order is completed.

What is claimed is:

1. An information processing device comprising:
at least one memory storing program code; and
at least one processor configured to read the program code and operate as instructed by the program code, wherein
the program code includes:
acquisition code configured to cause the at least one processor to acquire a status of an order; and
control code configured to cause the at least one processor to execute movement control according to the acquired status when the acquired status is a status before transition to a completion status, the movement control being control over a vehicle caused to transport a target of the order and suppressing an increase in movement distance from a location of the vehicle to a start location at which the transport is started, the completion status being a state in which the order is completed.

2. The information processing device according to claim 1, wherein
statuses before transition to the completion status include a first status and a second status,
the second status has higher probability of transition to the completion status than probability of transition to the completion status that the first status has, and
the movement control corresponding to the second status further suppresses an increase in the movement distance than the movement control corresponding to the first status.

3. The information processing device according to claim 2, wherein the movement control according to the status includes at least one of (i) speed control to control movement speed of the vehicle, (ii) direction control to control a direction of movement of the vehicle, or (iii) routing control to, when a movement route of the vehicle is not set, set the movement route of the vehicle or, when the movement route of the vehicle is set, reset the movement route that has been set.

4. The information processing device according to claim 3, wherein
the speed control includes either or both of low speed control to, when the vehicle moves away from the start location, cause the vehicle to change the movement speed of the vehicle to a speed slower than a reference speed and high speed control to, when the vehicle comes close to the start location, cause the vehicle to change the movement speed of the vehicle to a speed faster than the reference speed,
the direction control includes control to, when the vehicle moves away from the start location, cause the vehicle to change the direction of movement of the vehicle to a direction in which the vehicle comes close to the start location, and
the routing control includes first routing control to cause the vehicle to move along a first route, the first route comprising a length shorter than a distance over which (i) the vehicle to which the movement route is set moves along the movement route or (ii) the vehicle to which the movement route is not set is predicted to move, the distance being from the location of the vehicle to the start location when the routing control is not performed.

5. The information processing device according to claim 4, wherein the routing control further includes second routing control to cause the vehicle to move along a second route, the second route comprising (i) a shorter length but a larger consumed amount of energy, (ii) a shorter length but lower safety, or (iii) a shorter length but a larger consumed amount of energy and lower safety than the first route.

6. The information processing device according to claim 5, wherein
the vehicle moves in circulation,
the direction control includes reversing control to, when the vehicle moving in circulation moves away from the start location, cause the vehicle to reverse the direction of movement of the vehicle, and
lengths of the first route and the second route are shorter than distance over which the vehicle moves from the location of the vehicle to the start location when the vehicle moves in circulation.

7. The information processing device according to claim 6, wherein
the control code
is configured to cause the at least one processor to execute the low speed control as the movement control when it is determined that the acquired status is the first status and the vehicle moves away from the start location, and
is configured to, by causing the at least one processor to execute the reversing control as the movement control when it is determined that the acquired status is the second status and the vehicle moves away from the start location, further reduce the movement distance than the movement control corresponding to the first status.

8. The information processing device according to claim 6, wherein
the statuses before transition to the completion status further include a third status,
the third status has higher probability of transition to the completion status than the probability of transition to the completion status that the second status has, and the control code is configured to, by causing the at least one processor to execute the high speed control as the movement control when the acquired status of the order is the third status, further reduce the movement distance than the movement control corresponding to the second status.

9. The information processing device according to claim 8, wherein
the statuses before transition to the completion status further include a fourth status,
the fourth status has higher probability of transition to the completion status than the probability of transition to the completion status that the third status has, and
the control code is configured to, by causing the at least one processor to execute the first routing control as the movement control when the acquired status of the order is the fourth status, further reduce the movement distance than the movement control corresponding to the third status.

10. The information processing device according to claim 9, wherein the control code is configured to, by causing the at least one processor to execute the second routing control as the movement control when the acquired status of the order is a fifth status, the fifth status being included in the statuses before transition to the completion status or being the completion status, further reduce the movement distance than the first routing control corresponding to the fourth status.

11. The information processing device according to claim 10, wherein
the first status is a service selection status, the service selection status being a state in which a service to transport the target is selected,
the second status is a search status, the search status being a state in which the target or a transport destination of the target is found in a search,
the third status is a consideration status, the consideration status being a state in which purchase of the target or determination of a transport route to the transport destination is considered, and
the fourth status is a settlement status, the settlement status being a state from a time when settlement of a purchase price of the target or a transport price to the transport destination is requested until the settlement succeeds or fails.

12. The information processing device according to claim 1, wherein the program code further includes selection code configured to cause the at least one processor to select the vehicle that is caused to transport the target from among a plurality of vehicles.

13. The information processing device according to claim 1, wherein
the targets include a person, and
the order is a dispatch request requesting dispatch of the vehicle that is caused to transport the target.

14. The information processing device according to claim 1, wherein the vehicle is capable of traveling without human intervention.

15. The information processing device according to claim 1, wherein the vehicle is a traveling machine that is configured to travel on the ground.

16. The information processing device according to claim 1, wherein the movement control according to the status includes at least one of (i) speed control to control movement speed of the vehicle, (ii) direction control to control a direction of movement of the vehicle, or (iii) routing control to, when a movement route of the vehicle is not set, set the movement route of the vehicle or, when the movement route of the vehicle is set, reset the movement route that has been set.

17. The information processing device according to claim 7, wherein
the statuses before transition to the completion status further include a third status,
the third status has higher probability of transition to the completion status than the probability of transition to the completion status that the second status has, and
the control code is configured to, by causing the at least one processor to execute the high speed control as the movement control when the acquired status of the order is the third status, further reduce the movement distance than the movement control corresponding to the second status.

18. The information processing device according to claim 17, wherein
the statuses before transition to the completion status further include a fourth status,
the fourth status has higher probability of transition to the completion status than the probability of transition to the completion status that the third status has, and
the control code is configured to, by causing the at least one processor to execute the first routing control as the movement control when the acquired status of the order is the fourth status, further reduce the movement distance than the movement control corresponding to the third status.

19. A system comprising:
at least one memory storing program code; and
at least one processor configured to read the program code and operate as instructed by the program code, wherein the program code includes:
acquisition code configured to cause the at least one processor to acquire a status of an order;
a vehicle configured to transport a target of the order; and
control code configured to cause the at least one processor to execute movement control according to the acquired status when the acquired status is a status before transition to a completion status, the movement control being control over the vehicle and suppressing an increase in movement distance from a location of the vehicle to a start location at which the transport is started, the completion status being a state in which the order is completed.

20. A method comprising:
acquiring, by an information processing device, a status of an order; and
executing, by the information processing device, movement control according to the acquired status when the acquired status is a status before transition to a completion status, the movement control being control over a vehicle caused to transport a target of the order and suppressing an increase in movement distance from a location of the vehicle to a start location at which the transport is started, the completion status being a state in which the order is completed.

* * * * *